United States Patent [19]

Hashimoto et al.

[11] Patent Number: 5,625,717
[45] Date of Patent: Apr. 29, 1997

[54] IMAGE PROCESSING DEVICE FOR PROCESSING GREY LEVEL IMAGES

[75] Inventors: Manabu Hashimoto; Kazuhiko Sumi, both of Amagasaki, Japan

[73] Assignee: Mitsubishi Denki Kabushiki Kaisha, Tokyo, Japan

[21] Appl. No.: 81,463

[22] Filed: Jun. 22, 1993

[30] Foreign Application Priority Data

Jun. 24, 1992 [JP] Japan ................................. 4-165967
Sep. 16, 1992 [JP] Japan ................................. 4-246319

[51] Int. Cl.$^6$ ................................................ G06K 9/00
[52] U.S. Cl. ................................. 382/260; 382/274
[58] Field of Search ........................... 382/50, 22, 31, 382/41, 48, 54, 254, 256, 258, 260, 266, 263, 270, 274

[56] References Cited

U.S. PATENT DOCUMENTS

| | | | |
|---|---|---|---|
| 4,472,786 | 9/1984 | Larson | 382/266 |
| 4,736,448 | 4/1988 | Umemura | 382/54 |
| 4,811,408 | 3/1989 | Goldman | 382/50 |
| 4,918,739 | 4/1990 | Lorente et al. | 382/18 |
| 5,034,986 | 7/1991 | Karmann et al. | 382/48 |
| 5,054,097 | 10/1991 | Flinois et al. | 382/44 |
| 5,063,448 | 11/1991 | Jaffray et al. | 348/578 |
| 5,109,425 | 4/1992 | Lawton | 382/22 |
| 5,109,435 | 4/1992 | Lo et al. | 382/50 |
| 5,127,063 | 6/1992 | Nishiya et al. | 382/48 |
| 5,168,531 | 12/1992 | Sigel | 382/48 |
| 5,173,949 | 12/1992 | Peregrim et al. | 382/50 |
| 5,212,740 | 5/1993 | Paek et al. | 382/266 |

OTHER PUBLICATIONS

H. Voorhees "Finding Texture Boundaries in Images" MIT Artificial Intelligence Laboratory, Jun. 1987.

H.K. Nishihara "Prism: A Practical Realtime Imaging Stereo Matcher" MIT Artifical Intelligence Laboratory, Nov. 1983.

Primary Examiner—Leo Boudreau
Assistant Examiner—Chris Kelley
Attorney, Agent, or Firm—Wolf, Greenfield & Sacks, P.C.

[57] ABSTRACT

An image processing device includes: a DOG filtering means for applying a DOG filter upon the grey level image of an object; and a tri-level thresholding means for thresholding the output of the DOG filtering means at two distinct threshold levels, thereby obtaining a tri-level image of the object. The 0-level regions of the tri-level image correspond to regions of the original image, such as the surface areas of the object, within which the variation of the grey level is small. The boundary between two 0-regions is marked by adjacent parallel strips of a (+)-region and a (−)-region, wherein the zero-crossing line between the (+)-region and the (−)-region clearly defines the contour line of the 0-regions. This method of tri-level quantization provides a basis for efficient template matching of the images of objects, recognition or identification of objects, the detection of movement vectors of objects, and the detection of the parallax of a continuously moving objects.

24 Claims, 47 Drawing Sheets

FIG. 5

| | | VALUE I OF THE OBJECT IMAGE | | |
|---|---|---|---|---|
| | | −1 | 0 | +1 |
| VALUE R OF THE REF. PATTERN | −1 | 2 | 1 | 0 |
| | 0 | 1 | 2 | 1 |
| | +1 | 0 | 1 | 2 |

BLOBBING CODE TABLE

| LSB \ MSB | 0 | 1 |
|---|---|---|
| 0 | 0 | NOT USED |
| 1 | 1 (WHITE) | −1 (BLACK) |

FIG. 7a

| I  | −1 | | | 0 | | | +1 | | |
|----|----|----|----|----|----|----|----|----|----|
| R  | −1 | 0 | +1 | −1 | 0 | +1 | −1 | 0 | +1 |
| X0 | 0 | 0 | 0 | 0 | 0 | 0 | 1 | 1 | 1 |
| Y0 | 0 | 0 | 1 | 0 | 0 | 1 | 0 | 0 | 1 |
| X1 | 1 | 1 | 1 | 0 | 0 | 0 | 0 | 0 | 0 |
| Y1 | 1 | 0 | 0 | 1 | 0 | 0 | 1 | 0 | 0 |

FIG. 7b

| X | Y | S |
|---|---|---|
| 0 | 0 | 1 |
| 0 | 1 | 0 |
| 1 | 0 | 0 |
| 1 | 1 | 1 |

FIG. 7c

| I | −1 | | | 0 | | | +1 | | |
|---|----|----|----|----|----|----|----|----|----|
| R | −1 | 0 | +1 | −1 | 0 | +1 | −1 | 0 | +1 |
| M | 2 | 1 | 0 | 1 | 2 | 1 | 0 | 1 | 2 |

IMAGE PROCESSING DEVICE FOR PROCESSING GREY LEVEL IMAGES

BACKGROUND OF THE INVENTION

This invention relates to image processing devices used in automated production lines, etc., which is especially suited for effecting template matching of grey level images to align the images or to extract predetermined patterns, for detecting movement vectors of moving objects, for recognizing or identifying the objects, or for detecting the parallaxes of continuously moving objects.

A conventional method for effecting template matching of grey level images is described, for example, in a book by K. Tezuka et al., "Digital Image Processing Engineering," Nikkan Kogyou Shinbunsha, Tokyo, 1985, in a paragraph entitled: "Matching by Correlation," Chapter 5, Section 2: "Template Matching," p. 107. The method is based on the determination of the correlation between the grey level images, and hence has the advantage that a good matching can be accomplished even for the images which do not lend themselves easily to bi-level quantization.

FIG. 31 is a block diagram showing the structure of a conventional template matching device described in the above-mentioned book. The device includes: a reference pattern storage 81, an object image storage 82, a similarity calculator 83, a score map 84, and a controller 85.

FIG. 32 is a flowchart showing the matching procedure followed by the conventional template matching device of FIG. 31. When the procedure is started at step S91, the object image is input by means of a camera, etc., and stored in the object image storage 82. It is assumed that the reference pattern is stored beforehand in the reference pattern storage 81. At step S92, the superposition displacement vector (a,b) is set. Next at step S93, the reference pattern is superposed upon the object image at the displacement (a,b), and the similarity between the two images, i.e., the reference pattern and the object image, is calculated by the similarity calculator 83 by means of the following equation:

$$M(a,b) = \{\Sigma\Sigma I(i,j) \cdot R(i-a, i-b)\} / \{(\Sigma\Sigma I^2(i,j))^{1/2} \cdot (\Sigma\Sigma R^2(i-a, j-b))^{1/2}\} \quad (1)$$

where $M(a,b)$ is the similarity at displacement $(a,b)$, $a$ and $b$ are the components of the displacement vector $(a,b)$ in the directions of the indexes $i$ and $j$, respectively, $I(i,j)$ is the object image, and $R(i,j)$ is the reference pattern, wherein the summation is taken over the two indexes $i$ and $j$.

At step S94, the similarity calculated at step S93 is stored in the score map 84. The similarity is the score at the displacement (a,b). At step S95, it is judged whether or not the displacement vector (a,b) has traversed a predetermined range (e.g., the range defined by: $a_1 \leq a \leq a_2$, $b_1 \leq b \leq b_2$, where $a_1$, $a_2$, $b_1$, and $b_2$ are predetermined constants). If the judgment is affirmative at step S95, the procedure terminates. If, on the other hand, the judgment is negative at step S95 and there still remains displacements (a,b) in the predetermined range, the execution returns to step S92 to repeat the steps S92 through S95.

The entries of the two-dimensional score map 84 are thus filled with the scores at respective displacements (a,b) within the predetermined range. Then, the controller 85 searches the score map 84 for the maximum score. The displacement (a,b) at which the score is at the maximum is the position at which the object image I(i,j) is best aligned with the reference pattern R(i,j).

The above-mentioned book, Tezuka et al., further describes the regional segmentation method, in a paragraph entitled: "Mode Method," Chapter 4, Section 3, "Regional Segmentation," p. 79. FIG. 33 is a block diagram showing the structure of a conventional regional segmentation device. The regional segmentation device includes an original image storage 2141, a grey level histogram generator 2142, a threshold level determiner 2143, a bi-level quantizer 2144, and a regional segmentation means 2145.

FIG. 34 is a flowchart showing the regional segmentation procedure followed by the conventional regional segmentation device of FIG. 33. It is assumed that when the procedure starts at step S2151, the object image is stored beforehand in the original image storage 2141. At step S2152, the grey level histogram generator 2142 generates grey level histogram of the original image. FIG. 35 shows an exemplary grey level histogram generated by the grey level histogram generator in the procedure of FIG. 34. The grey level histogram is the plot of the frequency of the grey levels (plotted along the ordinate in FIG. 35) at respective pixels of the image (plotted along the abscissa in FIG. 35). At step S2153, the threshold level determiner 2143 determines the threshold level on the basis of the grey level histogram obtained at step S2152. If the histogram exhibits two distinct maxima or hills as shown in FIG. 35, the threshold level is set at the minimum (trough) between the two maxima.

At step S2154, the bi-level quantizer 2144 thresholds the grey level of the respective pixels of the image at the threshold level determined at step S2153. Namely, the bi-level quantizer 2144 determines whether or not the grey levels of the pixels are above or below the threshold level and converts them into the binary level 1 when the grey levels are above the threshold level and the binary level 0 when the grey levels are below the threshold level. The grey levels of the respective pixels are thus subjected to the bi-level quantization and a binary image is obtained. At step S2155, the regional segmentation means 2145 segments the binary image, and the procedure is terminated at step S2156.

The above book further describes the contour segmentation method, in a paragraph entitled: "Polyhedrons and their Linear Drawings," Chapter 8, Section 3, "Interpretation of Linear Drawings," p. 176. FIG. 36 is a block diagram showing the structure of a conventional contour segmentation device. The device includes an original image storage 2171, a contour extractor 2172, a rectilinear approximator 2173, a contour segmentation means 2174, and a vertices dictionary 2176.

FIG. 37 is a flowchart showing the contour segmentation procedure followed by the conventional contour segmentation device of FIG. 36. First at step S2181, the original image is input by means of a camera, for example, and stored in the original image storage 2171. Next at step S2182, the contours of the objects represented in the image are extracted. The term "contours" as used here include not only the outlines of the objects, but also the lines defined by the boundary between two surfaces of the objects meeting at an angle (e.g., the edges of a polyhedron) and the regions or strips of the image at which the grey level of the pixels changes abruptly. At step S2183, the extracted contours are approximated by the rectilinear approximator 2173 by a plurality of rectilinear lines, and the set of the approximating rectilinear lines thus obtained are stored therein.

Next, the operation of the contour segmentation means 2174 is described in detail. At step S2184, the contour segmentation means 2174 labels the lines of known contours with marks. The marks are sequential ID (identity) numbers, etc. The purpose of the contour segmentation device of FIG. 36 is to label all the line elements with respective marks.

At step S2185, an arbitrary vertex is selected and an actual (three-dimensional) shape of an object is assumed upon the vertex. Here the vertices dictionary 2176 is consulted. FIG. 38a is a diagram showing the vertices and the edges meeting thereat which may be formed by an object in the physical three-dimensional space, where the lines representing edges meet obliquely in the image. FIG. 38b is a diagram similar to that of FIG. 38a, but showing the case where the lines representing the edges meet at right angles in the image. The plus sign (+) at an edge represents that the edge is a convex edge. The minus sign (−) represents that the edge is a concave edge. The vertices dictionary 2176 stores diagrams or representations such as those shown in FIG. 38a and 38b. The vertices dictionary 2176 includes representations of all possible combinations of the vertices and the edges meeting thereat of a physically realizable three-dimensional object. Thus, the shapes of the edges (i.e., whether the edges are convex or concave) meeting at the arbitrarily selected vertex are determined at step S2185. (The vertices whose shape is thus determined are referred to as determinate vertices.) The shapes of the edges are conserved along the lines. Thus, this condition determines the shapes of those edges meeting at a new vertex which extend from an determinate vertex. These shapes of the determinate edges at the new vertex form the precondition for the complete determination of the shape of the new vertex. As described above, the shape of an edge is represented by the plus or the minus sign, and the shape of a vertex is represented by a set of plus and the minus signs of the edges meeting thereat. At step S2186, it is judged whether or not all the vertices are examined. The determination of the shapes of the vertices are repeated until the judgment at step S2186 becomes affirmative.

At step S2187, it is judged whether or not a contradiction exists among the shapes of the vertices. If any contradiction exists in the selection of the vertices, the procedure returns to the stage at which such contradiction has occurred, and re-selects the vertices. Thus it is determined whether it is possible to define the shapes of all the vertices without contradiction. The contour segmentation means 2174 tries to determine all the shapes of the vertices, selecting a shape of each vertex from among the shapes of the vertices registered in the vertices dictionary 2176, wherein each edge should be assigned either a plus or a minus sign. If the judgment is affirmative at step S2187 (namely, if all the lines are assigned a plus or a minus sign without contradiction), the contour segmentation is completed and the procedure of FIG. 37 terminates at step S2188. Then the contour segmentation device outputs the labelled contours 2175. The labelled contours 2175 consist of contours (or descriptions of rectilinear line elements) labelled with marks.

Next, a conventional image processing device provided with a movement vector extractor means is described following M. Taniuchi, "Robot Vision," Kabushiki Kaisha Shokodo, 1990, in which section 8.3: "Correspondance between Images," p. 212, describes such image processing device. FIG. 39 is a block diagram showing the conventional image processing device provided with a movement vector extractor. The image processing device includes: a pair of original image memories 3101, 3102, a pair of contour extractors 3103, 3104, a pair of segmentation extractor means 3105, 3106, a pair of short line division means 3107, 3108, segmentation matching means 3109, a short line matching means 310A, and a movement vector calculator means 310B.

FIG. 40 is a flowchart showing the movement vector calculation procedure of the conventional image processing device. FIGS. 41a and 41b show two successive images from which the movement vector is to be extracted. The image F2 3122 of FIG. 41b is taken a short interval of time after the image F1 3121 of FIG. 41a. The trees 3123, 3124, 3125, 3126 are assumed to be stationary. The figure of an animal 3127, 3128 at the center of the image is moving.

It is assumed that the image F1 3121 is stored in original image memory 3101, and the image F2 3122 is stored in original image memory 3102. At step S3112 after the start at step S3111, the movement regions are extracted from the two original images. This is effected as follows. The respective images are first divided into a plurality of small regions, and then using the correlation method, etc., the correspondence between the regions of approximately equal grey levels is determined. In this example, the region containing a moving object (presumably the figure of a hippopotamus) is extracted from each image. At step S3113, the contour portion of the image F1 3121 is extracted by the contour extractor 3103 and then is segmented by the segmentation extractor means 3105. Similarly, at step S3114, the contour portion of the image F2 3122 is extracted by the contour extractor 3104 and then is segmented by the segmentation extractor means 3106.

Next the segmentation procedure is described. In the case of this image processing device, the contour segmentation is effected as follows. The contour, forming a boundary of a region, etc., is divided into a plurality of line segments delimited by end points and T-junction points of the contour. The contour is thus described as a set of these line segments. At step S3115, the matching of the movement regions, which are segmented by means of the segmentation extractor means 3105 and 3106, is effected by the segmentation matching means 3109. FIG. 42 is a diagram showing the segmentation matching procedure. The diagram is cited from Taniuchi mentioned above. The partial contour 3131 of the image F1 is drawn adjacent to the partial contour 3132 of the image F2. The two partial contours substantially correspond to each other. The part of the respective contours delimited by the two rectangles (□) is a line segment. FIG. 42 shows that the segment $A_k$ in image F1 corresponds to the segment $A'_m$ in image F2.

Next at step S3116, the line segments of the F1 region are each divided into short lines by means of the short line division means 3107. Similarly, at step S3117, the line segments of the F2 region are each divided into short lines by means of the short line division means 3108. Thus each contour is described by a set of short lines. At step S3118, the two set of short lines corresponding to the contours of the images F1 and F2, respectively, are matched with each other by means of the short line matching means 310A. Thus, the correspondence between the movement regions of the two images is established at the of level of short lines. For example, in FIG. 42, the short lines $L_1$, $L_2$, and $L_3$ of the contour 3131 of the image F1 correspond to the short lines $L_1'$, $L_2'$, and $L_3'$ of the contour 3132 of the image F2. Finally at step S3119, the movement vector calculator means 310B calculates the movement vector between the two moving objects of the images F1 and F2.

Further, a conventional method of image recognition procedure is described in the above-mentioned Taniuchi, at Section 4.3.2 "Method of Regional Division," p.79, Section 4.3.3 "Edge Detection and the Method of Region," p. 82, Section 5.1.1 "Several Fundamental Characteristics," p. 91, Section 6.1.3 "Pattern Recognition using Global Characteristics," p. 109, and Section 6.2 "Recognition also using the Relation between Regions," p. 117 thereof.

Next, the conventional image recognition procedure as set forth in Taniuchi is described briefly, and then the conventional image segmentation method as taught by Taniuchi is described in detail.

FIG. 43 is a block diagram showing a conventional image recognition device using the method described in Taniuchi. The image processing device of FIG. 43 includes: a TV camera 4071 for imaging an object 4072, a region extractor means 4073 for extracting a predetermined region of the image of the object 4072 taken by means of the TV camera 4071, a characteristic extractor means 4074 for calculating the characteristic value of the region extracted by the region extractor means 4073, a characteristic space memory 4075 for storing the characteristic value calculated by the characteristic extractor means 4074, a classification means 4077 for classifying the object into classes on the basis of the class representative values 4076 and the characteristic values corresponding thereto, thereby determining a result 4078.

FIG. 44 is flowchart showing the recognition procedure followed by the image processing device of FIG. 43. The purpose of the image processing device of FIG. 43 is to determine the kind of the object and classify it into an appropriate class. The procedure of FIG. 44 is divided two stages: the preparatory stage and the execution stage. First, the preparatory stage is described.

At step S4081 at the beginning of the preparatory stage, the image of an object 4072 which is to be recognized, or that of an object 4072 belonging to the same category, is taken by means of a TV camera 4071. Next at 4082, the region extractor means 4073 extracts a region from the image of the object 4072 taken by means of the TV camera 4071. At step S4083, the characteristic extractor means 4074 extracts predetermined characteristics of the region extracted by the region extractor means 4073, and calculates the characteristic value (vector) of the object, which is plotted at a position within the characteristic space memory 4075 corresponding thereto.

FIG. 45 is a diagram schematically representing the characteristic space memory 4075 of the image processing device of FIG. 43. In the example shown in FIG. 45, two kinds of characteristics: "the area of the region (X1)" and "the likeness of the region to the circle (X2)" are used. Both of these two characteristic values are represented by scalar quantities. For each region, the pair of the area X1 of the region and the likeness to the circle X2 are calculated. Thus, the (two-dimensional vector) characteristic value of the object 4072 can be plotted on the two-dimensional characteristic space as shown in FIG. 45. When three or more characteristics are used, the characteristic space having a dimension equal to the number of the characteristics is to be used. Moving the position of the object 4072 successively, or replacing it with another, the steps S4081 through S4083 are repeated, such that a multitude of points are plotted in the characteristic space memory 4075. Generally, these points are divided into several clusters.

At step S4084, the clusters are extracted from the characteristic space. For example, in the case of the example shown in FIG. 45, the multitude of points form three clusters of points. The three clusters are named class 1, 2 and 3, respectively. At step S4085, representative points of the respective classes 1, 2 and 3 are extracted. In the case of the example shown in FIG. 45, the classes 1, 2 and 3 are represented by the respective centers of gravity C1, C2 and C3 thereof, which are the class representative values 4076. The above procedure constitutes the preparatory stage.

Next the execution stage is described. The execution stage is the stage at which the kind of the unknown or unidentified object positioned in front of the TV camera 4071 is determined. First at step S4086, the image of the unidentified object 4072 is taken be the TV camera 4071. Next, at step S4087, first the region extractor means 4073 extracts the region from the image of the object 4072 taken by the TV camera 4071, and then the characteristic extractor means 4074 extracts the characteristic of the extracted region, The kinds of the characteristics used at step S4087 are the same as those used in the preparatory stage. Namely, in the case of this example, the characteristics are the area X1' and the likeness to the circle X2'. (The parameters X1 and X2 are primed to distinguish them from those at the preparatory stage.)

Next at step S4088, the classification means 4077 determines the closeness of the characteristic point (X1', X2') of the object 4072 to the respective classes 1, 2 and 3, Namely, the classification means 4077 calculates the distances $d_1$, $d_2$ and $d_3$ from the characteristic point (X1', X2') to the respective representative points C1, C2 and C3 of the classes 1, 2 and 3. Further at step S4089, the classification means 4077 determines the class to (the representative point of) which the distance $d_i$ is the shortest. The closest class is determined as the class to which the unidentified object belongs. For example, in the case of the example shown in FIG. 45, the distance $d_1$ to the representative point C1 of class 1 is the shortest. Thus the classification means 4077 determines that the object 4072 belongs to the class 1. The procedure is thus terminated at step S408A.

Next, the operation of another conventional image processing device for effecting image recognition is described. FIG. 46 is a flowchart showing the graph matching procedure used by a conventional image processing device for the image recognition. First at step S4101 in FIG. 46, model graphs representing the models used in the recognition procedure are generated inside the computer. FIG. 47 is a diagram showing an exemplary model graph. In FIG. 47, the object is divided into regions and the relations among the respective regions are represented by means of the graph. The node A 4111, the node B 4112, and the node C 4113 represent the regions of an object. The arrowed edges connecting these nodes represent the relations among the regions.

Next at step S4102, the image of the object to be recognized is input. At step S4103, the region extractor means extracts regions from the image. Next at step S4104, the mutual relations among the regions are represented by means of a graph. In FIG. 47, the node a 4114, the node b 4115, and the node c 4116 represent the regions of the object, and the arrowed edges connecting the nodes represent the relations among the regions. At step S4105, the object is recognized (i.e., identified or classified) by matching the two graphs: the model graph and the graph of the object (input graph). Namely, in the case of the example of FIG. 47, the arrowed edges connecting the nodes of the model graph are collated or matched with the the arrowed edges connecting the nodes of the input graph. The correspondence between the matched edges is represented by hooked edges 4117, 4118, and 4119. The correspondence is evaluated by a predetermined evaluation index function. The model to which the highest evaluated correspondence can be established is determined as the one representing the object. The object is thus recognized as that represented by the model graph.

As described above, the conventional image processing device extracts regions from the image, which are used in the image recognition procedure. Next, the operation of the region extractor means is described in detail.

FIG. 48 is a flowchart showing the details of the region extraction procedure. At step S4121, a pixel $P_i$ is selected as the current pixel $P1_i$ within the image. FIG. 49 is a diagram representing the region extraction procedure. In the image plane 4131 at (a), the pixels are represented by circles, triangles, and crosses.

At step S4122, the characteristic value vector $(X_i, Y_i, Z_i)$ at the current pixel $P1_i$ is plotted in the characteristic space. In the example shown, the characteristic value vector consists of three scalar quantities $X_i$, $Y_i$, and $Z_i$, and hence the characteristic space is three-dimensional. The number of the components of the characteristic value vector may be two or more than three. The dimension of the characteristic space is equal to the number of the characteristic value vector. In FIG. 49, the pixels represented by circles are plotted to a first cluster 4134 in the characteristic space at (b); the pixels represented by triangles are plotted to a second cluster 4135 in the characteristic space; and the pixels represented by crosses are plotted to a third cluster 4136 in the characteristic space.

At step S4123 it is judged whether or not all the pixels have already been plotted. If the judgment is negative, the execution proceeds to step S4124 where the next current pixel $P1_i$ is selected, and the steps S4122 and S4123 are repeated. When all the pixels are plotted and the judgment at step S4123 finally becomes affirmative, the pixels of the image plane at (a), represented by the circles, the triangles, and the crosses, respectively, are mapped to the clusters 4134, 4135, and 4136, respectively, in the characteristic space.

At step S4125, the points plotted in the characteristic space are divided into clusters. In the case of the example shown in FIG. 49, the points are divided into three clusters 4134, 4135, and 4136. The first cluster 4135 is assigned the value 1; the second cluster 4136 is assigned the value 2; the third cluster 4137 is assigned the value 3. At step S4126, these values are registered upon the image plane at (c) by means of the inverse mapping. As a result, the image plane is divided into three regions the pixels of which are assigned the values 1, 2, and 3, respectively. The procedure terminates at step S4127.

The above conventional image processing devices have the following disadvantages.

First, in the case of the image processing device which effects template matching using equation (1) above, the calculation of the correlation takes much time. Further, if the calculation by means of equation (1) is done by means of a hardware, the implementation circuit becomes large-scaled and complicate.

Further, in the case of the image processing device of FIG. 33 by which the binary threshold level is determined from the grey level histogram of the image, it is necessary that the grey level histogram exhibits two maximums or peaks. If the grey level histogram does not exhibit any maximum or exhibit three or more maximums, it is difficult to determine an appropriate threshold level for obtaining a clear binary (bi-level) image. Hence the resulting binary image is difficult to segment.

Further, the image processing device of FIG. 36 using the vertices dictionary for segmenting the contours of an image has the following disadvantage. The contour points or the line elements generated form the contour points are segmented using the vertices dictionary. Thus, the vertices dictionary and the means for judging the consistency of the vertices within the image with respect to the vertices dictionary are indispensable. The contour segmentation procedure thus tend to become complex and takes much time to complete. Further, if the procedure is implemented by hardware, the circuit implementing the procedure becomes large and complex.

In the case of the conventional image processing device of FIG. 39 for extracting the movement, it is assumed that the moving region is detected before the extraction of the movement vector. However, if the movement region is detected by means of the correlation method, for example, the detection is not fully reliable unless the brightness and the form of the objects do not vary greatly between the successive image frames. Further, it takes much time to calculate the movement vector from the contour information. The image processing device is not suited for extracting the continuous movement of an object from three or more successive image frames.

Further, in the case of the above conventional image processing device, the movement is detected using the contours. Thus, if there exist a plurality of of objects other than the target object, an accurate division of the contours into short lines is difficult, due to the existence of spurious contours resulting from other objects.

Furthermore, in the case of the conventional image processing device for recognizing objects, the recognition is effected on the basis of the information upon the characteristic values obtained for respective regions. Thus, if the division or segmentation of the regions of the objects to be recognized is not identical with the regional information of the computer model, the reliability of the recognition is reduced drastically.

Furthermore, with respect to the method of the division of regions, the image is divided into regions using characteristic values such as the brightness and the color, upon the assumption that most of the pixels upon a surface exhibit similar characteristic values. However, in the case where the color information can not be used due to the restriction upon the size of the device,. the brightness information (the grey level information) of each pixel is the most important characteristic value available. Thus, if the brightness changes within the surface or if there are variations in the intensity of illumination, the division into regions cannot be effected reliably. As a result, the recognition of the objects becomes difficult.

SUMMARY OF THE INVENTION

It is therefore a primary object of this invention to provide an image processing device by which reliable and accurate information can be obtained exclusively from the grey level image.

A secondary object of this invention is to provide an image processing device for effecting template matching which is free from the above mentioned disadvantages of the conventional image processing device.

A further secondary object of this invention is to provide an image processing device for effecting the regional segmentation which is free from the above mentioned disadvantages of the conventional image processing device.

A further secondary object of this invention is to provide an image processing device for effecting the contour segmentation which is free from the above mentioned disadvantages of the conventional image processing device.

A further secondary object of this invention is to provide an image processing device for extracting movement vectors which is free from the above mentioned disadvantages of the conventional image processing device.

A further secondary object of this invention is to provide an image processing device for determining the parallax of an object which is free from the above mentioned disadvantages of the conventional image processing device.

A further secondary object of this invention is to provide an image processing device for recognizing objects which is free from the above mentioned disadvantages of the conventional image processing device.

The above primary object is accomplished in accordance with the principle of this invention by an image processing device which comprises:

original image input means for inputting a grey level image of an object;

spatial band-pass filter means, coupled to the original image input means, for applying a spatial band-pass filter upon the grey level image of the object, thereby generating a filtered image of the object; and tri-level thresholding means, coupled to the spatial band-pass filter means, for thresholding the filtered reference pattern and the filtered image of the object at two distinct threshold levels, thereby generating tri-level image of the object.

Further this invention provides an image processing device which comprises:

original image input means for inputting a grey level image of an object;

reference pattern supply means for supplying a grey level two-dimensional reference pattern;

spatial band-pass filter means, coupled to the original image input means and reference pattern supply means, for applying a spatial band-pass filter upon the grey level reference pattern and the grey level image of the object, thereby generating a filtered reference pattern and a filtered image of the object;

tri-level thresholding means, coupled to the spatial band-pass filter means, for thresholding the filtered reference pattern and the filtered image of the object at two distinct threshold levels, thereby generating tri-level reference pattern and tri-level image of the object;

similarity calculator means, coupled to the tri-level thresholding means, for determining a portion of the tri-level image of the object which is in best agreement with the tri-level reference pattern, wherein the similarity calculator means includes:

(a) means for setting a relative displacement of the tri-level image of the object with respect to the tri-level reference pattern;

(b) means for calculating a similarity of the tri-level image of the object and the tri-level reference pattern at the relative displacement;

(c) means for varying the relative displacement successively within a predetermined range; and (d) means for determining a relative displacement within the predetermined range at which the similarity reaches a maximum.

It is preferred that the similarity is calculated by the means (b) in accordance with an equation:

$$M(a,b) = \Sigma \Sigma f(R(i,j), I(i+a, j+b))$$

wherein M(a,b) is the similarity at relative displacement (a,b), R(i,j) is the tri-level reference pattern, I(i,j) is the tri-level object image, and summation is taken over $0 \leq i \leq n$ and $0 \leq j \leq m$, m being a size of the reference pattern in a direction of index j and n being a size thereof in a direction of index i, a function $f(\alpha, \beta)$ being an evaluation function.

Further, according to this invention, an image processing device is provided which comprises:

object image input means for inputting a grey level image of an object;

spatial band-pass filter means, coupled to the object image input means, for applying a spatial band-pass filter upon the grey level image of the object, thereby generating a filtered image of the object;

tri-level thresholding means, coupled to the spatial band-pass filter means, for thresholding the filtered image of the object at a first and a second threshold level, the first threshold level being greater than the second threshold level, the tri-level thresholding means thereby generating a tri-level image of the object which includes: first regions corresponding to regions of the filtered image of the object below the second threshold level; second regions corresponding to regions of the filtered image of the object between the first and second threshold levels; and third regions corresponding to regions of the filtered image of the object above the first threshold level; and regional segmentation means, coupled to the tri-level thresholding means, for segmenting the tri-level image of the object, wherein the regional segmentation means segments only the second regions of the tri-level image of the object.

Still further, this invention provides an image processing device which comprises:

object image input means for inputting a grey level image of an object;

spatial band-pass filter means, coupled to the object image input means, for applying a spatial band-pass filter upon the grey level image of the object, thereby generating a filtered image of the object;

tri-level thresholding means, coupled to the spatial band-pass filter means, for thresholding the filtered image of the object at a first and a second threshold level, the first threshold level being greater than the second threshold level, the tri-level thresholding means thereby generating a tri-level image of the object which includes: first regions corresponding to regions of the filtered image of the object below the second threshold level; second regions corresponding to regions of the filtered image of the object between the first and second threshold levels; and third regions corresponding to regions of the filtered image of the object above the first threshold level;

segmentation means coupled to the tri-level thresholding means, including: first segmentation means for segmenting the first regions corresponding to regions of the filtered image of the object below the second threshold level, the first segmentation means generating first segmented regions; second segmentation means for segmenting the second regions corresponding to regions of the filtered image of the object between the first and second threshold levels, the second segmentation means generating second segmented regions; and third segmentation means for segmenting the third regions corresponding to regions of the filtered image of the object below the second threshold level, the third segmentation means generating third segmented regions; and segment synthesizer means, coupled to the segmentation means, for synthesizing predetermined segmented regions among the first, second, and third segmented regions output from the segmentation means.

It is preferred that the first threshold level is negative and the second threshold level is positive, and the segment synthesizer means synthesizes each one of the second segmented regions with an adjacent first or third segmented region.

Still further, this invention provides an image processing device which comprises:

object image input means for inputting a grey level digital image of an object;

spatial band-pass filter means, coupled to the object image input means, for applying a spatial band-pass filter upon the grey level image of the object, thereby generating a filtered image of the object;

tri-level thresholding means, coupled to the spatial band-pass filter means, for thresholding the filtered image of the object at a first and a second threshold level, the first threshold level being greater than the second threshold level, the tri-level thresholding means thereby generating a tri-level image of the object which includes: first regions corresponding to regions of the filtered image of the object below the second threshold level; second regions corresponding to regions of the filtered image of the object between the first and second threshold levels; and third regions corresponding to regions of the filtered image of the object above the first threshold level;

regional segmentation means, coupled to the tri-level thresholding means, for segmenting the tri-level image of the object, wherein the regional segmentation means segments only the second regions of the tri-level image of the object, the regional segmentation means thereby generating segmented regions;

contour detector means, coupled to the spatial band-pass filter means, for extracting contour pixels from the filtered image of the object; and contour segmentation means, coupled to the regional segmentation means and the contour detector means, for segmenting the contour pixels by determining a segmented region output from the regional segmentation means which is closest to each contour pixel, the contour segmentation means thereby generating contour segments each of which consists of the contour pixels which are determined to be closest to a segmented region output from the regional segmentation means.

Further, this invention provides an image processing device for detecting a movement of an object from at least two successive images thereof, the image processing device which comprises:

object image input means for inputting a first and a second successive grey level image of an object;

spatial band-pass filter means, coupled to the object image input means, for applying a spatial band-pass filter upon the first and the second grey level image of the object, thereby generating a first and a second filtered image of the object;

tri-level thresholding means, coupled to the spatial band-pass filter means, for thresholding the first and the second filtered image of the object at a first and a second threshold level, the first threshold level being greater than the second threshold level, the tri-level thresholding means thereby generating a first and a second tri-level image of the object;

labeling means, coupled to the tri-level thresholding means, for labeling the first and the second tri-level image of the object, the labeling means generating labeled regions of the first and the second tri-level image;

label position detector means, coupled to the labeling means, for detecting a position of each labeled region of the first and the second tri-level image output from the labeling means; and movement vector extractor means, coupled to the label position detector means, for extracting a movement vector of the object between the first and the second image, wherein the movement vector extractor means includes: means for determining a position of a labeled region of the second tri-level image which is closest to a position of a labeled region of the first tri-level image; and means for determining a vector connecting the position of the labeled region of the first tri-level image to the position of the labeled region of the second tri-level image.

It is preferred that the position of the labeled regions is a center of gravity of respective labeled regions.

This invention further provides an image processing device for detecting a parallax of an object from successive image frames thereof, the image processing device which comprises:

object image input means for inputting successive grey level image frames of an object;

spatial band-pass filter means, coupled to the object image input means, for applying a spatial band-pass filter upon the successive image frames of the object, thereby generating a filtered image frames of the object;

tri-level thresholding means, coupled to the spatial band-pass filter means, for thresholding the filtered image frames of the object at a first and a second threshold level, the first threshold level being greater than the second threshold level, the tri-level thresholding means thereby generating tri-level image frames of the object;

labeling means, coupled to the tri-level thresholding means, for labeling the tri-level image frames of the object, the labeling means generating labeled regions of the tri-level image frames;

label position detector means, coupled to the labeling means, for detecting a position of each labeled region of the tri-level image frames output from the labeling means;

label correspondence calculator means, coupled to the label position detector means, for determining correspondence among successive positions of the labeled regions of the tri-level image frames, wherein the label correspondence calculator means determines the correspondence by establishing a correspondence between a first position of a first labeled region of a first tri-level image frame and a second position of a second labeled region of a second tri-level image frame, the first and second tri-level image frame being two arbitrary successive tri-level image frames among the tri-level image frames output from the tri-level thresholding means, where the second position is closest to the first position among the positions of the labeled regions of the second tri-level image frame;

contour extractor means, coupled to the spatial band-pass filter means, for extracting contours from a first and a last filtered image frames output from the spatial band-pass filter means;

parallax calculator means, coupled to the label correspondence calculator means and the contour extractor means, for calculating a parallax of the object between the first and last filtered image frame, wherein the parallax calculator means includes: means for determining a correspondence between the contours of the first and last filtered image frames; and means for determining the parallax by determining a movement of the contours of the first and last filtered image frames on the basis of the correspondence established between the contours of the first and last filtered image frames.

It is preferred that the position of the labeled regions is a center of gravity of respective labeled regions.

Furthermore, this invention provides an image processing device which comprises:

original image input means for inputting a grey level image of an object;

model data means for supplying model data;

spatial band-pass filter means, coupled to the original image input means, for applying a spatial band-pass filter upon the grey level image of the object, thereby generating a filtered image of the object;

tri-level thresholding means, coupled to the spatial band-pass filter means, for thresholding the filtered image of the object at two distinct threshold levels, thereby generating a tri-level image of the object;

labeling means, coupled to the thresholding means, for labeling the tri-level image of the object, the labeling means generating labeled regions of the tri-level image;

grey level information extractor means, coupled to the original image input means and the labeling means, for extracting grey level information of the grey level image of the object with respect to each labeled region output from the labeling means;

grey leveled label generator means, coupled to the labeling means and the grey level information extractor means, for generating information upon grey-leveled labeled regions by which the grey level information with respect to each labeled region is added to information upon each labeled region; and matching means, coupled to the model data and the grey leveled label generator means, for matching the information upon grey-leveled labeled regions with the model data, the matching means thereby generating a recognition information upon the object.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4b shows the output curve resulting from the application of the DOG filter upon the image of FIG. 4a;

FIG. 5 is a table showing the values of the evaluation function $f(\alpha,\beta)$ with respect to to its arguments;

FIG. 7a is a table showing the values of the outputs of the AND gates 63 through 66 of FIG. 6a with respect to the values of the signal I 61 and the signal R 62;

FIG. 7b is a table showing the output value S of the logical element 71 and the logical element 72 with respect to the input values X and Y thereto;

FIG. 7c is a table showing the output value M of the adder element 75 with respect to the values of the signal I 61 and the signal R 62;

FIG. 26a shows successive image frames with labeled regions and the centers of gravity thereof;

FIG. 26b shows a contour extracted from the first frame image F1 of FIG. 26a;

FIG. 26c shows a contour extracted from the n'th frame image Fn of FIG. 26a;

FIG. 26d shows the screen display 309H of the parallax vectors obtained by the parallax calculator means 3078 of FIG. 24 at step S308F in the procedure of FIG. 25;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

First Embodiment

Figure 1:
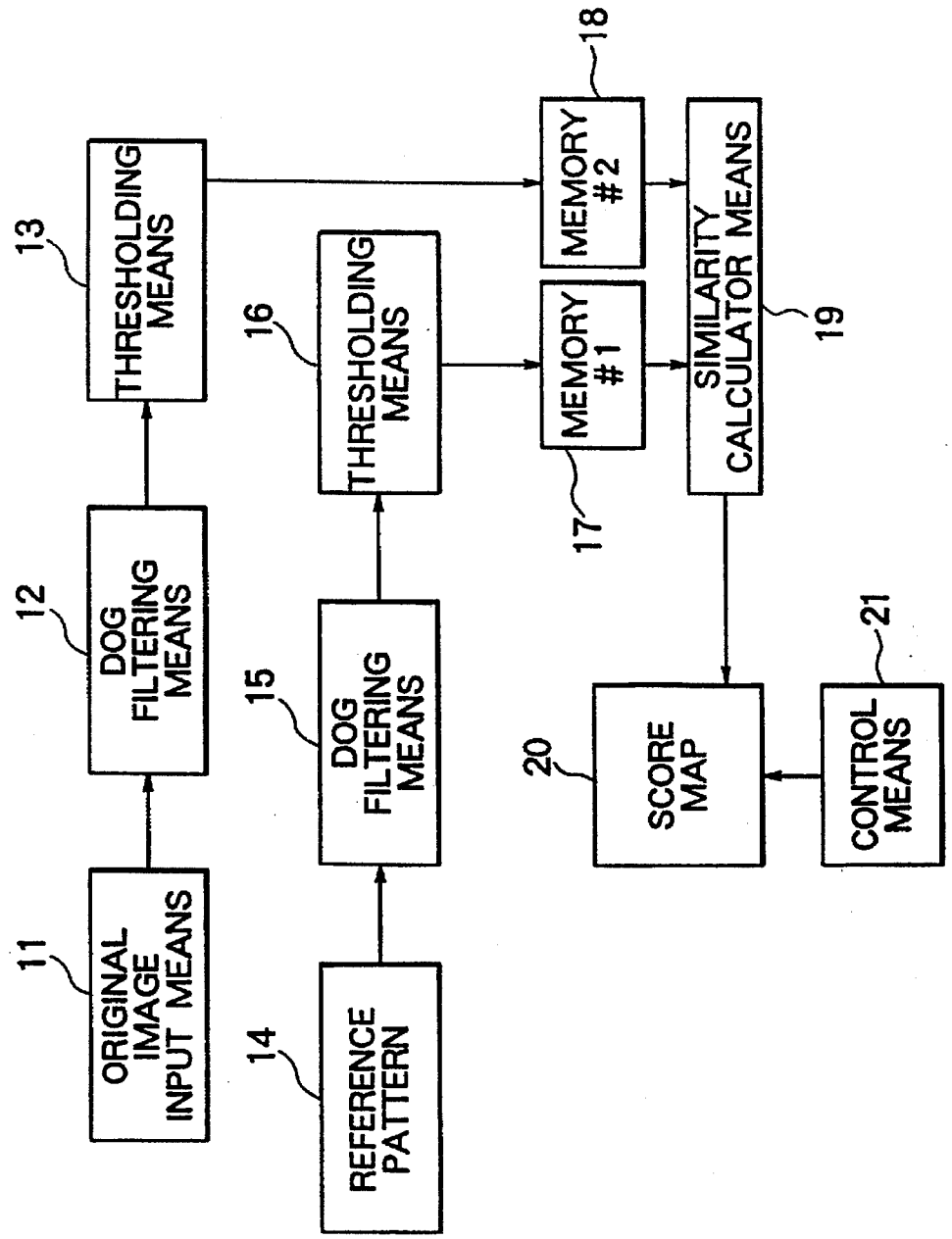
FIG. 1 is a block diagram showing the structure of an image processing device according to a first embodiment of this invention.
Figure 2:
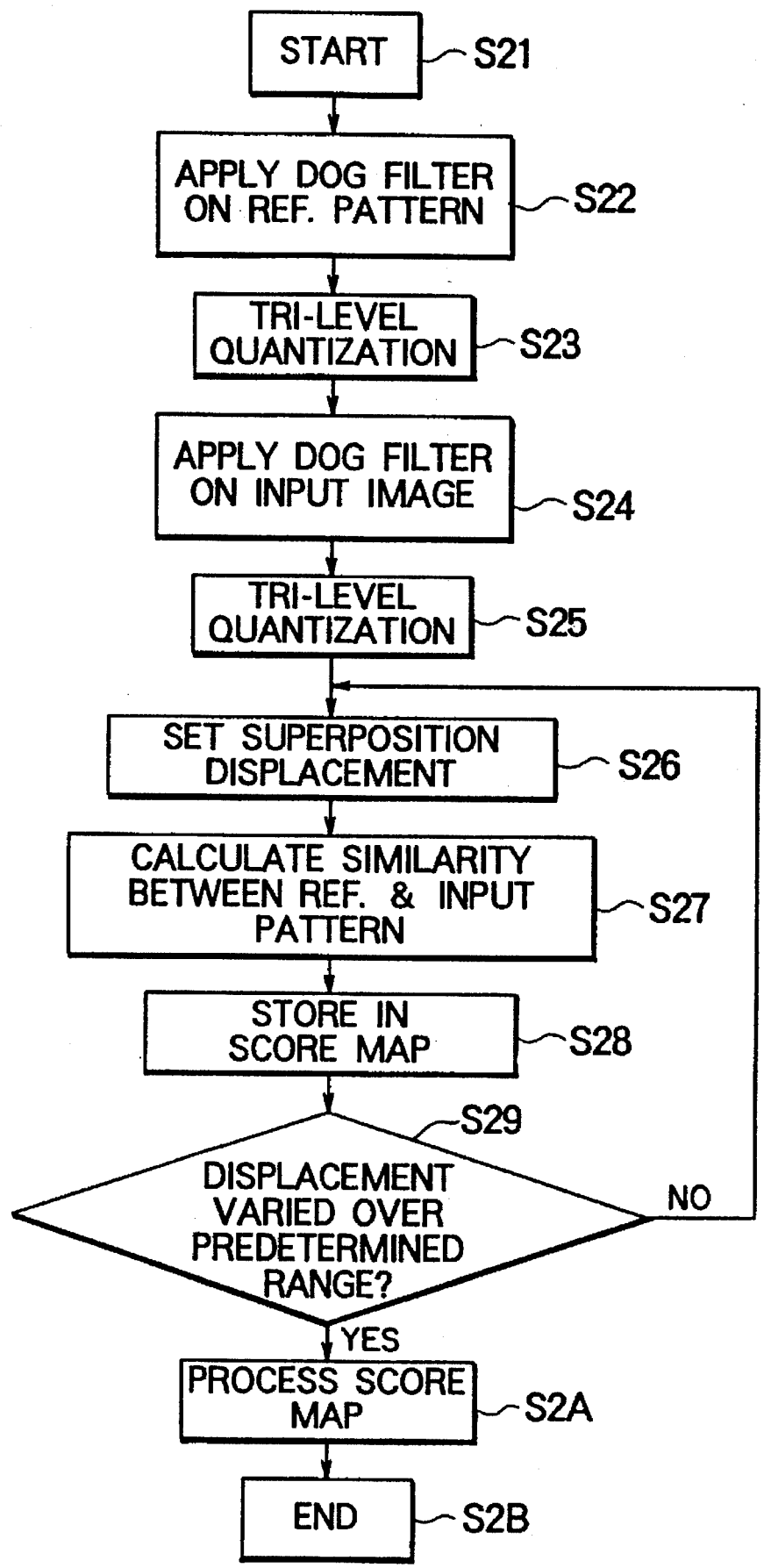
FIG. 2 is a flowchart showing the procedure followed by the image processing device according to the first embodiment.

FIG. 1 is a block diagram showing the structure of an image processing device according to a first embodiment of this invention. FIG. 2 is a flowchart showing the procedure followed by the image processing device according to the first embodiment.

At the start S21, it is assumed that the reference pattern 14 (a grey level image) is stored beforehand in the device. At step S22, the DOG filtering means 15 applies the DOG (difference of Gaussians) filter upon the reference pattern 14. In the one-dimensional case, the DOG filter is defined as follows:

$$DOG(x) = [1/((2P_i)^{1/2}\sigma_e)] \exp(-x^2/(2\sigma_e^2)) - [1/((2P_i)^{1/2}\sigma_i)] \exp(-x^2/(2\sigma_i^2)) \quad (2)$$

where the left-hand side is a difference of two Gaussians with standard deviations $\sigma_e$ and $\sigma_i$, respectively.

Figure 3:
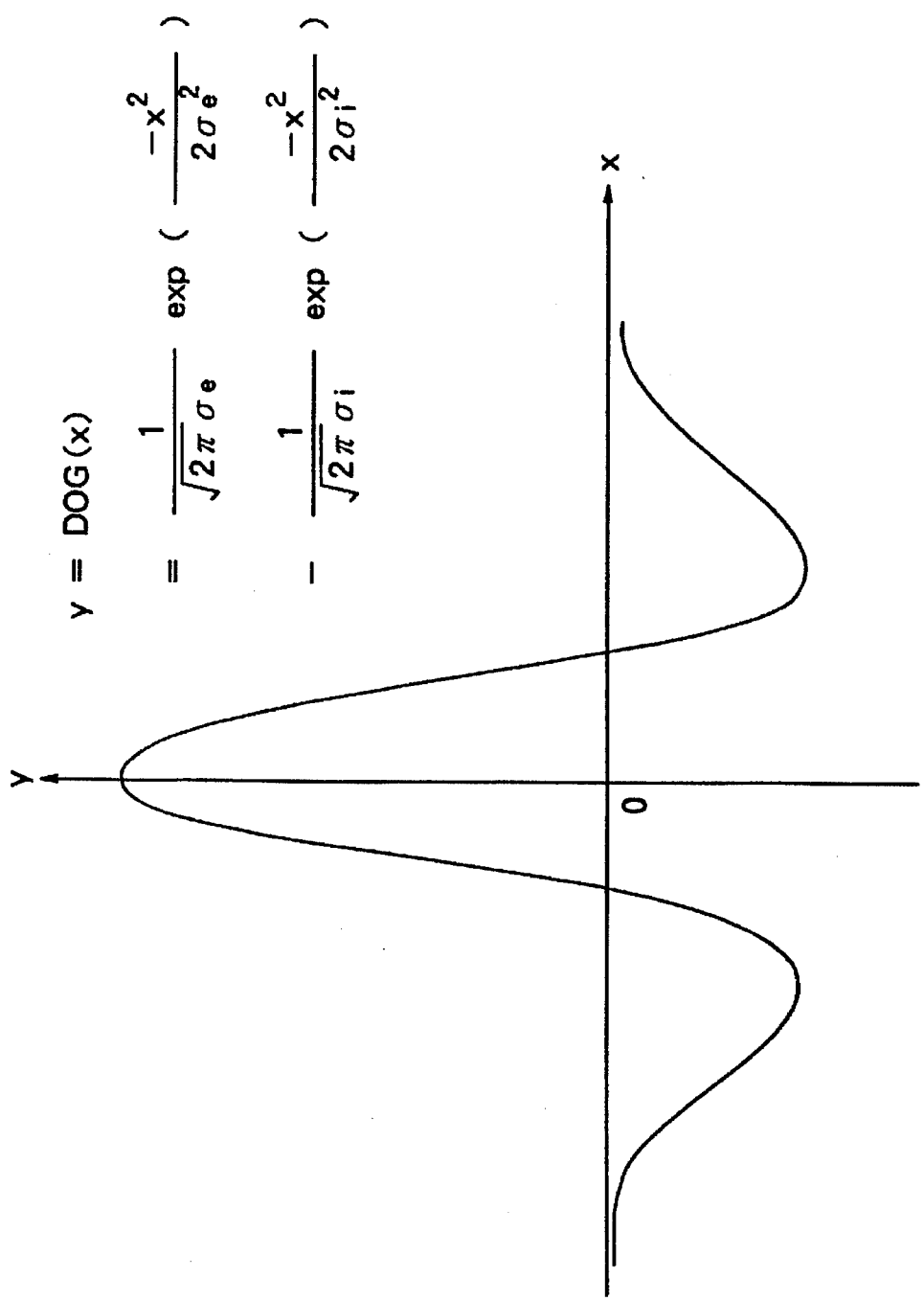
FIG. 3 shows the curve representing the one-dimensional DOG function expressed by equation (2)

FIG. 3 shows the curve representing the one-dimensional DOG function expressed by equation (2). In the case of the image processing device, two-dimensional DOG filter is used to process the two-dimensional image. The two-dimensional DOG filter is defined by the following equation:

$$DOG(x,y) = [1/((2P_i)^{1/2}\sigma_e)]\exp(-(x+y)^2/(2\sigma_e^2)) - [1/((2P_i)^{1/2}\sigma_i)]\exp(-(x+y)^2/(2\sigma_i^2)) \quad (3)$$

The DOG filtering means 12 convolves the image I(x,y) with the DOG function DOG(x,y) to obtain the convolution I(x,y)*DOG(x,y), which represents the result of the application of the DOG filter upon the image I(x,y). The DOG filter is a bandpass filter exhibiting a half-height width of 1.25 octaves. In the case of this embodiment, $\sigma_e=1.0$ and $\sigma_i=1.6$, and the filter size is 7 times 7 (7×7) pixels.

Figure 4A:
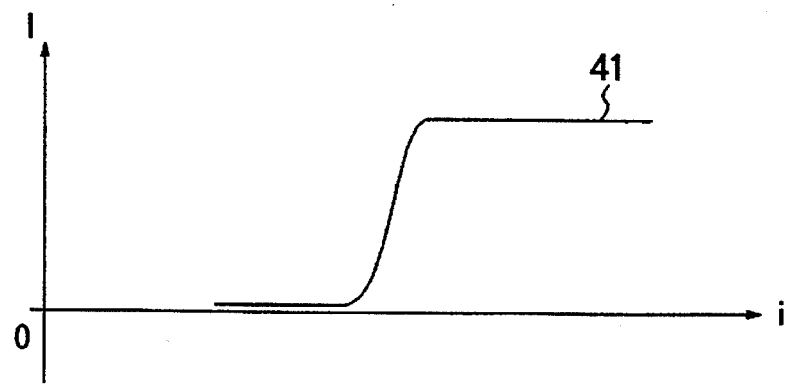
FIG. 4a shows the grey level curve along a line extending across the contour line of the original image.
Figure 4B:
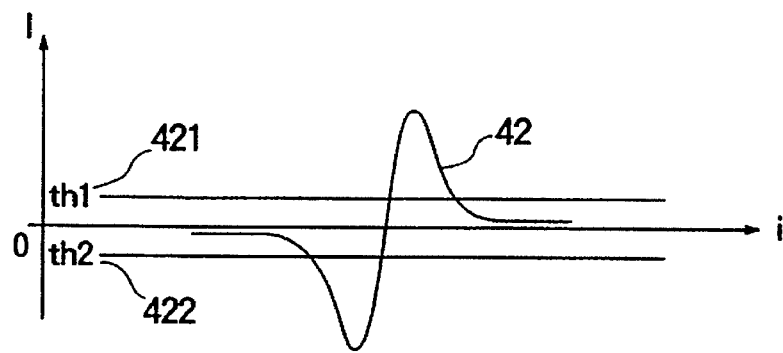
Figure 4C:
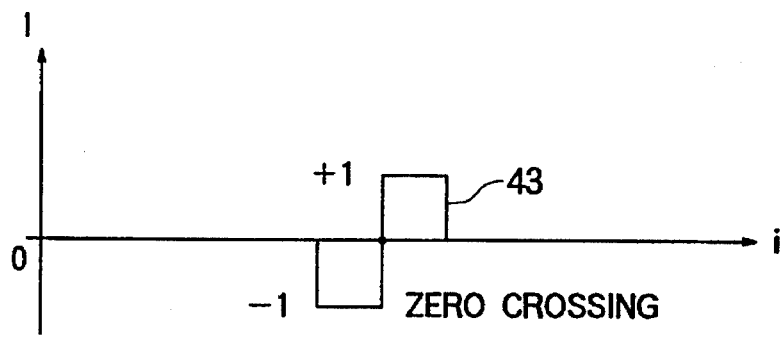
FIG. 4c shows the curve obtained from the curve of FIG. 4b by means of the tri-level quantization.

At step S23, the output of the DOG filtering means 15 is supplied to a thresholding means 16, where it is subjected to a tri-level quantization. FIGS. 4a through 4c shows the effect of the DOG filter and the tri-level quantization. For simplicity, the tri-level quantization is described with respect to the one-dimensional case. The description may be regarded as relating to the values of the respective functions (the grey level I(x,y), the convolution I(x,y)*DOG(x,y), and the tri-level image function) upon an arbitrary line (which may be represented by a linear equation of the coordinates x and y: ax+by=c) extending across a contour line within the two-dimensional image. FIG. 4a shows the grey level curve along a line extending across the contour line of the original image. The grey level curve 41 rises abruptly across the contour line. It is assumed that the line represented by the abscissa i extends across the contour line. FIG. 4b shows the output curve resulting from the application of the DOG filter upon the image of FIG. 4a. The curve 42 represents the convolution of the grey level curve 41 with the DOG function. FIG. 4c shows the curve obtained from the curve of FIG. 4b by means of the tri-level quantization. Here, tri-level quantization means thresholding the curve 42 with two distinct threshold levels th1 (421) and th2 (422) to obtain a tri-level signal 43. In the case of this image processing device, the two threshold levels are selected such that th1>0, th2<0, and th1=−th2. The tri-level signal 43 is obtained by converting the grey level of the image to +1 when the level of the curve 42 is above the first threshold level th1; to 0 when the level of the curve 42 is between the first and the second threshold levels th1 and th2; and to −1 when the level of the curve 42 is less than the level of the second threshold level th2. It is to be noted that (1) a 0-level region of the tri-level image generally represents a region of the original image of substantially constant grey level, (2) the boundary between two 0-level regions of the tri-level image which result from regions of distinct grey levels of the original image is marked by adjacent parallel strips of a (+)-region (a +1-region) and a (−)-region (a −1-region) in the threshold level image, and is clearly defined by a zero-crossing line between the (+)- and the (−)-region. It is noted that the boundary generally corresponds to the contour of an object or a pattern of the original image. The above observations (1) and (2) can be easily drawn from the comparison of FIGS. 4a and 4c. The tri-level image thus obtained is stored in memory (#1) 17.

At step S24, the object image is produced by means of the original image input means 11 (a camera) and supplied to the DOG filtering means 12, where the DOG filter is applied upon it. Next at step S25, the output of the DOG filtering means 12 is subjected to tri-level quantization by means of the thresholding means 13. The operations of the DOG filtering means 12 and the thresholding means 13 are similar to those of the DOG filtering means 15 and the thresholding means 16, respectively. The tri-level image obtained by the thresholding means 13 is stored in the memory (#2) 18.

At step S26, the superposition displacement vector (a,b) is selected. The superposition displacement vector (a,b) represents the displacement at which the input object image is superposed upon the reference pattern. At step S27, the similarity calculator means 19 reads out the tri-level object image and the tri-level reference pattern from the memory (#2) 18 and the memory (#1) 17, respectively, and superposes the tri-level object image upon the tri-level reference pattern at the superposition displacement (a,b). Further, the similarity calculator means 19 calculates the similarity M(a, b) at the displacement (a,b) by the following equation:

$$M(a,b) = \Sigma \Sigma f(R(i,j), I(i+a, j+b)) \quad (4)$$

In equation (4), R(i,j) is the tri-level reference pattern, I(i,j) is the tri-level object image, and the summation is taken over $0 \leq i \leq n$ and $0 \leq j \leq m$, m being the size of the reference pattern in the direction of index j and n being the size thereof in the direction of index i. The function $f(\alpha, \beta)$ is an evaluation function which takes the value shown in the table of FIG. 5, where the value of the reference pattern $\alpha = R$ (−1, 0, and +1) is shown at the left of each row, and the value of the object image $\beta = I$ (−1, 0, and +1) are shown at the head of each column. For example, $f(-1,-1)=2$ and $f(-1,0)=1$.

The similarity M(a,b) at the displacement (a,b) calculated by equation (4) is stored in the score map 20 at the address (a,b). At step S29 it is judged whether or not the superposition displacement vector (a,b) has traversed a predetermined range. The range is defined, for example, by: $a_1 \leq a \leq a_2$, $b_1 \leq b \leq b_2$, where $a_1$, $a_2$, $b_1$, and $b_2$ are predetermined constants. If the judgment is negative at step S29, the execution returns to step S26, where the superposition displacement vector (a,b) is set at a new value, and the subsequent steps S27 through S29 are repeated. When the predetermined range is traversed by the superposition displacement vector (a,b) and hence the judgment is affirmative at step S29, the two-dimensional score map 20 is filled with the scores (i.e., the similarity M(a,b) at respective superposition displacement (a,b)) over the predetermined range. Then at step S2A, the control means 21 searches the score map 20 for the superposition displacement vector $(a_z, b_z)$ at which the score M(a,b) is the greatest. The superposition displacement vector $(a_z, b_z)$ represents the superposition position at which the object image is best aligned with the reference pattern. Thus the template matching has been effected. The maximum score $M(a_z, b_z)$ represents the similarity of the object image to the reference pattern. By the way, the control means 21 controls the operation of the units of the image processing device represented by boxes in FIG. 1. However, since such operation has little relevance to the present invention, the description thereof is omitted.

Figures 6A, 6B:
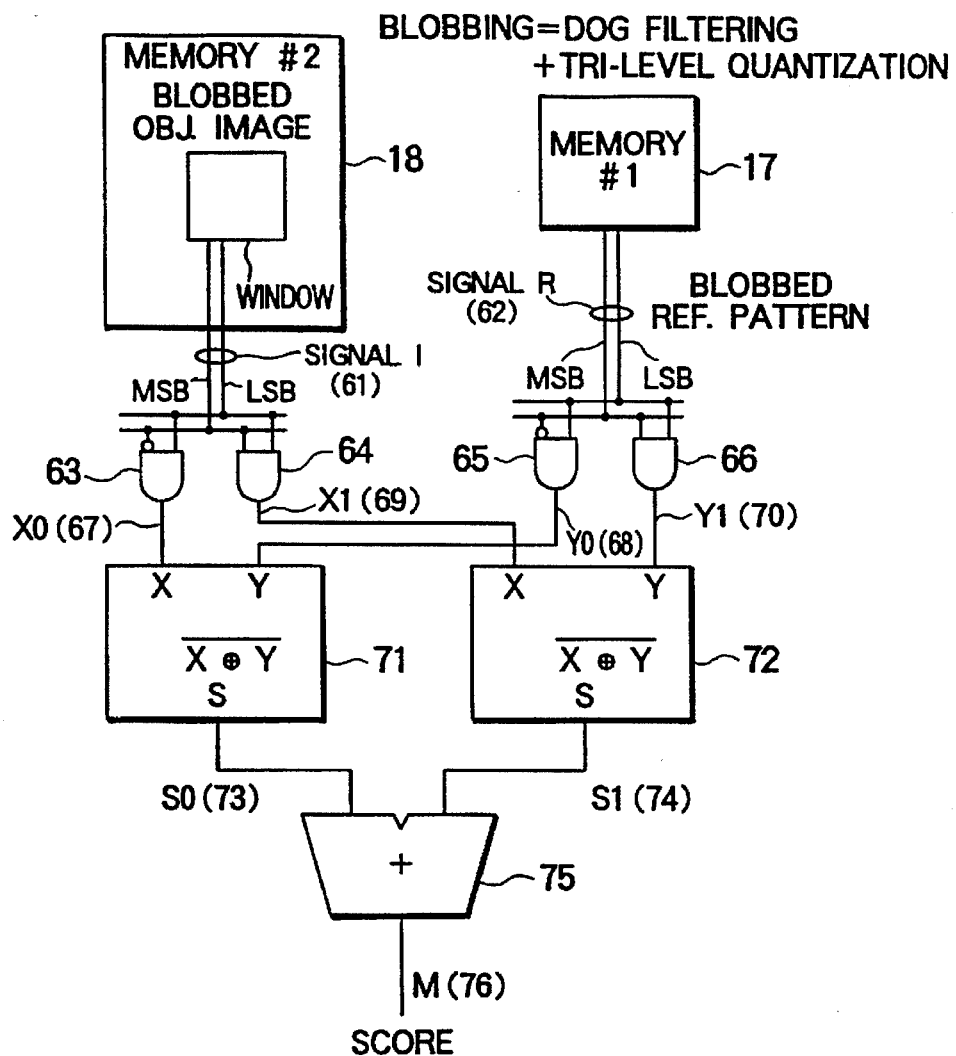
FIG. 6a is a block diagram showing an electronic circuit implementing the similarity calculator means 19 of FIG. 1.
FIG. 6b is a table showing the bits (MSB and LSB) encoding the tri-level blobbed signal.

FIG. 6a is a block diagram showing an electronic circuit implementing the similarity calculator means 19 of FIG. 1. In the memory (#1) 17 is stored the tri-level image which is obtained from the original image by means of the blobbing process (i.e., first applying the DOG filter upon the image and then subjecting it to the tri-level quantization). The tri-level image is referred to as the blobbed image. In the memory (#2) 18 is stored the blobbed image of the reference pattern. It is assumed that the dimensions (the height and the width) of the object image are greater than those of the reference pattern. Thus, according to equation (4), the superposition of the reference pattern with the object image at a displacement (a,b) is equivalent to defining a window having the same dimensions as the reference pattern within the object image and superposing the window (completely) with reference pattern. FIG. 6a shows a window defined within the memory (#2) 18. The position of the window within the object image corresponds to the value of the superposition displacement vector (a,b). The pattern stored in the memory (#1) 17 and the image stored in the memory (#2) 18 are tri-level images. The tri-levels, −1, 0, +1, are encoded in two bits. The MSB (most significant bit) and LSB (least significant bit) encoding the tri-levels are shown in FIG. 6b. Thus, MSB=0 and LSB=1 when the value of the signal I (or R) is +1 (white); MSB=0 and LSB=0 when the value of the signal I (or R) is ±0; and MSB=1 and LSB=1 when the value of the signal I (or R) is −1 (black). The bit pattern (MSB,LSB)= (1,0) is not used. The signal R 62 and the signal I 61 are the outputs of the memory (#1) 17 and the memory (#2) 18, respectively, which are encoded in the two bits MSB and LSB.

The AND gate 63 has an inverted input coupled to the MSB of the signal I 61 and a non-inverted input coupled to the LSB of the signal I 61. Thus the output X0 67 of the AND gate 63 is equal to I when the signal I 61 is 1, and is equal to 0 otherwise. The AND gate 64 has two non-inverted inputs coupled to the MSB and the LSB of the signal I 61, respectively. Thus the output X1 69 of the AND gate 64 is equal to 1 when the signal I 61 is −1, and is equal to 0 otherwise. The AND gate 65 has an inverted input coupled to the MSB of the signal R 62 and a non-inverted input coupled to the LSB of the signal R 62. Thus the output Y0 68 of the AND gate 65 is equal to 1 when the signal R 62 is 1, and is equal to 0 otherwise. The AND gate 66 has two non-inverted inputs coupled to the MSB and the LSB of the signal R 62, respectively. Thus the output Y1 70 of the AND gate 66 is equal to 1 when the signal R 62 is −1, and is equal to 0 otherwise. The outputs X0, X1, Y0, Y1 of the gates 63 through 66, for the respective combinations of the values of signal I 61 and the signal R 62 are summarized in FIG. 7a.

The logical element 71 having inputs X and Y coupled to the outputs of the gates 63 and 65 calculates the negation of the exclusive OR of its inputs X and Y. Similarly, the logical element 72 having inputs X and Y coupled to the outputs of the gates 64 and 66 calculates the negation of the exclusive OR of its inputs X and Y. FIG. 7b is a table showing the output value S of the logical element 71 and the logical element 72 with respect to the input values X and Y thereto. The outputs S0 73 and S1 74 of the logical elements 71 and 72 are input to the adder element 75, which calculates the arithmetic sum M 76 of its inputs. FIG. 7c is a table showing the output value M of the adder element 75 with respect to the values of the signal I 61 and the signal R 62. Thus, it is noted that each value M for respective pixels of the object and reference images corresponds to the value of the evaluation function $f(\alpha,\beta)$ of the above equation (4). (compare FIG. 5 which shows the value the function $f(\alpha,\beta)$ with FIG. 7c.) The values M for respective pixel of the images which are output from the adder element 75 are accumulated (summed up) in the score map 20 at the address corresponding to the superposition displacement vector (a,b), thereby obtaining the similarity M(a,b) given by the equation (4) above. The implementation of the similarity calculator means 19 shown in FIG. 6a has the advantage that the circuit consists exclusively of simple logical gates 63 through 66 and 71 and 72 and an adder 75.

According to the first embodiment, the reference pattern and the object image are processed by separate DOG filters. However, a single DOG filtering means may be used to process the two images, thereby reducing the size of the circuit.

Further, according to the first embodiment, the reference pattern and the object image are thresholded by separate thresholding means. However, a single thresholding means may be used to threshold the two images, thereby reducing the size of the circuit.

Still further, according to the first embodiment, the original image input via a camera is directly processed by the DOG filter. However, the image may first be preprocessed to remove the noise, etc.

Furthermore, according to the first embodiment, the DOG filter is applied upon the object image whose size is the same as the input image. However, the size of the original image may first be reduced before applying the DOG filter. Then, the DOG filter of effectively greater size can be applied upon the image.

According to the first embodiment, the DOG filter is defined by the difference of two Gaussians with standard deviations $\sigma_e=1.0$ and $\sigma_i=1.6$, and the size of the DOG filter is 7×7 pixels. These values may be changed in accordance with the specific application. It is noted, for example, that as the filter size increases, the small variations in the grey level have less effect upon the produced image, and the overall large-scale characteristics of the objects in the image can be extracted as segments.

Furthermore, in accordance with the first embodiment, the evaluation for each pixel is effected in accordance with the evaluation function whose values are shown in FIG. 5. However, the evaluation function may be different from that shown in FIG. 5, provided that it gives a high evaluation value where the value I of the object image and the value R of the reference pattern agree well, and a low evaluation value where the value I of the object image and the value R of the reference pattern agree poorly.

Furthermore, according to the first embodiment, the reference pattern is stored beforehand in the device. However, the reference pattern may be input via a camera, etc., each time the similarity is calculated.

Second Embodiment

Figure 8:
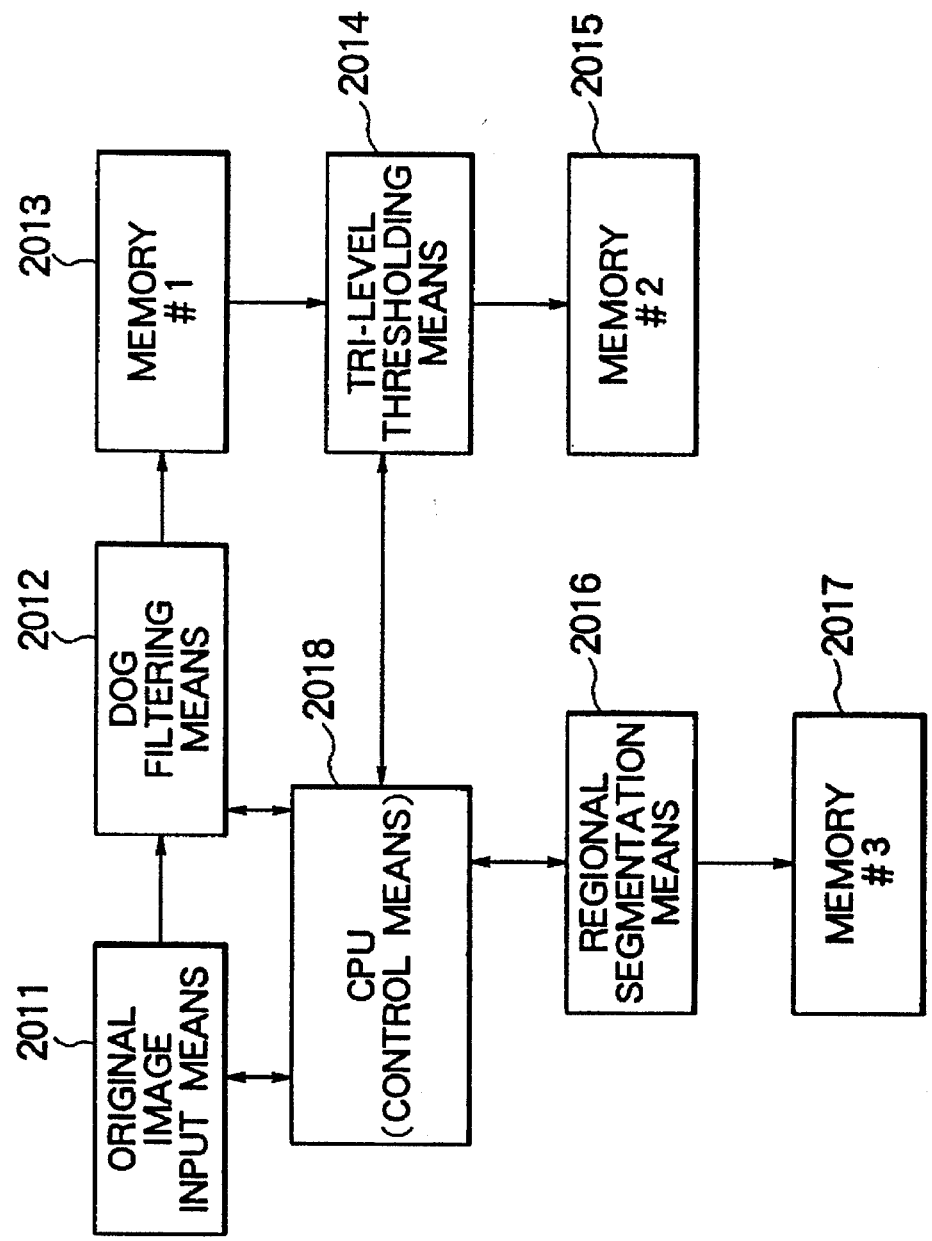
FIG. 8 is a block diagram showing the structure of an image processing device according to a second embodiment of this invention.
Figure 9:
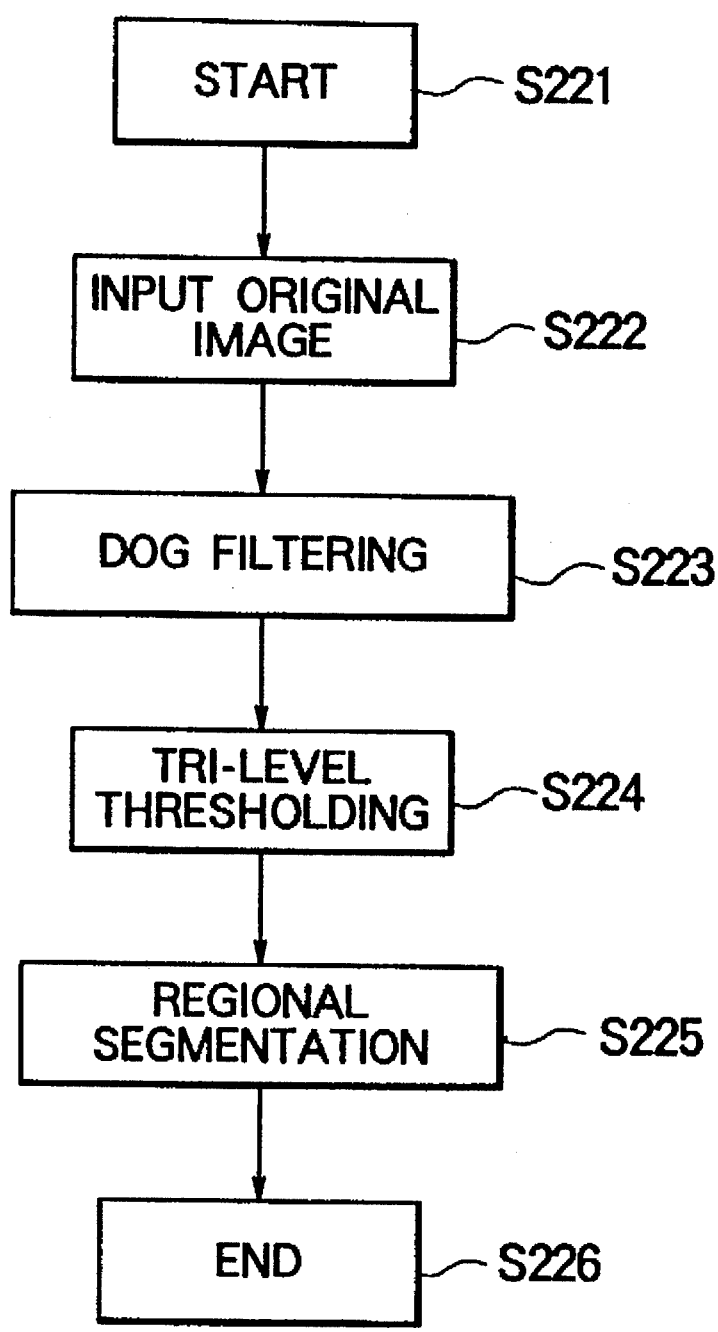
FIG. 9 is a flowchart showing the procedure followed by the image processing device according to the second embodiment.

FIG. 8 is a block diagram showing the structure of an image processing device according to a second embodiment of this invention. FIG. 9 is a flowchart showing the procedure followed by the image processing device according to the second embodiment.

At step S222 after the start at step S221, the original image is input via a camera by means of an object image input means 2011. At step S223, the DOG filtering means 2012 applies the DOG filter upon the original image. As described above, the DOG filter is defined by the DOG (difference of Gaussians) function given by equation (3). The parameters of the DOG filter (the standard deviations of the two Gaussians and the size of the filter) may be the same as those of the first embodiment. Namely, $\sigma_e=1.0$ and $\sigma_i=1.6$, and the digital filter size is 7 times 7 (7×7) pixels. The image obtained by the DOG filtering means 2012 is stored in a memory (#1) 2013.

At step S224, the tri-level thresholding means 2014 effects the tri-level quantization of the image stored in the memory (#1) 2013. The tri-level quantization has been described above by reference to FIGS. 4a through 4c. Namely, FIG. 4a shows the grey level curve along a line extending across the contour line of the original image. The grey level curve 41 rises abruptly across the contour line. It is assumed that the line represented by the abscissa i extends across the contour line. FIG. 4b shows the output curve resulting from the application of the DOG filter upon the image of FIG. 4a. The curve 42 represents the convolution of the grey level curve 41 with the DOG function. FIG. 4c shows the curve obtained from the curve of FIG. 4b by means of the tri-level quantization. Here, tri-level quantization means thresholding the curve 42 with two distinct threshold levels th1 (421) and th2 (422) to obtain a tri-level signal 43. In the case of this image processing device, the two threshold levels are selected such that th1>0, th2<0, and th1=–th2. The tri-level signal 43 is obtained by converting the grey level of the image to +1 when the level of the curve 42 is above the first threshold level th1; to 0 when the level of the curve 42 is between the first and the second threshold levels th1 and th2; and to –1 when the level of the curve 42 is less than the level of the second threshold level th2. The tri-level image thus obtained is stored in a memory (#2) 2015.

Figure 10A:
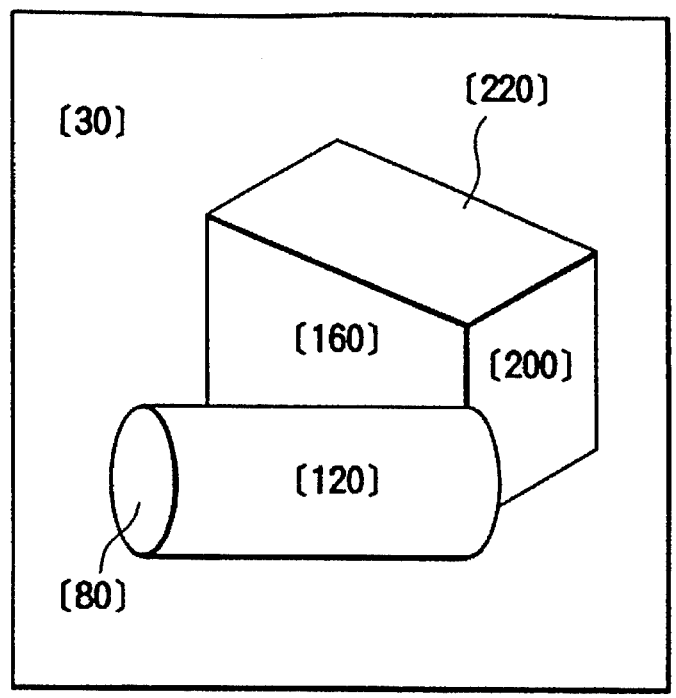
FIG. 10a is a diagram showing the original image depicting two three-dimensional objects, a cylinder and a rectangular block.
Figure 10B:
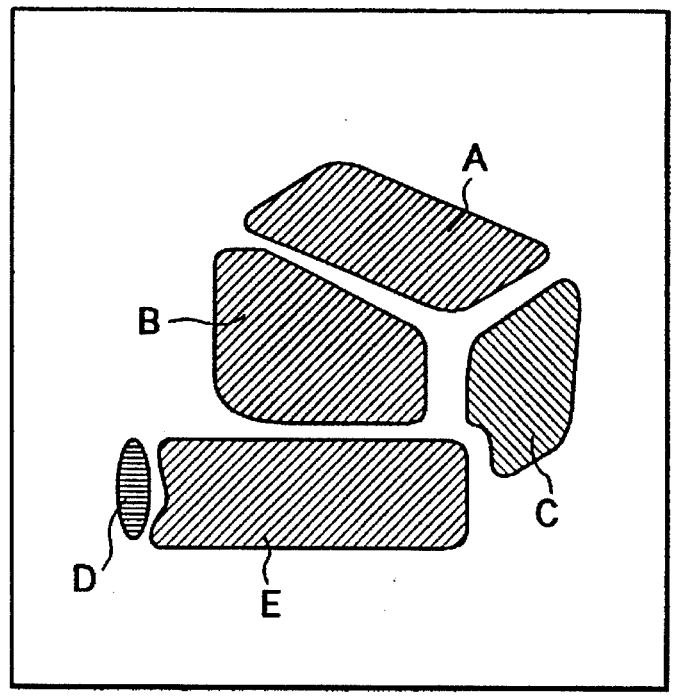
FIG. 10b is a diagram showing the segmented image obtained in accordance with the second embodiment.

At step S225, the image in the memory (#2) 2015 is subjected to segmentation by means of the regional segmentation means 2016. At step S226, the segmented image thus obtained is stored in a memory (#3) 2017, and the procedure terminates. FIG. 10a is a diagram showing the original image depicting two three-dimensional objects, a cylinder and a rectangular block. The numerical values within the brackets represent the grey levels of respective regions. FIG. 10b is a diagram showing the segmented image obtained in accordance with the second embodiment. The regional segments shown in FIG. 10b are stored in the memory (#3) 2017. The regions A, B, C, D, and E are the segmented regions (regional segments). The procedure of FIG. 9 is controlled by the CPU (control means) 2018.

By the way, according to the second embodiment, the original image and the output of the DOG filtering means are stored in respective memory. However, the DOG filtering and the tri-level quantization can be performed by means of the raster scanning. Thus these processes may be pipelined, thereby eliminating the need for the intermediate temporary memories.

Furthermore, according to the second embodiment, the output of the tri-level thresholding means 2014 is stored in the memory (#2) 2015 and thence is input to the regional segmentation means 2016. However, the image stored in the memory (#1) 2013 may directly read out therefrom and input to the regional segmentation means 2016, such that the tri-level quantization is effected simultaneously with the segmentation.

Still further, as in the case of the first embodiment, the two threshold levels th1 and th2 are selected such that th1=-th2. However, this is not a necessity. For example, the two threshold levels may be selected such that th1=-(⅔)th2.

Still further, according to the second embodiment, the original image input via a camera is directly processed by the DOG filter. However, the image may first be subjected to a preprocessor to remove the noise, etc.

Furthermore, according to the second embodiment, the DOG filter is applied upon the original image whose size is the same as the input image. However, the size of the original image may first be reduced before, applying the DOG filter. Then, a DOG filter of effectively greater size can be applied upon the image.

According to the second embodiment, the DOG filter is defined by the difference of two Gaussians with standard deviations $\sigma_e=1.0$ and $\sigma_i=1.6$, and the size of the DOG filter is 7×7 pixels. These values may be changed in accordance with the specific application. It is noted, for example, that as the filter size increases, the small variations in the grey level have less effect upon the produced image, and the overall (large-scale) characteristics of the objects in the image can be extracted as segments.

Further, according to the second embodiment, the CPU (control means) 2018 is implemented by a CPU. However, the DOG filtering means 2012, the tri-level thresholding means 2014, and the regional segmentation means 2016 may be pipelined, to simplify the control and eliminate the need for the CPU.

Third Embodiment

Figure 11:
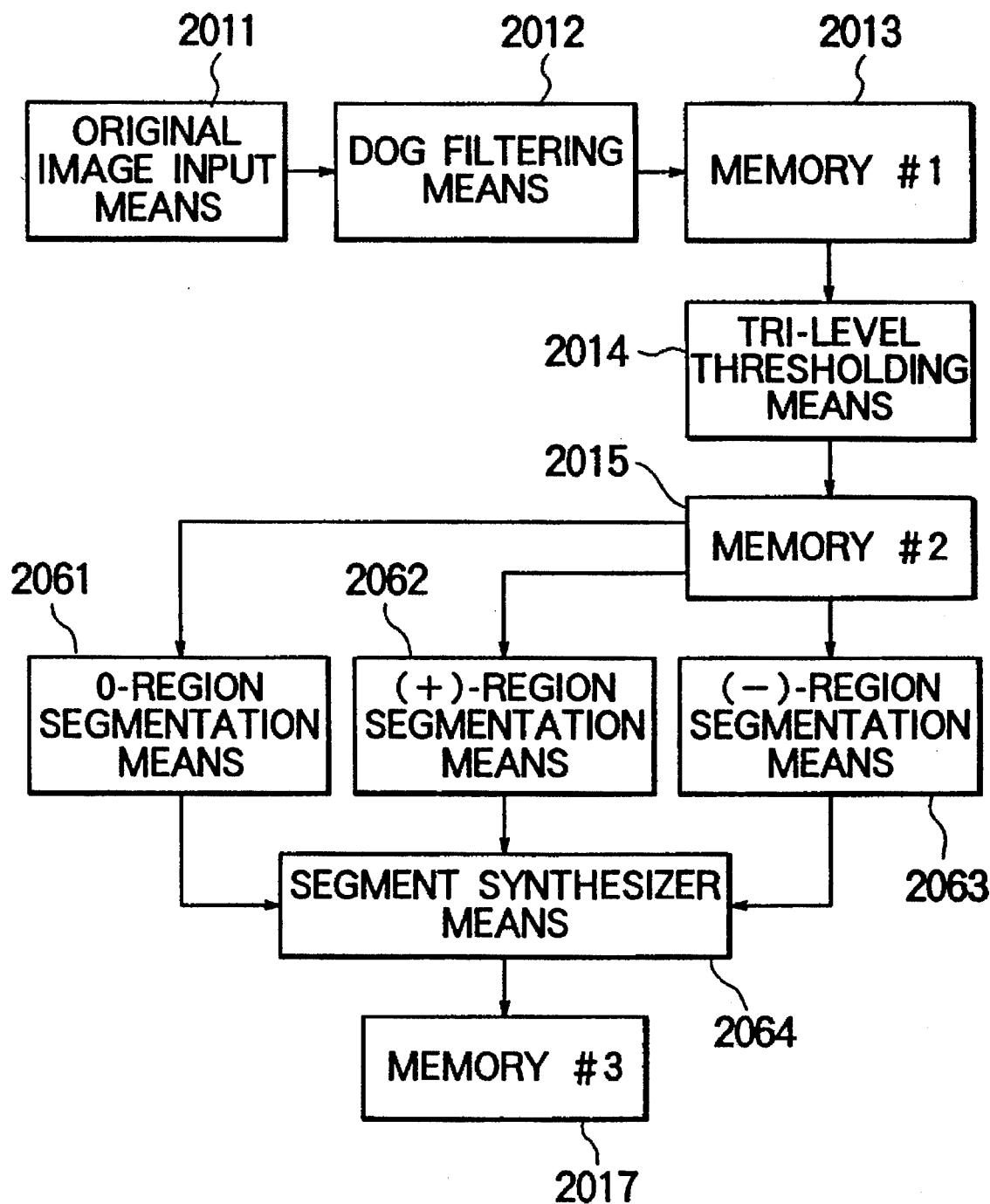
FIG. 11 is a block diagram showing the structure of an image processing device according to a third embodiment of this invention.
Figure 12:
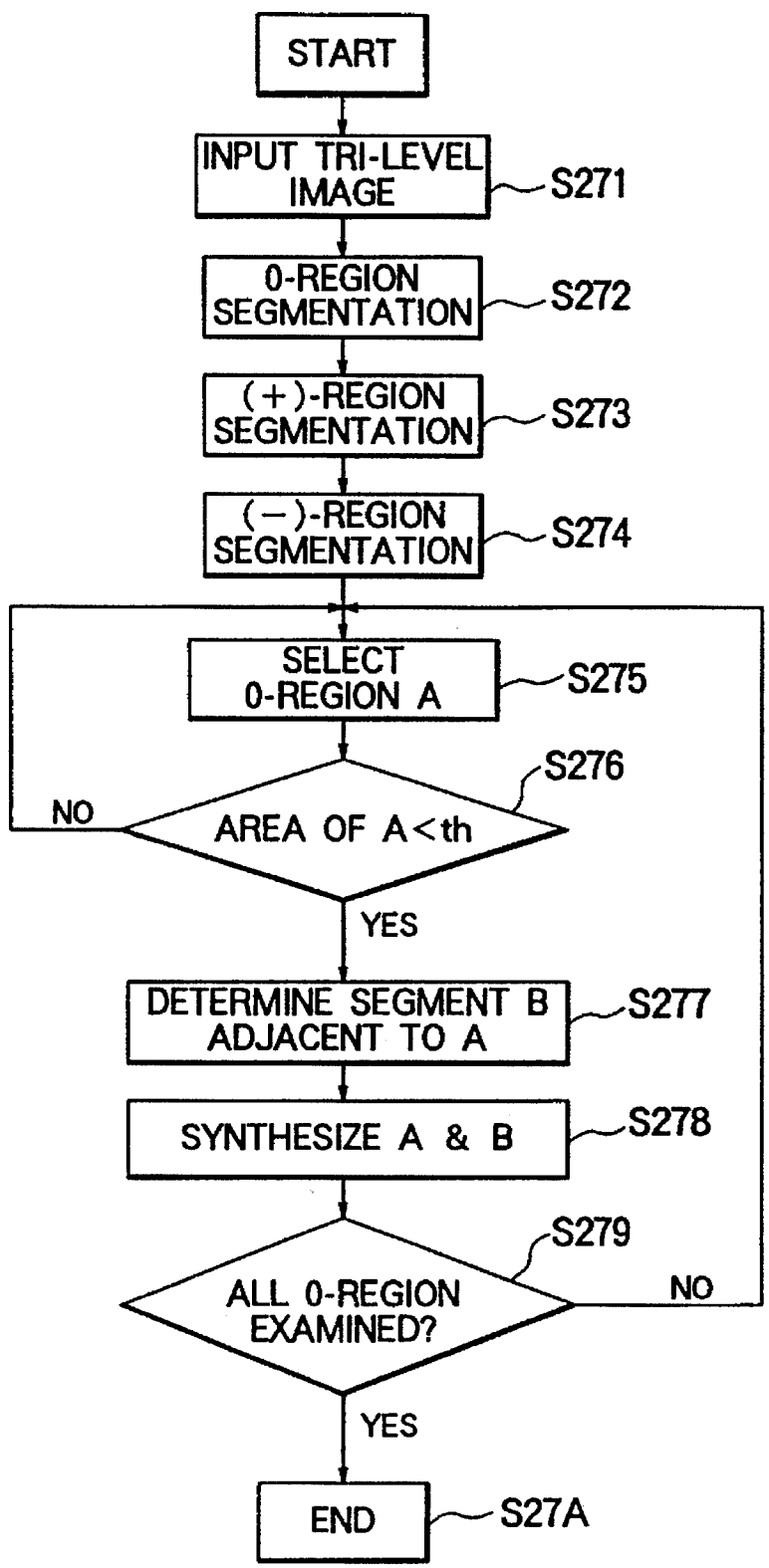
FIG. 12 is a flowchart showing the procedure followed by the image processing device according to the third embodiment.

FIG. 11 is a block diagram showing the structure of an image processing device according to a third embodiment of this invention. FIG. 12 is a flowchart showing the procedure followed by the image processing device according to the third embodiment. Next the procedure according to the third embodiment is described.

First, the original image is input via a camera by means of an object image input means 2011. Then, the DOG filtering means 2012 applies the DOG filter upon the original image. As described above, the DOG filter is defined by the DOG (difference of Gaussians) function given by equation (3). The parameters of the DOG filter (the standard deviations of the two Gaussians and the size of the filter) may be the same as those of the first embodiment. The image obtained by the DOG filtering means 2012 is stored in a memory (#1) 2013.

Further, the tri-level thresholding means 2014 effects the tri-level quantization of the image stored in the memory (#1) 2013. The tri-level quantization is described above by reference to FIGS. 4a through 4c. The tri-level image thus obtained is stored in a memory (#2) 2015. These steps corresponds to the steps S221 through S224 of FIG. 9.

At step S271 the tri-level image is read out from the memory (#2) 2015 and input to a 0-region segmentation means 2061, a (+)-region segmentation means 2062, and a (−)-region segmentation means 2063. At step S272, the 0-region segmentation means 2061 segments exclusively the 0-valued pixels of the tri-level image, and stores the resulting segments in an internal temporary memory (not shown). Similarly, at step S273, the (+)-region segmentation means 2062 segments exclusively those pixels of the tri-level image whose value is +1, and stores the resulting segments in the internal temporary memory. Further, at step S274, the (−)-region segmentation means 2063 segments exclusively those pixels of the tri-level image whose value is −1, and stores the resulting segments in the internal temporary memory.

Figure 13A:
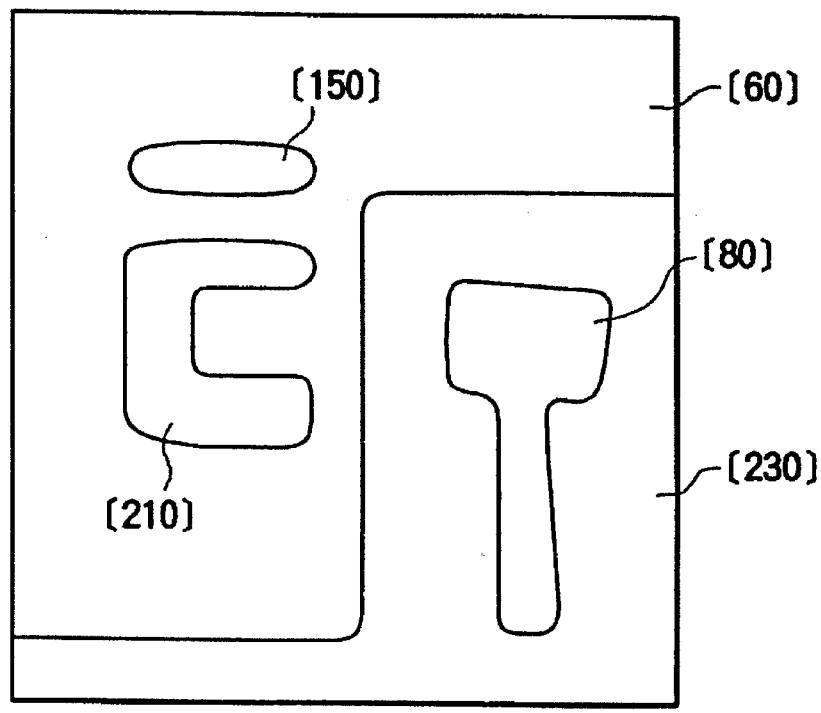
FIG. 13a is a schematic diagram showing the original image depicting a two-dimensional pattern.

FIG. 13a is a schematic diagram showing the original image depicting a two-dimensional pattern. The numerical values within the brackets represent the grey level of the pixels within the regions enclosed by the respective contour curves. It is assumed that the larger value represents brighter shade. For example, the I- and the U-shaped regions with the grey levels [150] and [210] shown in the left half of FIG. 13a are regions that are brighter than the surrounding region with the grey level [60]. Thus, the grey level distribution along an arbitrary line (not shown) running across a contour curve is represented by a curve like the grey level curve 41 of FIG. 4a. As to the description of the DOG filtering and the tri-level quantization processes by means of the DOG filtering means 2012 and the tri-level thresholding means 2014, respectively, and the resulting level distribution (along an arbitrary curve) of the images stored in the memory (#1) 2013 and the tri-level thresholding means 2014, respectively, reference is made to FIGS. 4b and 4c and the description above with reference thereto.

Figure 13B:
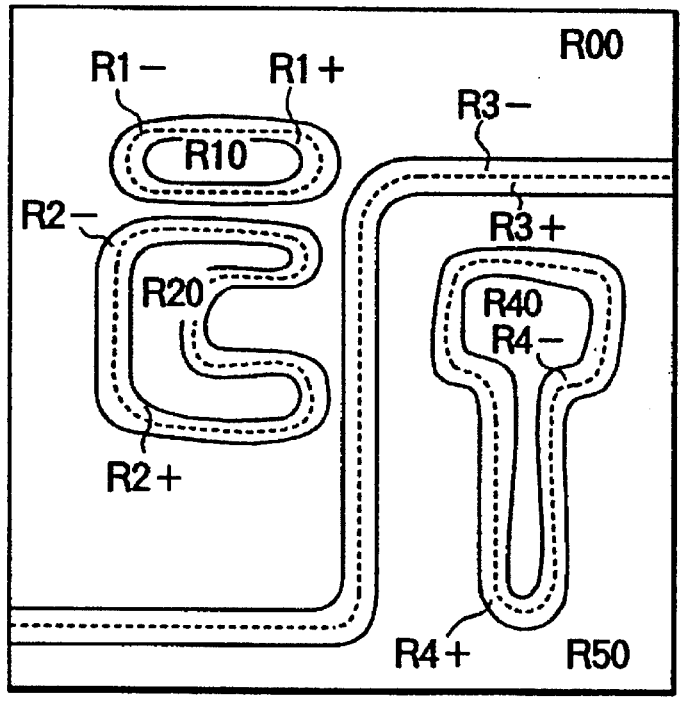
FIG. 13b is a schematic diagram showing the segmented image (the collection of regional segments) produced by means of the 0-region segmentation means 2061, the (+)-region segmentation means 2062 and the (−)-region segmentation means 2063, and stored in the internal memory of the image processing device of FIG. 11.

FIG. 13b is a schematic diagram showing the segmented image (the collection of regional segments) produced by means of the 0-region segmentation means 2061, the (+)-region segmentation means 2062 and the (−)-region segmentation means 2063, and stored in the internal memory of the image processing device of FIG. 11. The regions R00, R10, R20, R30, R40, R50 are the regional segments segmented by means of the 0-region segmentation means 2061. The regions R1+, R2+, R3+, R4+ are the regions segmented by means of the (+)-region segmentation means 2062. The regions R1−, R2−, R3−, R4− are the regions segmented by means of the (−)-region segmentation means 2063. The dotted line representing the zero crossings is shown in FIG. 4c only for the purpose of reference. The zero crossings represent the respective boundaries between the positive regions R1+, R2+, R3+, R4+ and the negative regions R1−, R2−, R3−, R4−.

Figure 14:
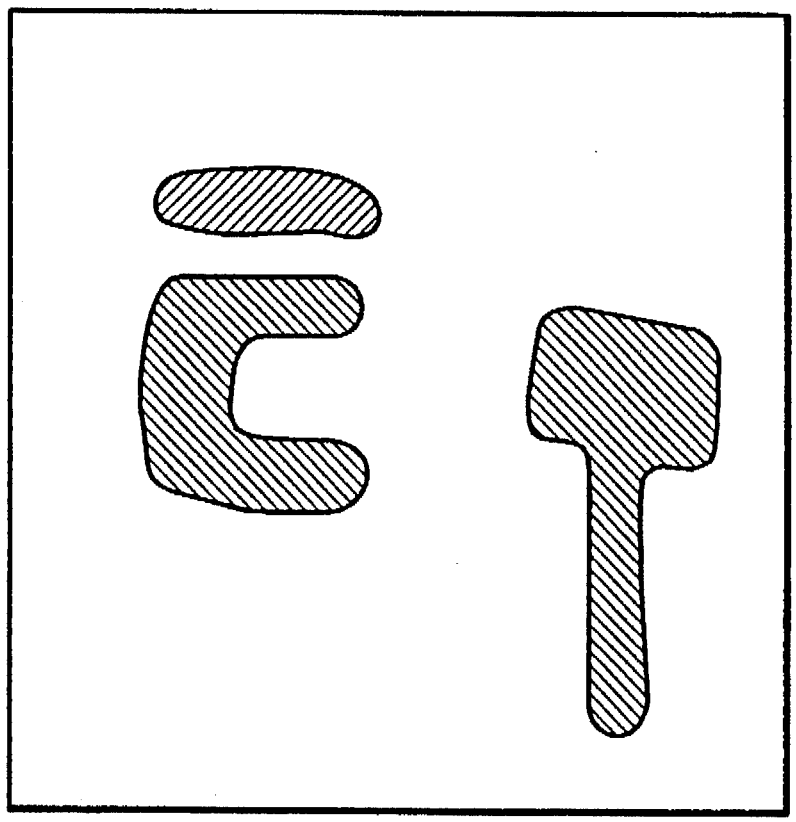
FIG. 14 is a schematic diagram showing the synthesized segments resulting from 0-valued segments whose area is less than the threshold level th.

Next the operation of the segment synthesizer means 2064 is described. At step S275, a 0-region is selected from the image stored in the internal memory. The 0-region selected at step S275 is referred to as region A. At step S276, the area of the region A is compared with a predetermined threshold level th, and it is judged whether or not the area is less than the threshold level th. If the judgment is negative at step S276 (i.e., the area of region A is greater than or equal to the threshold level th), the execution returns to step S275 and a new 0-region A is selected. On the other hand, if the judgment is affirmative at step S276, the execution proceeds to step S277, where a segment adjacent to region A (which is referred to as region B) is selected. FIG. 14 shows the 0-valued segments whose area is less than the threshold level th. (Strictly speaking, FIG. 14 shows the synthesized segments as described in detail below. However, for the purpose of explanation, it may be assumed for the present that FIG. 14 shows the 0-valued segments themselves.) The I- and U-shaped 0-valued regions (the regions R10 and R20 in FIG. 13b) which result from the regions brighter than the surrounding region of the original image (i.e., regions with grey level [150] and [210] surrounded by region with grey level [60] as shown in FIG. 13a) are each encircled by double rings of two adjacent (+)- and (−)-regions: directly by a (+)-region and further by a (−)-region. For example, the region R10 is encircled first by the (+)-region R1+ and then by the (−)-region R1−. The region R20 is encircled first by the (+)-region R2+ and then by the (−)-region R2−. On the other hand, the T-shaped 0-valued region (the region R40 in FIG. 13b) which results from the region of the original image darker than the surrounding region (i.e., region with grey level [80] surrounded by a region with grey level [230] as shown in FIG. 13a) is encircled directly by an adjacent (−)-region R4− and further by a (+)-region R4+. Thus, if the 0-valued region A selected at step S275 is the region R10 or R20, the region B determined at step S277 is the region. R1+ or R2+. On the other hand, if the 0-valued region A selected at step S275 is the region R40, the region B determined at step S277 is the region R4−. Here it is assumed that the 0-valued region A selected first at step S275 is the region R10. Thus, the region B determined at step S277 is region R1+.

At step S278, the regions A and B are synthesized. Namely, the logical sum (i.e., the union) of the regions A and B are obtained. The synthesized region (the union of regions A and B) is stored in the memory (#3) 2017. In FIG. 14, the I-shaped region is the synthesized region resulting from the regions R10 and R1+. The synthesized region (the synthesized segment) is bounded by a zero-crossing line (shown by a dotted line in FIG. 13b) and hence represents a more accurate extraction of a region of the original image. At step S279, it is judged whether or not all the 0-regions are examined. If the judgment is negative, the execution returns to step S275 to repeat the steps S276 through S279. Thus, the 0-regions R20 and R40 (see FIG. 13b) having an area less than the threshold level th are successively synthesized with respective encircling ring-shaped regions R2+ and R4−, respectively, and stored in the memory (#3) 2017. When all the 0-regions are thus processed and the judgment at step S279 finally becomes affirmative, the procedure terminates at step S27A. FIG. 14 shows the collection of the synthesized segments finally stored in the memory (#3) 2017.

By the way in the case of the third embodiment, the 0-valued regions having an area less than a predetermined value are selected and are united with an adjoining segment region. However, the judgement condition at step S276 in FIG. 12 may include additional characteristics of the 0-region, such as the average grey level thereof, so that only the 0-regions which satisfy the judgment condition are selected and united with the an adjoining segment region and are stored in the memory (#3) 2017.

By the way, according to the third embodiment, the original image and the output of the DOG filtering means are stored in respective memory. However, the DOG filtering and the tri-level quantization can be performed by means of the raster scanning. Thus these processes may be pipelined, thereby eliminating the need for the intermediate memories.

Further, in the case of the third embodiment, the output of the tri-level thresholding means 2014 is stored in the memory (#2) 2015 and thence is input to the 0-region segmentation means 2061, the (+)-region segmentation means 2062 and the (−)-region segmentation means 2063. However, the image (the output of the DOG filtering means 2012) stored in the memory (#1) 2013 may directly read out therefrom and input to the 0-region segmentation means 2061, (+)-region segmentation means 2062, and the (−)-region segmentation means 2063, such that the respective regional segmentation and the thresholding processes are performed simultaneously.

Still further, according to the third embodiment, the original is directly processed by the DOG filter. However, the image may first be subjected to a preprocessor to remove the noise, etc.

Furthermore, according to the third embodiment, the DOG filter is applied upon the original image whose size is the same as the input image. However, the size of the original image may first be reduced before applying the DOG filter. Then, a DOG filter of effectively greater size can be applied upon the image.

Still further, in the case of the third embodiment, no overall control means is provided for controlling the units shown by respective boxes in FIG. 11. However, a CPU may be provided for controlling the processing timings, etc., of the respective units.

Furthermore, in the case of the third embodiment, only the region directly adjacent to a 0-region is synthesized therewith. For example, only the region R1+ is united with the 0-region R10. However, the region which is adjacent to the region directly adjacent to the 0-region may further be united and synthesized. For example, in addition to the region R1+, the region R1− may be synthesized with the 0-region R10. Then, the resulting synthesized region includes the zero-crossings therewithin. This method may be more appropriate for certain applications.

Fourth Embodiment

Figure 15:
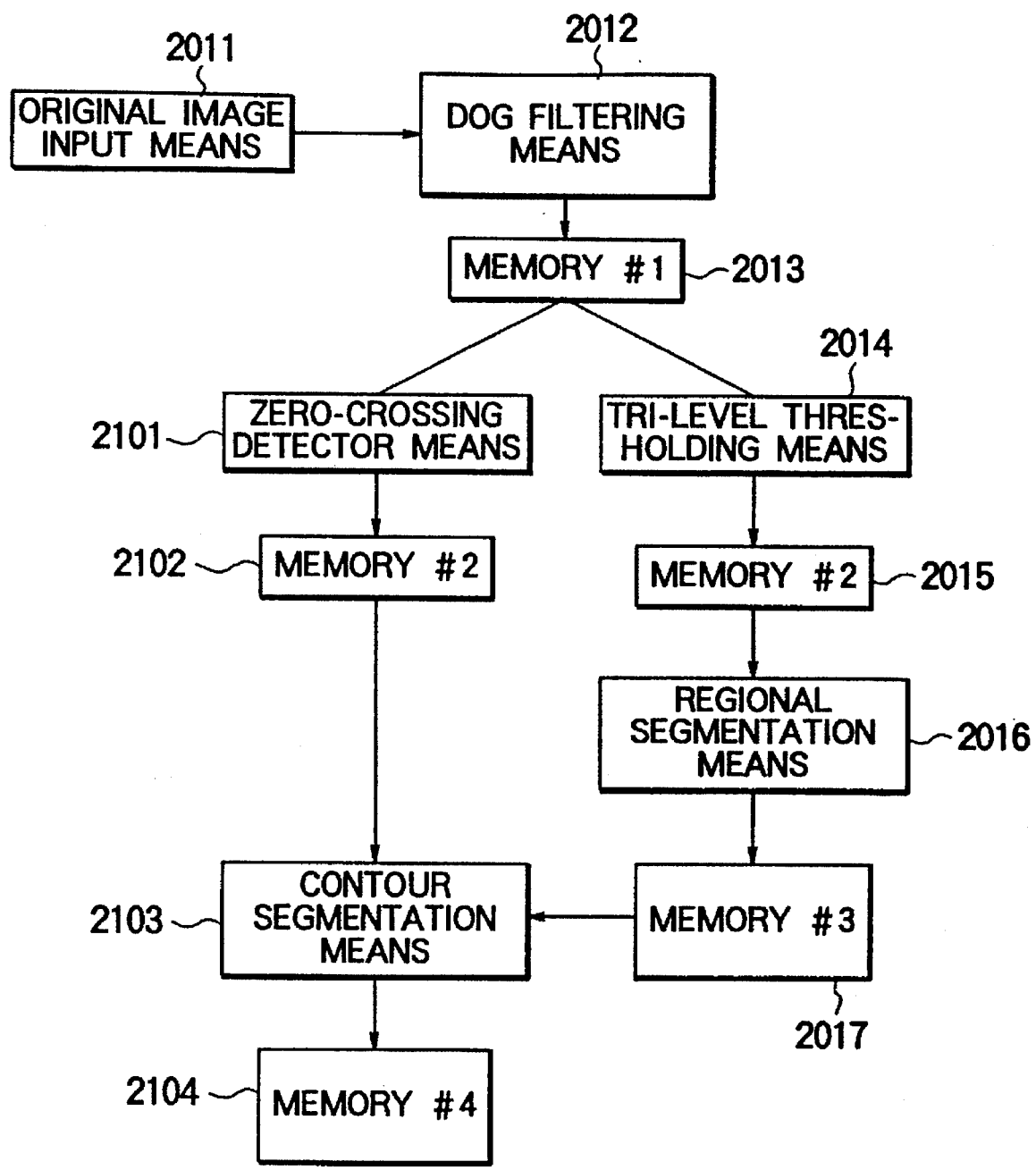
FIG. 15 is a block diagram showing the structure of an image processing device according to a fourth embodiment of this invention.
Figure 16:
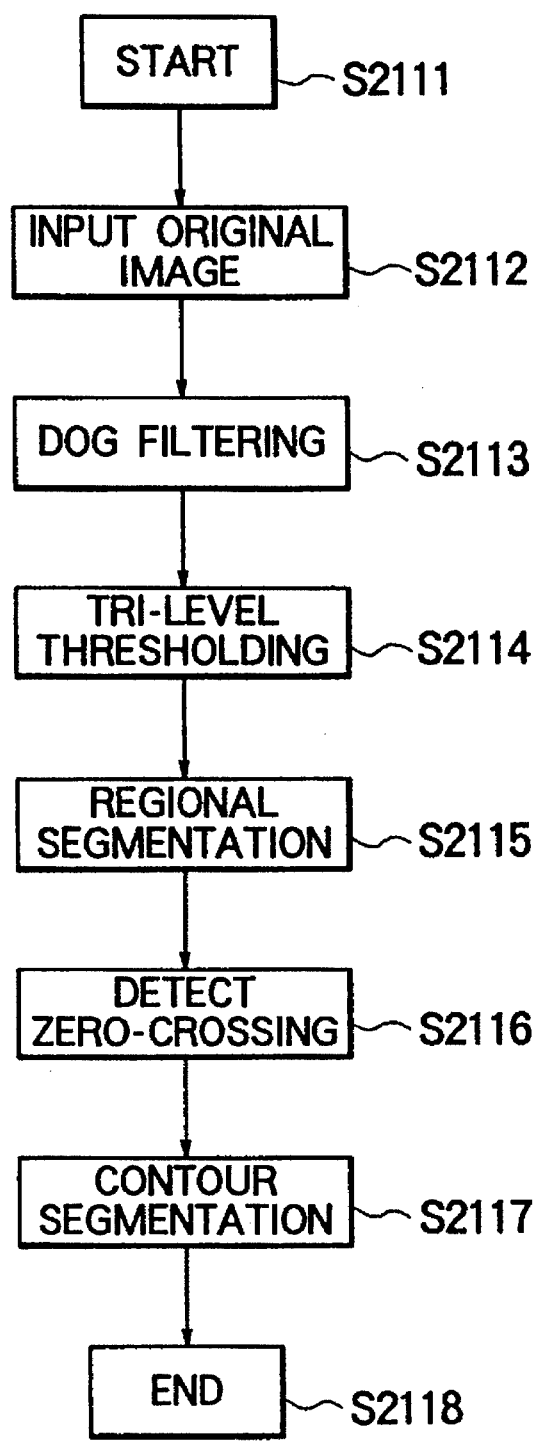
FIG. 16 is a flowchart showing the procedure followed by the image processing device according to the fourth embodiment.

FIG. 15 is a block diagram showing the structure of an image processing device according to a fourth embodiment of this invention. FIG. 16 is a flowchart showing the procedure followed by the image processing device according to the fourth embodiment. Next, the operation of the fourth embodiment is described by reference to FIGS. 15 and 16.

At step S2112 after the start at step S2111, the original image is input via a camera by means of an object image input means 2011. At step S2113, the DOG filtering means 2012 applies the DOG fitter upon the original image. As described above, the DOG filter is defined by the DOG (difference of Gaussians) function given by equation (3). The parameters of the DOG filter (the standard deviations of the two Gaussians and the size of the filter) may be the same as those of the first embodiment. The image obtained by the DOG filtering means 2012 is stored in a memory (#1) 2013.

At step S2114, the tri-level thresholding means 2014 effects the tri-level quantization of the image stored in the memory (#1) 2013. The tri-level quantization is described above by reference to FIGS. 4a through 4c. The tri-level image thus obtained is stored in a memory (#2) 2015.

At step S2115, the tri-level image in the memory (#2) 2015 is subjected to segmentation by means of the regional segmentation means 2016. Only the pixels exhibiting the level between the two tri-level threshold levels th1 and th2 are segmented. The resulting image (consisting of the collection of 0-valued segments ) is stored in the memory (#3) 2017.

Figure 17:
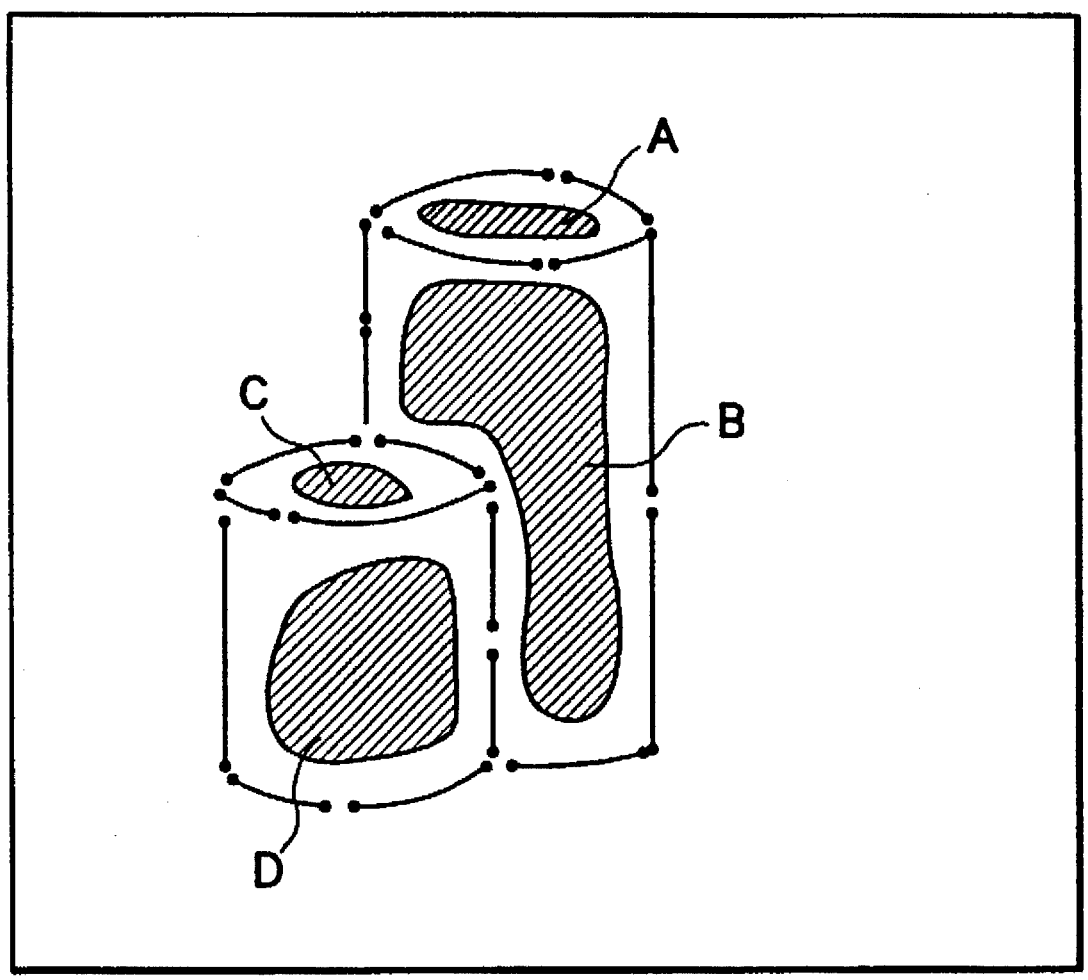
FIG. 17 is a schematic diagram showing the superposed contents (images) stored the memory (#3) 2017 and the memory (#2') 2102 of FIG. 15.

Further at 2116, the output of the DOG filtering means 2012 stored in the memory (#1) 2013 is supplied to a zero-crossing detector means 2101, where the zero-crossings are extracted and stored in a memory (#2') 2102. The zero-crossings consist of those points (pixels) at which the output of the DOG filtering means 2012 vanishes (i.e., is equal to zero). More specifically, the zero-crossings consist of the lines across which the sign of the output of DOG filtering means 2012 changes from minus to plus or from plus to minus. The position of a zero-crossing point is shown in FIG. 4c. FIG. 17 is a schematic diagram showing the superposed contents (images) stored the memory (#3) 2017 and the memory (#2') 2102 of FIG. 15. The segmented regions A, B, C, D (stored in the memory (#2) 2015) are surrounded by the zero-crossing lines (stored in the memory (#2') 2102) representing the contours of the objects depicted in the original image. The zero-crossing lines, represented by broken lines in FIG. 17, surround the respective regions A, B, C, D at a distance.

Next the operation of the contour segmentation means 2103 at step S2117 is described. For each pixel at the zero-crossing stored in the memory (#2') 2102, a regional segment stored in the memory (#3) 2017 which is closest to the pixel is determined and the segment number of the closest segment is assigned to the pixel at the zero-crossing. It is assumed that the segments stored in the memory (#3) 2017 are assigned respective identifying numbers.

Figure 18:
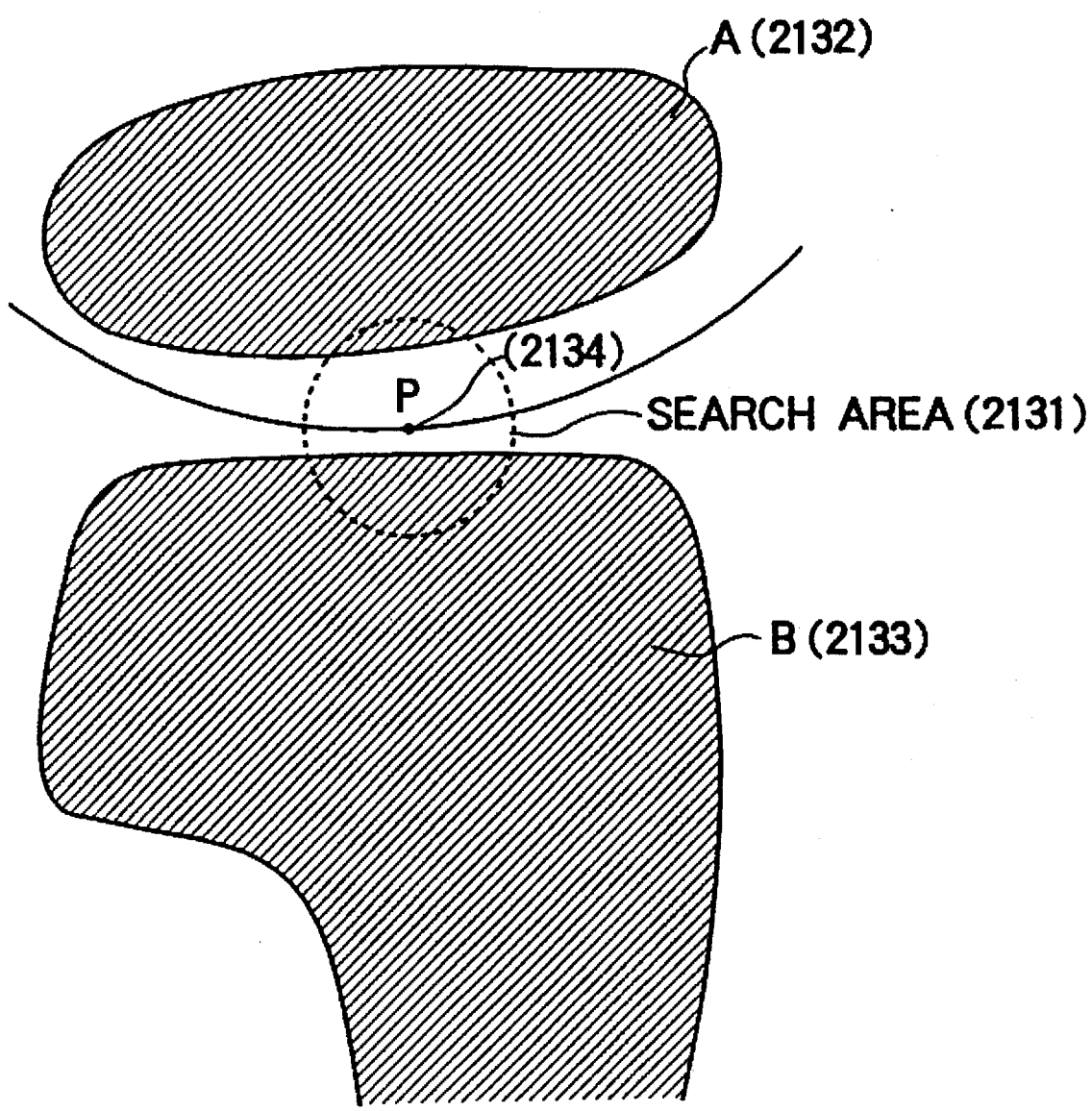
FIG. 18 is a diagram showing a zero-crossing point P together with neighboring segment regions A and B.

FIG. 18 is a diagram showing a zero-crossing point P together with neighboring segment regions A and B. It is assumed that the zero-crossing point P is currently processed at step S2117. The broken circle of a predetermined radius represents the search area 2131 in which the segment (stored in the memory (#3) 2017) closest to the point P is searched for. Under the circumstance shown in FIG. 18, both the segment regions A 2132 and B 2133 are present within the search area 2131. However, the region closest to the current point P is the region B. Thus, to the point P is allotted the segment number of the region B 2133. The segment numbers allotted to the pixel points upon the zero-crossing lines are stored in the memory (#4) 2104. When all the zero-crossing points are each assigned a segment number at step S2117, the procedure of FIG. 16 terminates at step S2118. The contour segments (the zero-crossing line segments with respective segmentation numbers) stored in the memory (#4) 2104 represents the contours of the original image.

By the way, according to the fourth embodiment, the original image and the output of the DOG filtering means are stored in respective memories. However, the DOG filtering and the tri-level quantization can be performed by means of the raster scanning. Thus these processes may be pipelined, thereby eliminating the need for the intermediate memories.

Furthermore, according to the fourth embodiment, the output of the tri-level thresholding means 2014 is stored in the memory (#2) 2015 and thence is input to the regional segmentation means 2016. However, the image stored in the memory (#1) 2013 may directly read out therefrom and input to the regional segmentation means 2016, such that the tri-level quantization is effected simultaneously with the segmentation.

Furthermore, according to the fourth embodiment, the DOG filter is applied upon the original image whose size is the same as the input image. However, the size of the original image may first be reduced before applying the DOG filter. Then, a DOG filter of effectively greater size can be applied upon the image.

Still further, in the case of the fourth embodiment, no overall control means is provided for controlling the units shown by respective boxes in FIG. 15. However, a CPU may be provided for controlling the processing timings, etc., of the respective units.

Further, in the case of the fourth embodiment, the contours of the original image is obtained by the contour segmentation means 2103 which extracts the zero-crossings from the output of the DOG filtering means 2012. However, edge detector filters, such as the SOBEL and LAPLACIAN, may be used to extract the contours of original image.

Furthermore, according to the fourth embodiment, the segmentation is effected for each pixel upon the zero-crossing lines. However, the zero-crossing lines may first be divided into a plurality of short lines (line elements). Then, the distances to the regional segments from each line element are determined, and each line element is allotted the segment number of the closest region. The contour segments are represented by sets of line elements with segment numbers.

Further, in the case of the fourth embodiment, each zero-crossing point is assigned the segment number of the closest regional segment. However, the segment number of the second closet regional segment may be stored in addition, as the second candidate for the segment number thereof. Then, it can later be determined of which two regions the zero-crossing forms a boundary.

Still further, the features of the second through fourth embodiments described separately above may be combined. For example, the regional segmentation means of the fourth embodiment may be implemented in a manner similar to those of the second and the third embodiments.

Furthermore, it is possible to use the method of second embodiment when the original image is three-dimensional objects and the method of the third embodiment when the original image is a two-dimensional pattern.

Fifth Embodiment

Figure 19:
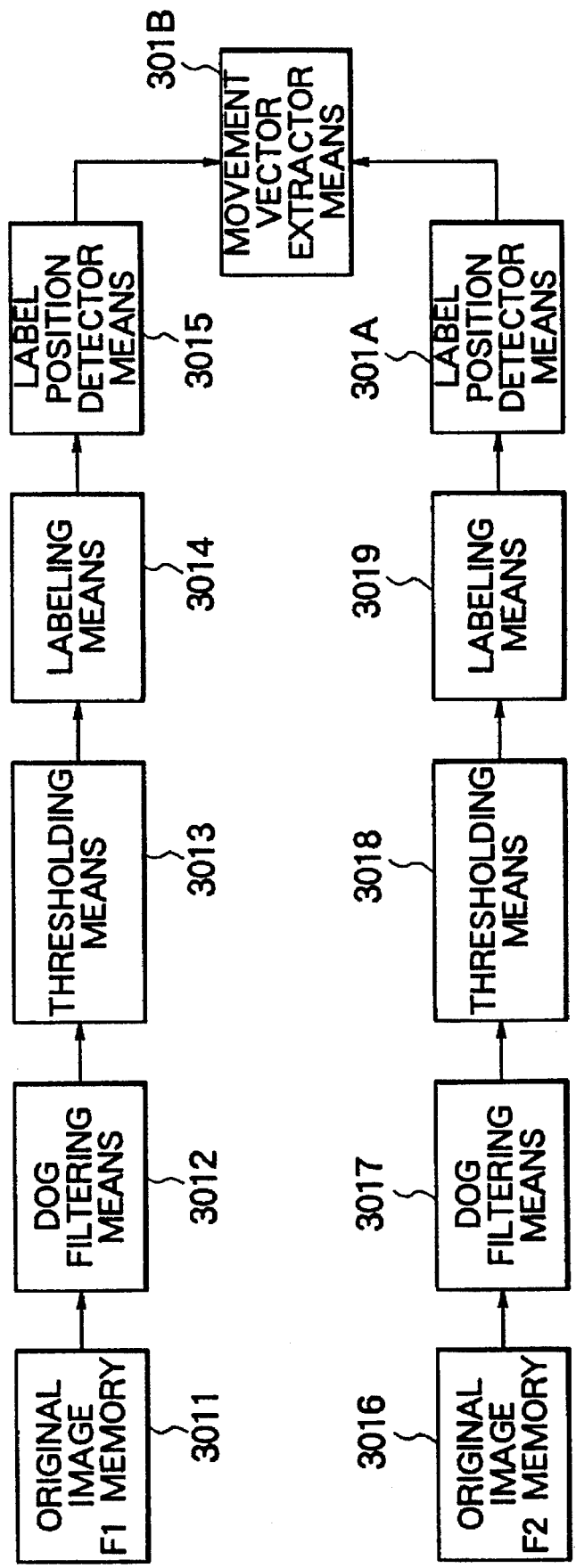
FIG. 19 is a block diagram showing the structure of an image processing device according to a fifth embodiment of this invention.
Figure 20:
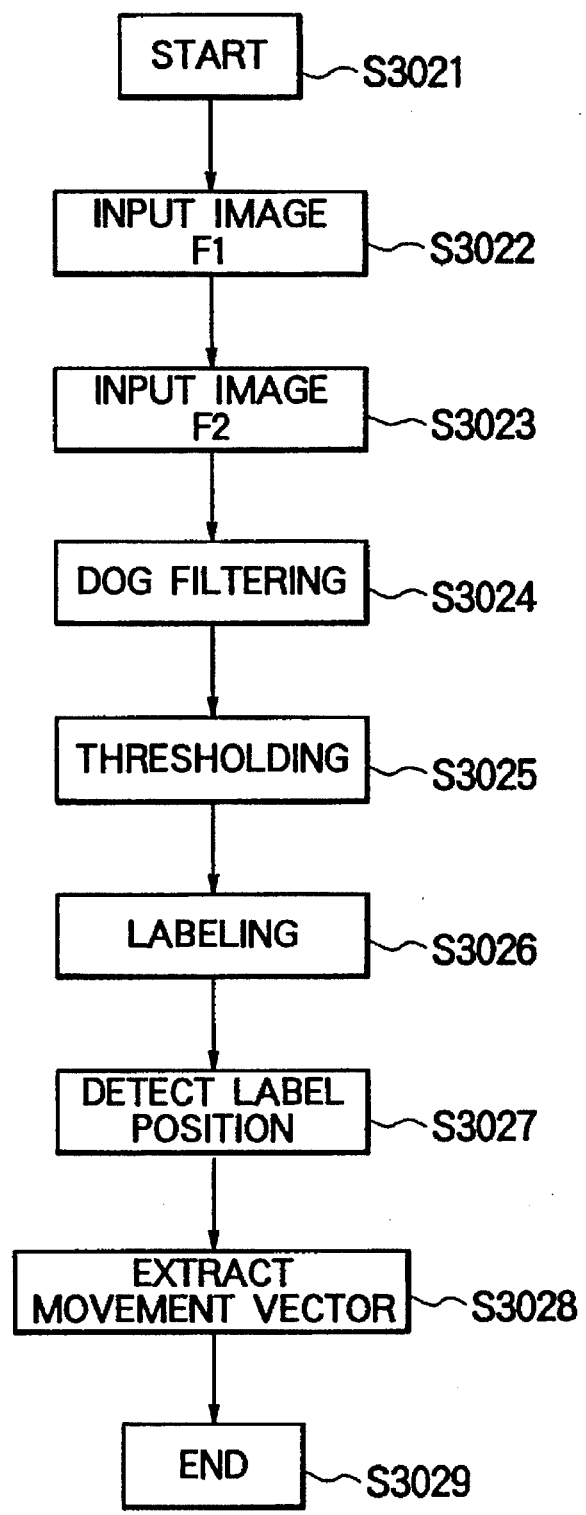
FIG. 20 is a flowchart showing the procedure followed by the image processing device according to the fifth embodiment.

FIG. 19 is a block diagram showing the structure of an image processing device according to a fifth embodiment of this invention. FIG. 20 is a flowchart showing the procedure followed by the image processing device according to the fifth embodiment. The operation of the image processing device is described by reference to FIGS. 19 and 20.

Figure 22A:
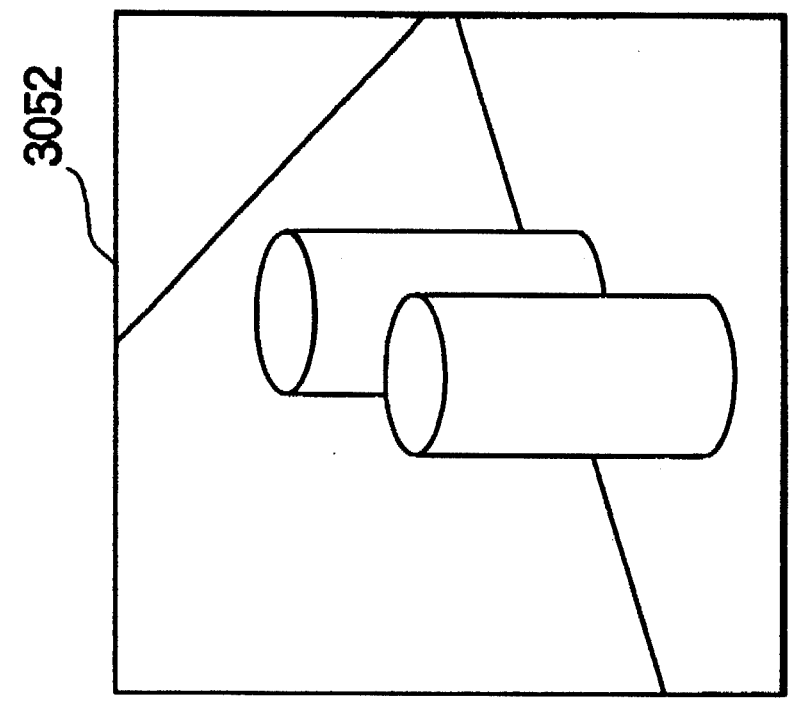
FIG. 22a shows an original image F1 depicting two cylindrical objects.
Figure 22B:
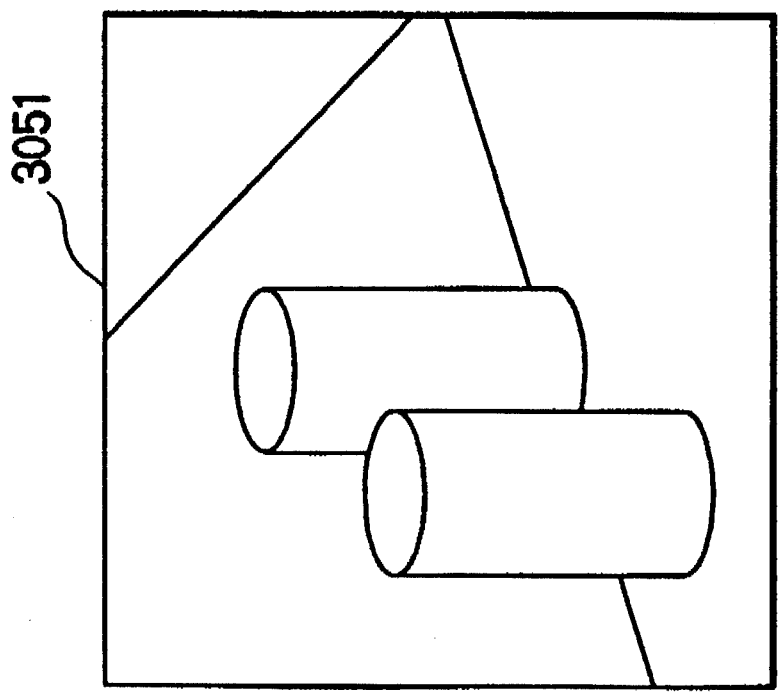
FIG. 22b shows an original image F2 depicting the same objects as FIG. 22a after a predetermined interval.

At step S3022 after the start at step S3021, the original image F1 is input to the image processing device and stored in a original image F1 memory 3011. Similarly, at step S3023, the original image F2 is input to the image processing device and stored in a original image F2 memory 3016. The second image F2 depicts the same objects as the first image F1 after a predetermined interval, which is equal to 33 milliseconds in the case of this embodiment. FIG. 22a shows an original image F1 depicting two cylindrical objects. FIG. 22b shows an original image F2 depicting the same objects as FIG. 22a after a predetermined interval. Both the two cylindrical objects (toy blocks) move to the left during the intervening interval between the first image F1 and the second image F2.

At step S3024, the first and the second images are subjected to the DOG filtering process by means of the DOG filtering means 3012 and 3017, respectively.

Figure 21:
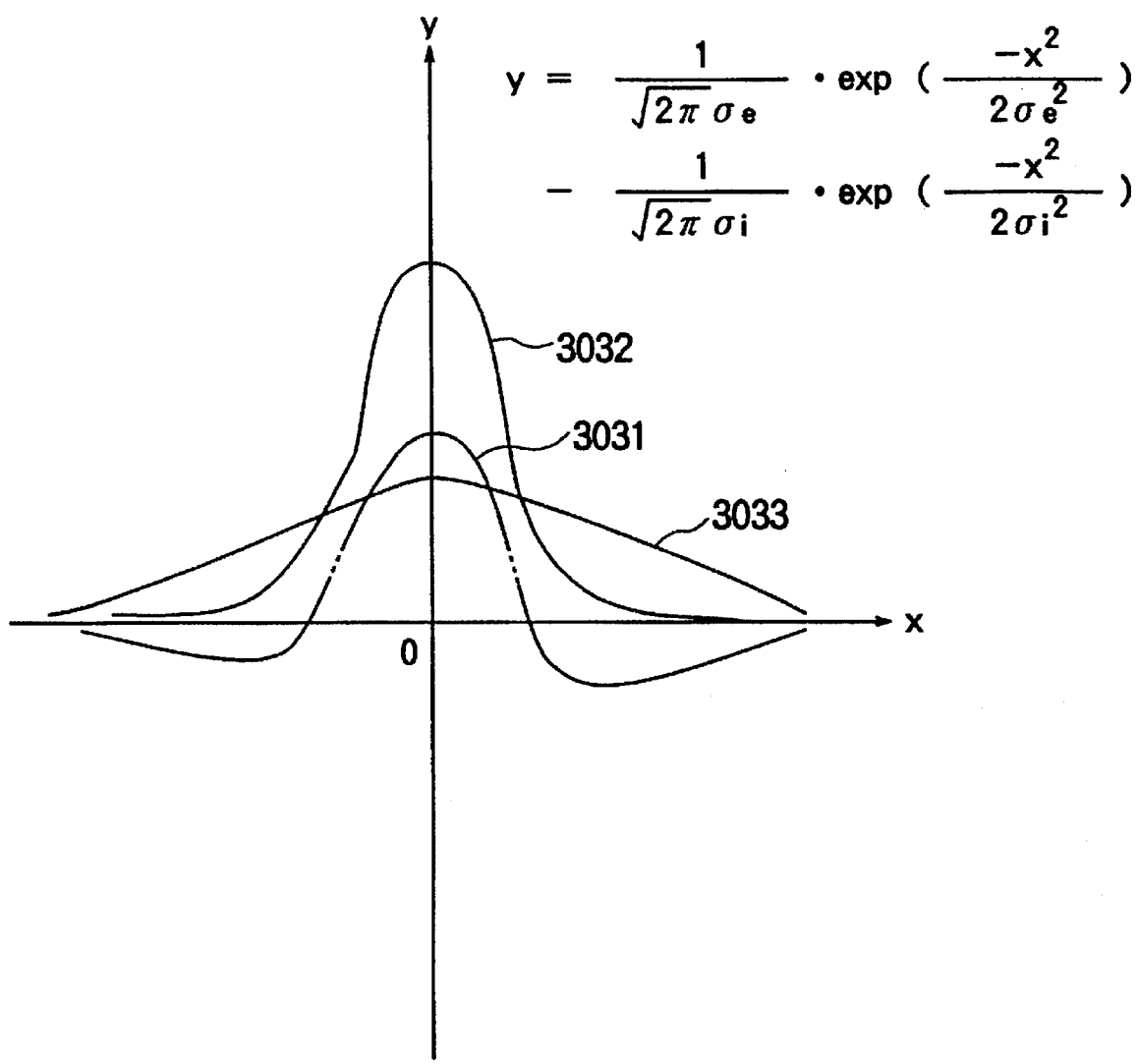
FIG. 21 shows an example of the one-dimensional DOG function.

In the one dimensional case, the DOG function is given by the above equation (2), which is a difference of two Gaussians. FIG. 21 shows an example of the one-dimensional DOG function 3031 as given by the above equation (2), where the first term at the right side is represented by a Gaussian function 3032 and the second term at the right side is represented by a Gaussian function 3033. In the case of the image processing device, two-dimensional images are processed. Thus, the DOG filter is defined by the equation (3) as described above. In the case of this embodiment, $\sigma_e = 1.0$ and $\sigma_i = 1.6$, and the digital filter size is 7 times 7 (7×7) pixels.

At step S3025, the outputs of the DOG filtering means 3012 and 3017 are thresholded by means of the thresholding means 3013 and 3018, respectively. FIGS. 4a through 4c shows the effect of the DOG filter and the tri-level quantization. FIG. 4a shows the grey level curve along a line extending across the contour line of the original image. It is assumed that the line represented by the abscissa i extends across a contour line. FIG. 4b shows the output curve resulting from the application of the DOG filter upon the image of FIG. 4a. The curve 42 represents the convolution of the grey level curve 41 with the DOG function. FIG. 4c shows the curve obtained from the curve of FIG. 4b by means of the tri-level quantization. Here, tri-level quantization means thresholding the curve 42 with two distinct threshold levels th1 (421) and th2 (422) to obtain a tri-level signal 43. In the case of this image processing device, the two threshold levels are selected such that th1>0, th2<0, and th1=−th2. The tri-level signal 43 is obtained by converting the grey level of the image to +1 when the level of the curve 42 is above the first threshold level th1; to 0 when the level of the curve 42 is between the first and the second threshold levels th1 and th2; and to −1 when the level of the curve 42 is less than the level of the second threshold level th2.

Figure 23A:
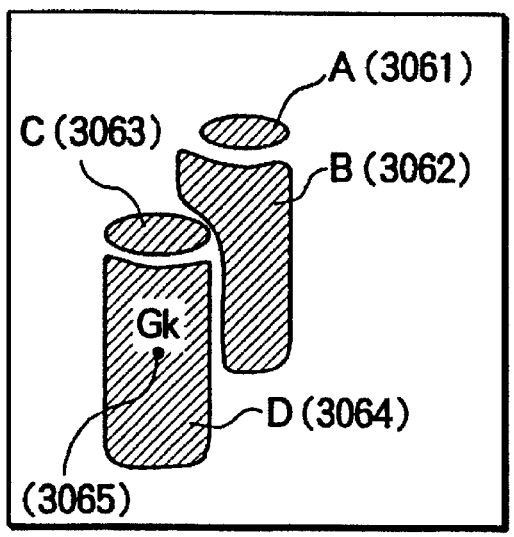
FIG. 23a shows the labeled image corresponding to the first original image F1.
Figure 23B:
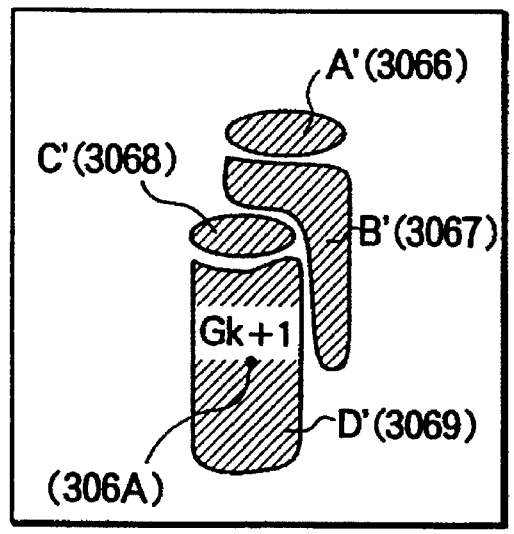
FIG. 23b shows the labeled image corresponding to the second original image F2.

At step S3026, the output images of the thresholding means 3013 and 3018 are processed by means of the labeling means 3014 and 3019, respectively, such that a plurality of regions in respective images are extracted. In the case of this fifth embodiment, the 0-valued regions of the threshold level image (see FIG. 4c) are extracted and labeled. FIGS. 23a and 23b shows the results of the labeling. FIG. 23a shows the labeled image corresponding to the first original image F1 3051. FIG. 23b shows the labeled image corresponding to the second original image F2 3052. The shaded regions in FIG. 23a are labeled with A 3061, B 3062, C 3063, D 3064. Similarly, the shaded regions in FIG. 23b are labeled with A' 3066, B' 3067, C' 3068, D' 3069. Here the labeling is performed for segments whose area is less than a predetermined value. As noted above by reference to FIGS. 4c in the description of the first embodiment, 0-level regions of of the tri-level image generally represent regions of the original image within which the variation of the grey level is small.

At step S3027, the label positions of the regions in respective images output from the labeling means 3014 and 3019 are detected by the label position detector means 3015 and 301A. In the case of this embodiment, the label position of a labeled region is the center of gravity of the region. Thus, the label position detector means 3015 and 301A calculates the center of gravity of each labeled region. In FIGS. 23a and 23b, the reference characters $G_k$ 3065 and $G_{k+1}$ 306A represent the positions of the centers of gravity of the label D 3064 and the label D' 3069, respectively, calculated by the label position detector means 3015 and 301A.

Figure 23C:
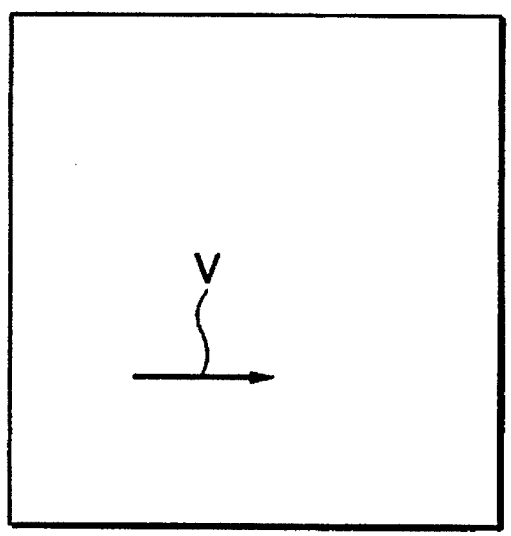
FIG. 23c shows the movement vector extracted from the first and the second images of FIGS. 23a and 23b.

Finally at step S3028, the movement vector extractor means 301B extracts the movement vector with respect to the two images. In the case of this embodiment, the movement vector is determined by the vector (directed line) V connecting the centers of gravity of two corresponding labeled regions of successive two images (the first and the second images of FIGS. 23a and 23b). FIG. 23c shows the movement vector extracted from the first and the second images of FIGS. 23a and 23b. Assume, for example, that the starting point of the movement vector is the center of gravity $G_k$ of the label D within the image F1 (FIG. 23a). Then, the movement vector V is determined as the vector connecting the center of gravity $G_k$ of the label D within the image F1 (FIG. 23a) to the center of gravity $G_{k+1}$ of the label D' within the image F2 (FIG. 23b). The ending label position (the center of gravity) $G_{k+1}$ of the movement vector V can be determined as the label position in the image F2 which is closest to the starting position $G_k$ in the image F1. For the purpose of explanation, the movement of the cylindrical objects from FIG. 22a to FIG. 22b or the movement of the regions from FIG. 23a to 23b is shown greater than the actual movement. The actual movement is about one hundredth (1/100) of that shown in these figures. Thus, the above simple method of determining the end label position of the movement vector is effective for establishing the correspondence of two label positions in the two successive images F1 and F2.

In the case of the fifth embodiment, the original images are first stored in memories. However, the signal from a TV camera, etc., may be directly input to the DOG filtering means or to the grey level information extractor means.

Further, according to the fifth embodiment, the original image input via a camera is directly processed by the DOG filter. However, the image may first be passed through a preprocessor filter to remove the noise, etc.

Furthermore, according to the fifth embodiment, the DOG filter is applied upon the original image whose size is the same as the input image. However, the size of the original image may first be reduced before applying the DOG filter. Then, a DOG filter of effectively greater size can be applied upon the image.

According to the fifth embodiment, the DOG filter is defined by the difference of two Gaussians with standard deviations $\sigma_e=1.0$ and $\sigma_i=1.6$, and the size of the DOG filter is 7×7 pixels. These values may be changed in accordance with the specific application.

Furthermore, according to the fifth embodiment, the two threshold levels th1 and th2 are selected such that th1=−th2. However, the two threshold levels may be selected in other ways, and even the tri-level quantization is not a necessity.

Still further, in .the case of the fifth embodiment, the label position detector means 3015 and 301A detects the center of gravity of each labeled region as the label position thereof. However, the label position may be defined differently.

Still further, in the case of the fifth embodiment, the predetermined interval between two successive images is 33 milliseconds. However, the interval may be longer or shorter than this specific value.

Still further, the image processing device according to the fifth embodiment includes separate original image memories, DOG filtering means, thresholding means, labeling means, and label position detector means for processing the two successive image frames simultaneously. However, the two corresponding memories or means may be united into a single unit, wherein the two images are processed successively. Then, the size of the image processing device can be reduced by one half.

Sixth Embodiment

Figure 24:
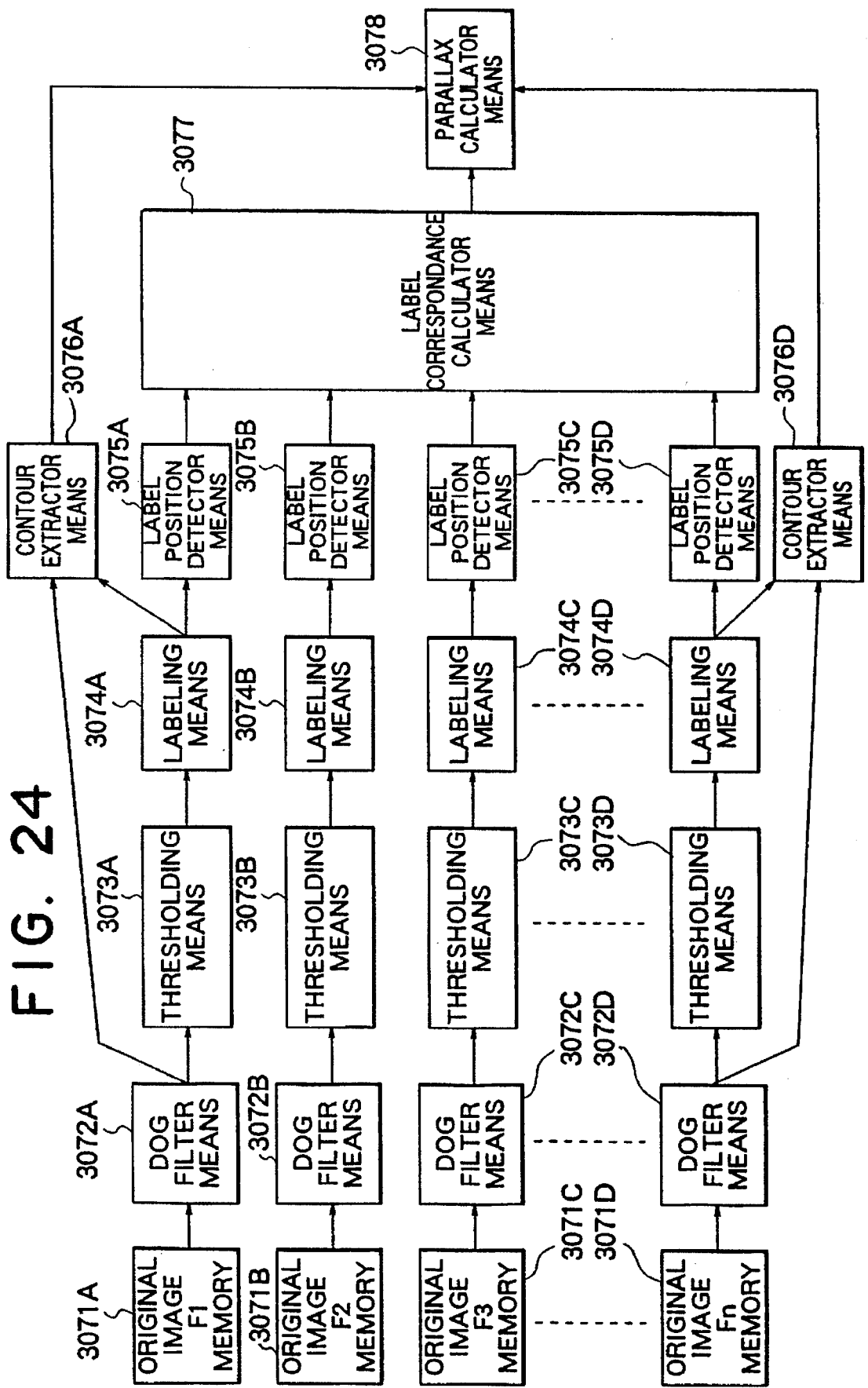
FIG. 24 is a block diagram showing the structure of an image processing device according to a sixth embodiment of this invention.
Figure 25:
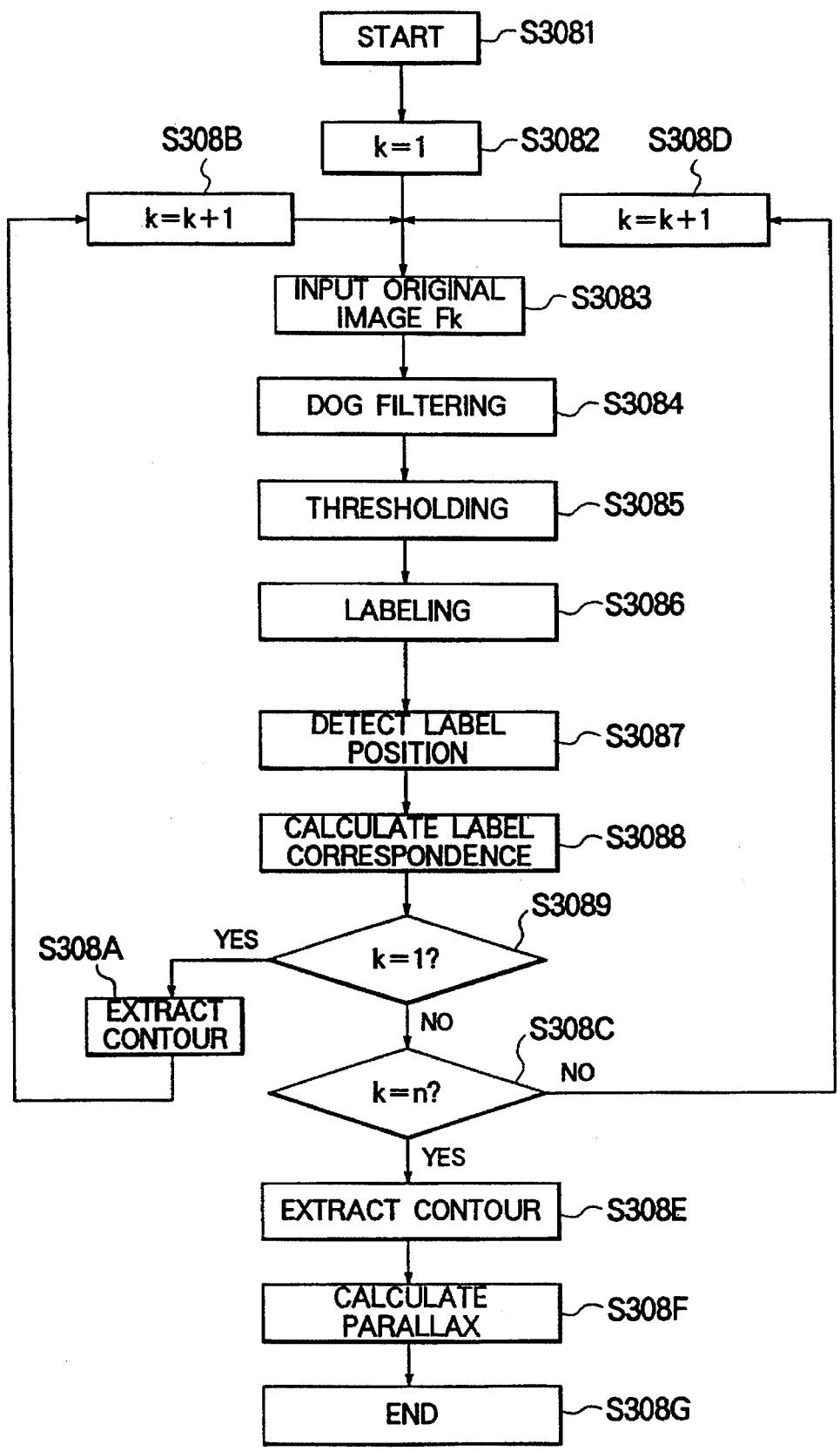
FIG. 25 is a flowchart showing the procedure followed by the image processing device according to the sixth embodiment.

FIG. 24 is a block diagram showing the structure of an image processing device according to a sixth embodiment of this invention. FIG. 25 is a flowchart showing the procedure followed by the image processing device according to the sixth embodiment. The operation of the image processing device is described by reference to FIGS. 24 and 25.

According to the sixth embodiment, n successive frames of images, referred to as the first through n'th frame, are processed, wherein n may be from about 10 to 20. The successive image frames are taken and input at a predetermined interval of 33 milliseconds. The parallax is calculated from the first and the n'th frames. Thus, the three-dimensional depths of objects depicted in the image may be calculated on the basis of the principle of the steroscopic vision.

First at step S3082 after the start at step S3081, the value k of the internal counter is set at one (k=1). It is noted that the value k is incremented by one (k=k+1) as described below each time the steps S3083 through 3088 are performed. Next at step S3083, the image Fk of the k'th frame is input by means of the image input means and stored in the respective original image F1 memory. At the first execution cycle where k=1, the image F1 of the first frame is input and stored. The image F1 of the first frame is stored in the original image F1 memory 3071A. The image F2 of the second frame is stored in the original image F2 memory 3071B. The image F3 of the third frame is stored in the original image F3 memory 3071C. Further, the image Fn of the n'th frame is stored in the original image Fn memory 3071D.

At step S3084, the DOG filtering means applies the DOG filter upon the original image Fk, where k is the value of the internal counter. The DOG filtering means 3072A applies the DOG filter upon the image F1 of the first frame. The DOG filtering means 3072B applies the DOG filter upon the image F2 of the second frame. The DOG filtering means 3072C applies the DOG filter upon the image F3 of the third frame. The DOG filtering means 3072D applies the DOG filter upon the image Fn of the n'th frame. At the first execution cycle where k=1, the DOG filter is applied upon the image F1 of the first frame. In the one dimensional case, the DOG function is given by the above equation (2), which is a difference of two Gaussians. In the case of the image processing device, two-dimensional images are processed. Thus, the DOG filter is defined by the equation (3) as described above. In the case of this embodiment, ($\sigma_e$=1.0 and $\sigma_i$=1.6, and the digital filter size is 7 times 7 (7×7) pixels.

At step S3085, the thresholding means performs the tri-level quantization upon the output of the DOG filtering means. At the first execution cycle where k=1, the thresholding means 3073A performs the tri-level quantization upon the output of the DOG filtering means 3072A. Similarly, at the second execution cycle where k=2, the thresholding means 3073B performs the tri-level quantization upon the output of the DOG filtering means 3072B. At the third execution cycle where k=3, the thresholding means 3073C performs the tri-level quantization upon the output of the DOG filtering means 3072C. At the n'th execution cycle where k=n, the thresholding means 3073D performs the tri-level quantization upon the output of the DOG filtering means 3072D. The tri-level quantization has been described in detail above.

Figures 26A, 26B, 26C, 26D:
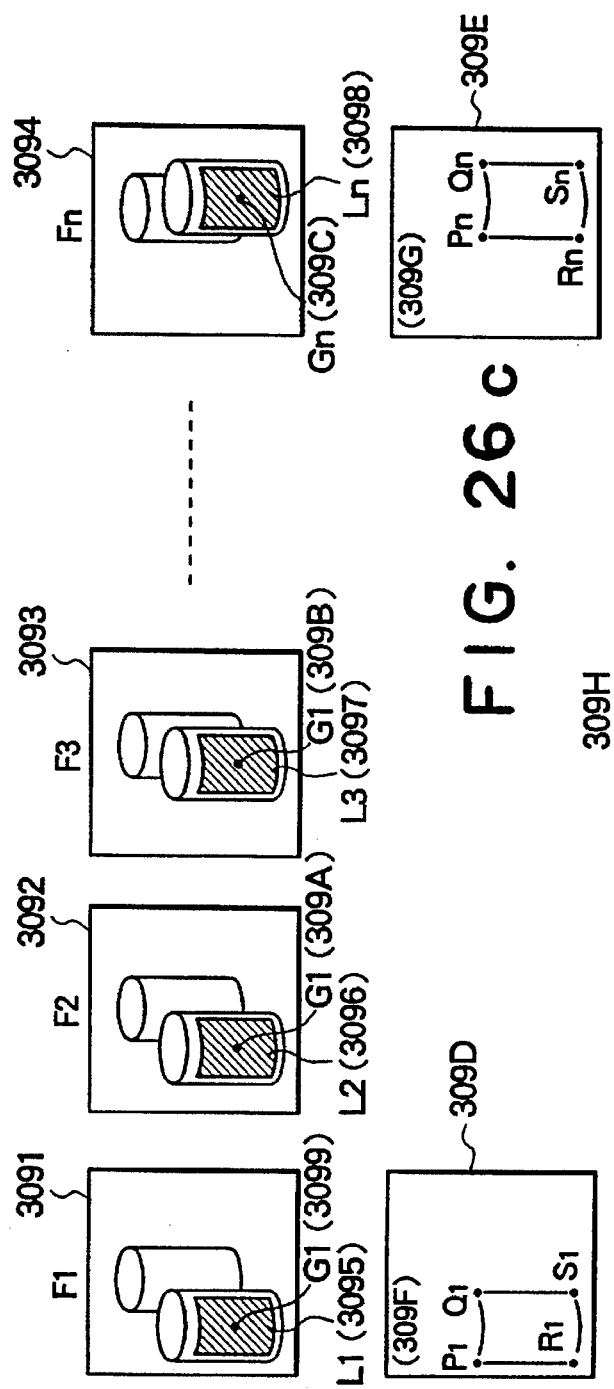

At step S3086, the labeling means processes the output of the thresholding means to extract a plurality of regions within the image. At the first execution cycle where k=1, the labeling means 3074A processes the output of the thresholding means 3073A to extract a plurality of regions within the image. At the second execution cycle where k=2, the labeling means 3074B processes the output of the thresholding means 3073B to extract a plurality of regions within the image. At the third execution cycle where k=3, the labeling means 3074C processes the output of the thresholding means 3073C to extract a plurality of regions within the image. At the n'th execution cycle where k=n, the labeling means 3074D processes the output of the thresholding means 3073D to extract a plurality of regions within the image. In the case of this fifth embodiment, the 0-valued regions of the threshold level image (see FIG. 4c) are extracted and labeled. FIG. 26a shows successive image frames with labeled regions and the centers of gravity thereof. In FIG. 26a, a 0-level region in the successive image frames F1 3091, F2 3092, F3 3093, - - - , Fn 3094 is labeled with L1 3095, L2 3096, L3 3097, - - - , Ln 3098. As noted above by reference to FIGS. 4c in the description of the first embodiment, 0-level regions of the tri-level image generally represent regions of the original image within which the variation of the grey level is small.

At step S3087, the label positions of the respective labeled regions of the output of the labeling means are detected by the label position detector means. At the first execution cycle where k=1, the label positions of the respective labeled regions of the output of the labeling means 3074A are detected by the label position detector means 3075A. At the second execution cycle where k=2, the label positions of the respective labeled regions of the output of the labeling means 3074B are detected by the label position detector means 3075B. At the third execution cycle where k=3, the label positions of the respective labeled regions of the output of the labeling means 3074C are detected by the label position detector means 3075C. At the n'th execution cycle where k=n, the label positions of the respective labeled regions of the output of the labeling means 3074D are detected by the label position detector means 3075D. In the case of this embodiment, the label position of a labeled region is the center of gravity of the region. In FIG. 26a, the centers of gravity of the labels L1 3095, L2 3096, L3 3097, Ln 3098 are represented by the points G1 3099, G2 309A, G3 309B, Gn 309C, respectively.

Next at step S3088, the label correspondence calculator means 3077 determines the relationship between the label positions of corresponding labeled regions of each two successive image frames. For example, in the second execution cycle where k=2, the center of gravity G2 309A of the labeled region L2 3096 of the second frame F2 is positioned closest to the center of gravity G1 3099 of the the labeled region L1 3095 of the first frame F1. Thus, the correspondence between the two label positions G1 and G2 is established, and the correspondence therebetween is stored in a memory. The method of determination of the correspondence of the label positions of two successive frames is similar to that of the fifth embodiment described above. In FIG. 26a, the correspondence among the centers of gravity G1 3099, G2 309A, G3 309B, Gn 309C, of the labels L1 3095, L2 3096, L3 3097, Ln 3098, are successively established by the label correspondence calculator means 3077 as the value k is incremented from one to n.

At step S3089, it is judged whether or not the value k of the internal counter is equal to one (k=1). If the judgment is affirmative at step S3089 (i.e., k=1), the execution proceeds to step S308A, where the contour extractor means 3076A extracts the contours from the first image frame output from the DOG filtering means 3072A. FIG. 26b shows a contour extracted from the first frame image F1 of FIG. 26a. After the value k is incremented by one at step S308B, the execution returns to step S3083 to repeat the subsequent steps S3084 through S3088.

On the other hand, if the judgment is negative at step S3089, the execution proceeds to step S308C, where it is judged whether or not the value k of the internal counter is equal to n (k=n). If the judgment is negative, the value k is incremented by one at step S308B, and the execution returns to step S3083 to repeat the subsequent steps S3084 through S3088.

When the value k of the internal counter reaches n and the judgment at step S308C finally becomes affirmative, the execution proceeds to step S308E, where the contour extractor means 3076D extracts the contours from the n'th image frame output from the DOG filtering means 3072D. FIG. 26c shows a contour extracted from the n'th frame image Fn of FIG. 26a.

Finally at step S308F, on the basis of the outputs of the contour extractor means 3076A for the first frame and the contour extractor means 3076D for the n'th frame, and the output of the label correspondence calculator means 3077, the parallax calculator means 3078 calculates the parallax between the moving object in the first and the n'th image frames F1 and Fn. As described above, the correspondence among the centers of gravity G1 3099, G2 309A, G3 309B, Gn 309C, of the labels L1 3095, L2 3096, L3 3097, Ln 3098 are successively established by the label correspondence calculator means 3077. Further, the contour extractor means 3076A and 3076D generate the contour images 309D (FIG. 26b) and 309E (FIG. 26c), respectively. Based on the information supplied by the contour extractor means 3076A, 3076D and label correspondence calculator means 3077, the parallax calculator means 3078 establishes correspondence between the contours of the images 309D and 309E. It is assumed that the correspondence is thus established between the contour 309F of the image 309D (FIG. 26b) and the contour 309G of the image 309E (FIG. 26c).

Further, the parallax calculator means 3078 detects the corner points P1, Q1, R1, and S1 of the contour 309F (FIG. 26b) and Pn, Qn, Rn, and Sn of the contour 309G (FIG. 26c), and determines that P1, Q1, R1, and S1 of the contour 309F correspond to Pn, Qn, Rn, and Sn of the contour 309G, respectively.

Finally, the parallax calculator means 3078 determines the vectors (referred to as parallax vectors) connecting the respective points P1, Q1, R1, and S1 of the contour 309F to the corresponding points Pn, Qn, Rn, and Sn of the contour 309G. FIG. 26d shows the screen display 309H of the parallax vectors obtained by the parallax calculator means 3078 of FIG. 24 at step S308F in the procedure of FIG. 25.

In the case of the sixth embodiment, the original image is first stored in a memory. However, the signal from a TV camera, etc., may be directly input to the DOG filtering means.

Further, according to the sixth embodiment, the original image input via a camera is directly processed by the DOG filter. However, the image may first be subjected to a preprocessor filter to remove the noise, etc.

Furthermore, according to the sixth embodiment, the DOG filter is applied upon the original image whose size is the same as the input image. However, the size of the original image may first be reduced before applying the DOG filter. Then, a DOG filter of effectively greater size can be applied upon the image.

According to the sixth embodiment, the DOG filter is defined by the difference of two Gaussians with standard deviations ($\sigma_e$=1.0 and $\sigma_i$=1.6, and the size of the DOG filter is 7×7 pixels. These values may be changed in accordance with the specific application.

Furthermore, according to the sixth embodiment, the two threshold levels th1 and th2 are selected such that th1=–th2. However, the two threshold levels may be selected in other ways, and even the tri-level quantization is not a necessity.

Further according to the sixth embodiment, the contour extractor means extracts the contour from the output of the DOG filtering means. However, other methods of extracting the contour may be used. For example, the contour may be extracted directly from the original image.

Still further, the image processing device according to the sixth embodiment includes n separate units of the original image memory, DOG filtering means, thresholding means, labeling means, and label position detector means, for processing the successive image frames simultaneously. However, the respective memory units or means for each function may be united into a single unit, wherein the successive images are processed in sequential order. Then, the size of the image processing device can be reduced drastically.

Still further, in the case of the sixth embodiment, the label position detector means detects the center of gravity of each labeled region as the label position thereof. However, the label position may be defined differently.

Still further, in the case of the sixth embodiment, the predetermined interval between two successive images is 33 milliseconds. However, the interval may be longer or shorter than this specific value.

Seventh Embodiment

Figure 27:
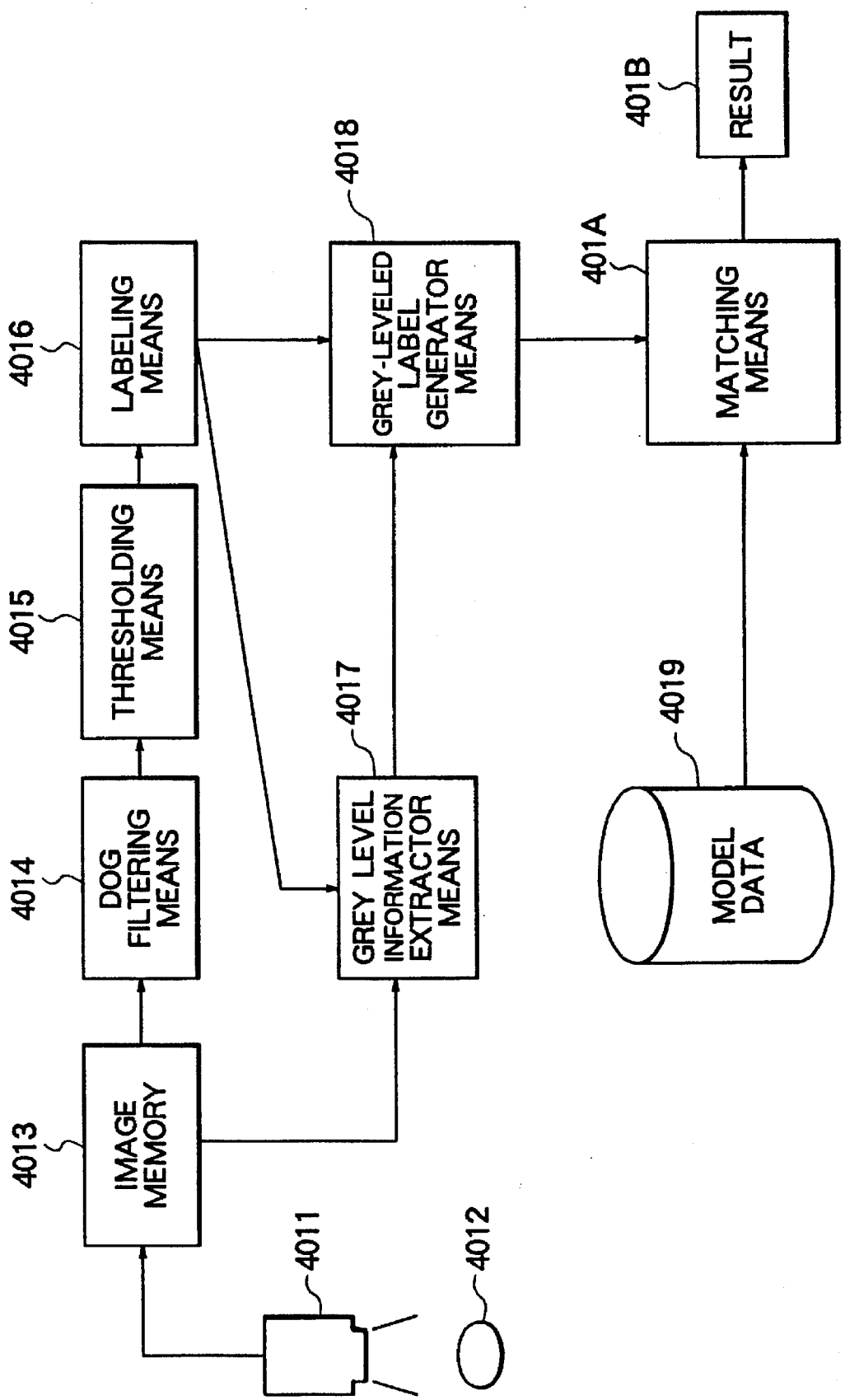
FIG. 27 is a block diagram showing the structure of an image processing device according to a seventh embodiment of this invention.

FIG. 27 is a block diagram showing the structure of an image processing device according to a seventh embodiment of this invention. A TV camera 4011 takes an image of objects 4012 (schematically represented by a circle in the figure) which are to be recognized or identified, and stores the image of the objects 4012 in an image memory 4013. The TV camera 4011 is used as the original image input means. The original image stored in the image memory 4013 is supplied to a DOG filtering means 4014 and a grey level information extractor means 4017. The grey level information extractor means 4017 extracts the grey level information from the original image based on the brightness thereof. The DOG filtering means 4014 applies the DOG filter upon the original image data supplied from the image memory 4013 and outputs the resulting filtered image to a tri-level thresholding means 4015. The thresholding means 4015 performs the tri-level thresholding upon the output of the DOG filtering means 4014 and outputs the resulting tri-level image to a labeling means 4016. The labeling means 4016 extracts regions from the tri-level thresholded image and labels them. The labeling means 4016 outputs the resulting labeled regions to the grey level information extractor means 4017 and a grey leveled label generator means 4018.

Using the labeled regions supplied from the labeling means 4016, the grey level information extractor means 4017 extracts the grey level information with respect to respective labeled regions from the original grey level image stored in the image memory 4013, and outputs the extracted grey level information to the grey leveled label generator means 4018. Upon receiving the outputs of the labeling means 4016 and the grey level information extractor means 4017, the grey leveled label generator means 4018 synthesizes the information upon the labeled regions supplied from the labeling means 4016 with the grey level information supplied from the grey level information extractor means 4017. The grey leveled label generator means 4018 thus generates the grey-leveled labeled region information (i.e., a table of the information upon the grey-leveled labeled regions, as described below) and supplies it to a matching means 401A.

On the other Hand, the model data 4019 stores the grey-leveled labeled region information (the label table as described below) which is prepared beforehand by a computer (not shown). The matching means 401A matches (collates) the grey-leveled labeled region information supplied from the grey leveled label generator means 4018 with the model data 4019, and outputs the recognition result 401B with respect to the objects 4012.

Figure 28:
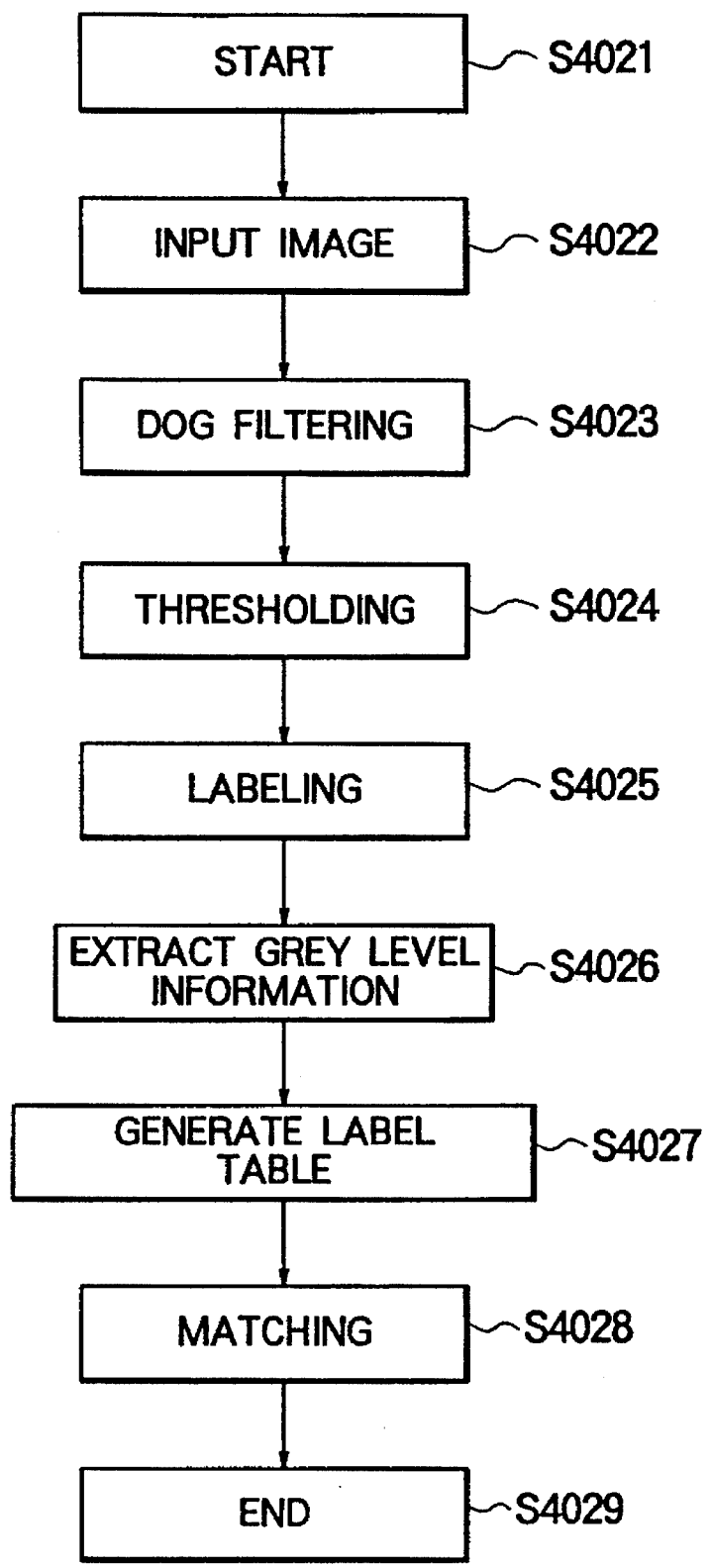
FIG. 28 is a flowchart showing the procedure followed by the image processing device according to the seventh embodiment.

FIG. 28 is a flowchart showing the procedure followed by the image processing device according to the seventh embodiment. At step S4022 after the start at step S4021, the TV camera 4011 takes an image of the objects 4012 which are to be recognized, and stores the image of the objects 4012 in the image memory 4013.

At step S4023, the DOG filtering means 4014 applies the DOG filter upon the original image supplied from the image memory 4013. In the one dimensional case, the DOG function is given by the above equation (2), which is a difference of two Gaussians. FIG. 21 shows an example of the one-dimensional DOG function 3031 as given by the above equation (2). In the case of the image processing device, two-dimensional images are processed. Thus, the DOG filter is defined by the equation (3) as described above. In the case of this embodiment, $\sigma_e=1.0$ and $\sigma_i=1.6$, and the digital filter size is 7 times 7 (7×7) pixels.

At step S4024, the output of the DOG filtering means 4014 is thresholded by the tri-level thresholding means 4015. The tri-level thresholding is as described above by reference to FIGS. 4a through 4c. Thus the thresholding means 4015 performs the tri-level quantization upon the output of the DOG filtering means 4014 using the two threshold levels th1 and th2.

Figure 29:
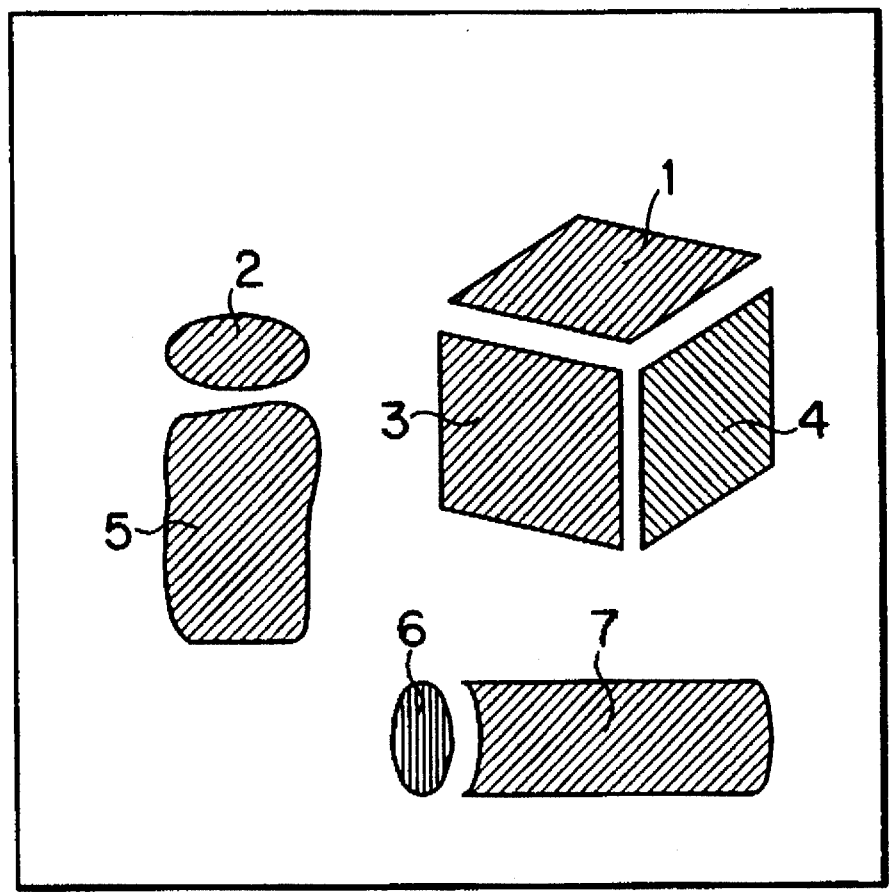
FIG. 29 is a diagram showing labeled regions extracted and labeled by the labeling means 4016 of FIG. 27.

At step S4025, the labeling means 4016 extracts a plurality of regions from the thresholded image supplied from the thresholding means 4015, and labels them. In the case of this embodiment, only the 0-level regions (see FIG. 4c) are extracted and labeled. FIG. 29 is a diagram showing labeled regions extracted and labeled by the labeling means 4016 of FIG. 27, where the numerals within circles represent the labeling numbers with which the respective regions are labeled. As noted above by reference to FIGS. 4c in the description of the first embodiment, 0-level regions of of the tri-level image generally corresponds to regions of the original image within which the variation of the grey level is small. Thus, those regions in the original image corresponding to surfaces of the objects 4012, etc., are extracted and labeled by the labeling means 4016.

At step S4026, the grey level information extractor means 4017 extracts the grey level information from the original grey level image stored in the image memory 4013. According to this embodiment, the grey level information extractor means 4017 extracts the grey level with respect to the result of the labels (labeled regions) supplied from the labeling means 4016. Namely, with respect to each one of the labeled regions supplied from the labeling means 4016, the grey level information extractor means 4017 reads out the grey level information of the corresponding region of the original image (stored in the image memory 4013) and calculates the average grey level thereof.

Further at step S4027, the grey leveled label generator means 4018 synthesizes the information upon the labeled regions (i.e., a collection of the labeled regions) supplied from the labeling means 4016 and the information upon the grey levels of the respective labeled regions supplied from the labeling means 4016, and generates the grey-leveled labeled region information, which is a table of the information upon the grey-leveled labeled regions. The following table 1 is an example of such table representing the grey-leveled labeled region information.

TABLE 1

| label number | area | moment | average grey level |
|---|---|---|---|
| 1 | 112 | 0.52 | 184 |
| 2 | 40 | 0.33 | 171 |
| 3 | 131 | 0.63 | 77 |

TABLE 1-continued

| label number | area | moment | average grey level |
|---|---|---|---|
| 4 | 127 | 0.70 | 135 |
| 5 | 155 | 0.92 | 158 |
| 6 | 29 | 0.20 | 66 |
| 7 | 164 | 0.98 | 190 |

The table 1 corresponds to the image (the collection of the labeled regions) of FIG. 29. The first column shows the labeling number of respective regions. The second column shows the area of respective regions. The third column shows the moment of area of respective regions. The area and the moment of area of respective regions are the geometric characteristic values thereof. The last column shows the average grey level of respective regions. The grey-leveled labeled regions information, represented by a table of the characteristic values of respective regions as shown in table 1, is stored in a memory of the computer (not shown). The grey-leveled labeled regions information is referred to as the label table of the image.

Finally, at step S4028, the matching means 401A matches the label table supplied from the grey leveled label generator means 4018 with the model data 4019 which stores a label table of the objects to be recognized which is prepared beforehand.

Figure 30:
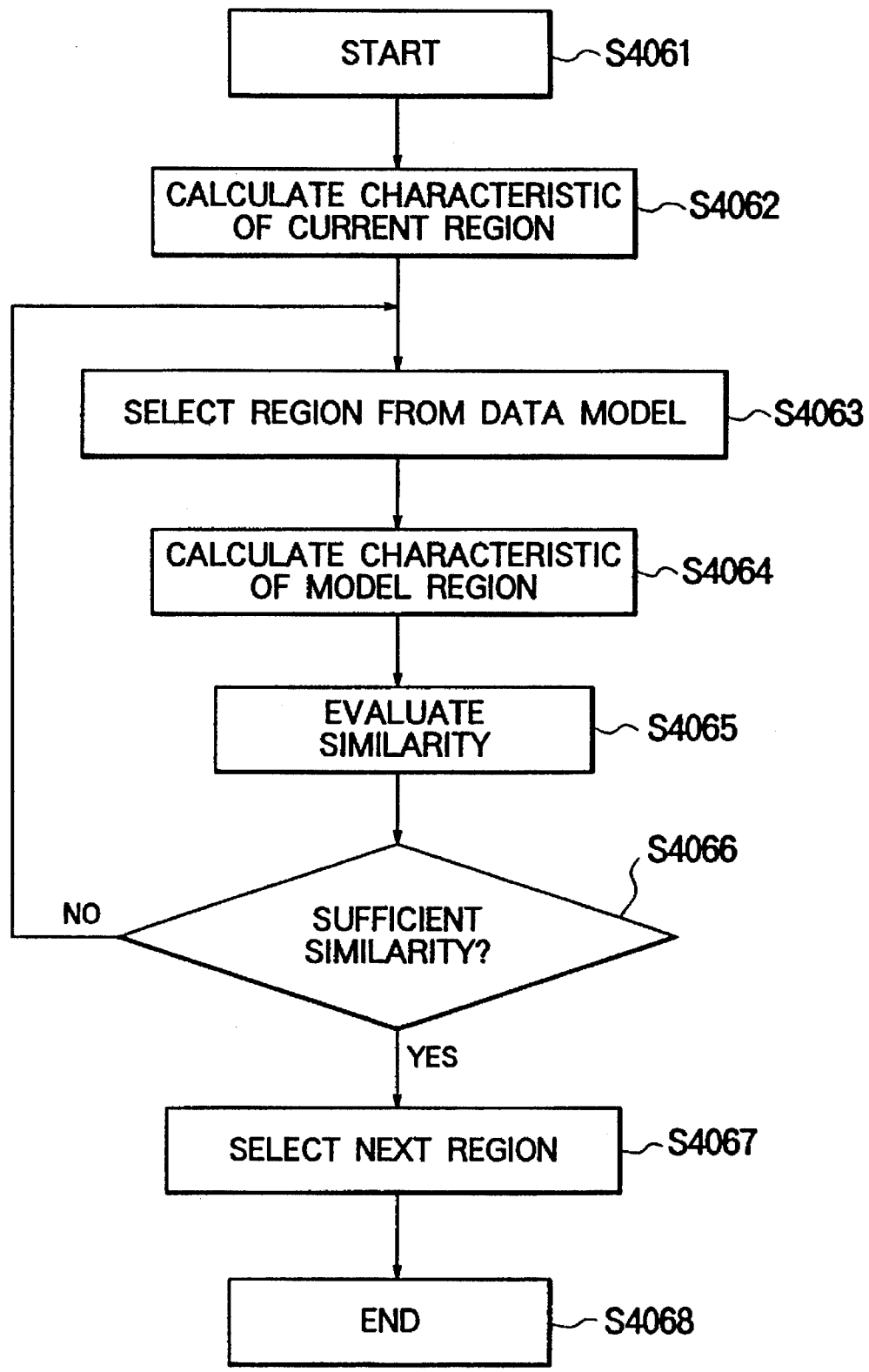
FIG. 30 is a flowchart showing the details of the matching procedure at step S4028 of FIG. 28.
Figure 31:
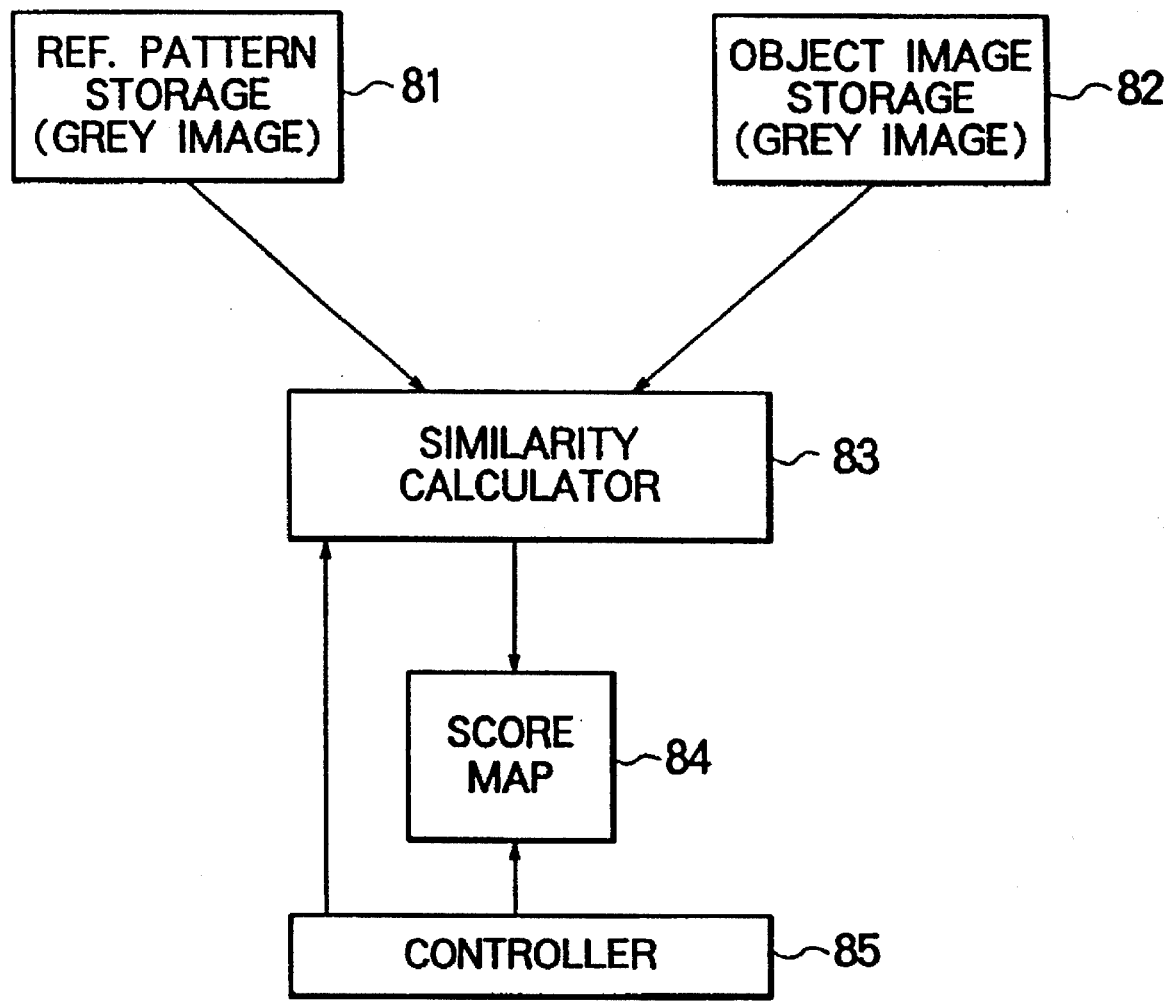
FIG. 31 is a block diagram showing the structure of a conventional template matching device.
Figure 32:
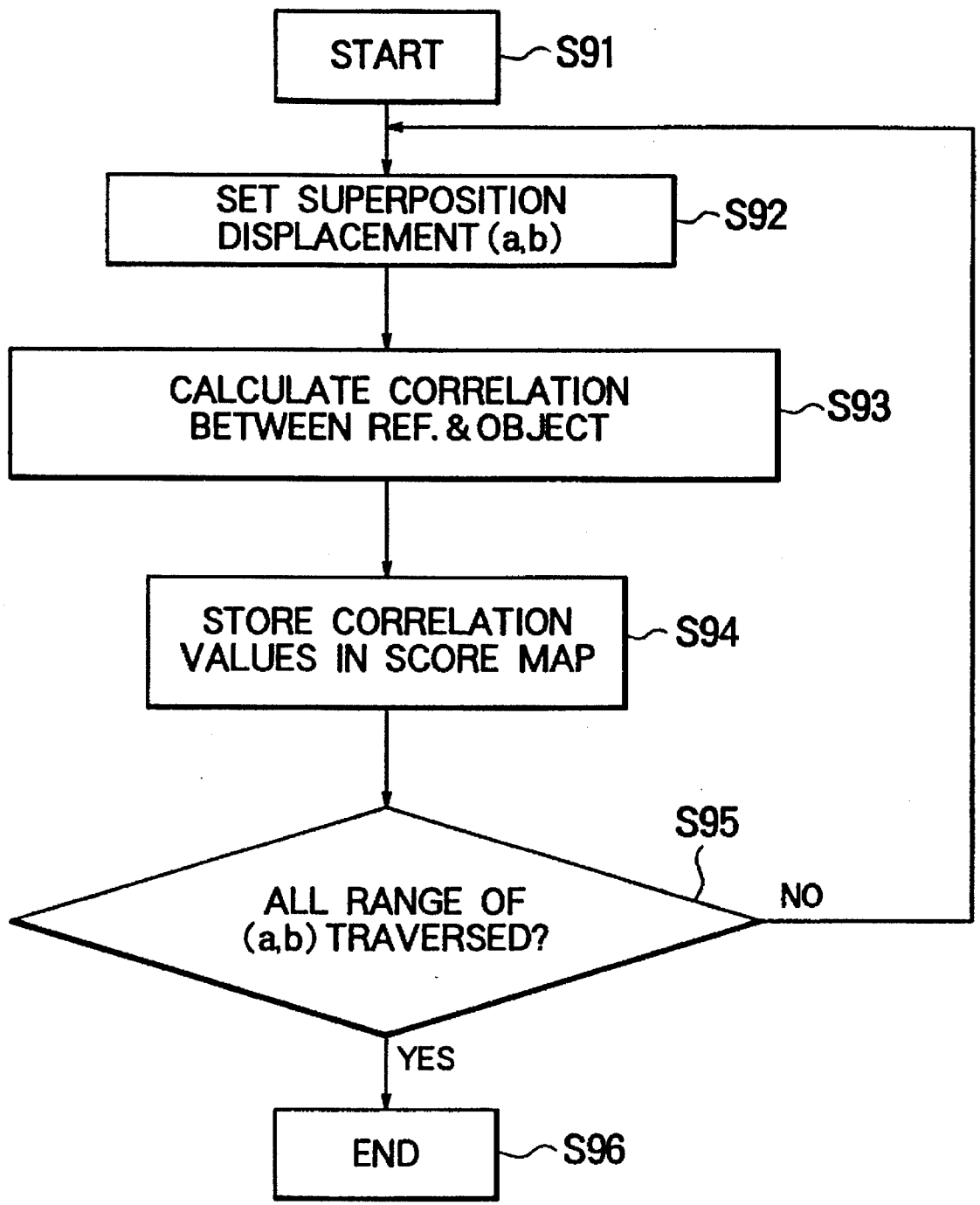
FIG. 32 is a flowchart showing the matching procedure followed by the conventional template matching device of FIG. 31.
Figure 33:
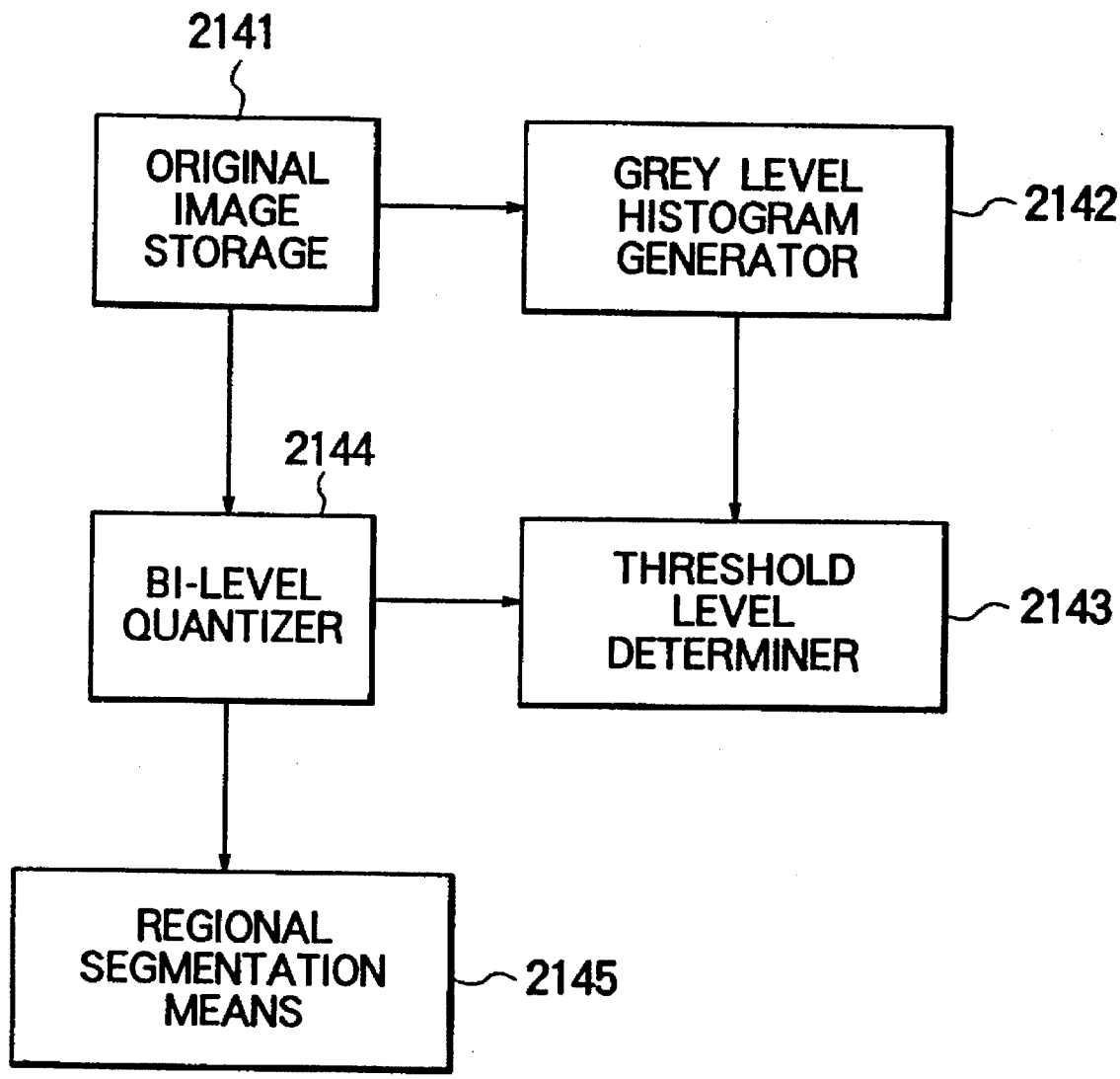
FIG. 33 is a block diagram showing the structure of a conventional regional segmentation device.
Figure 34:
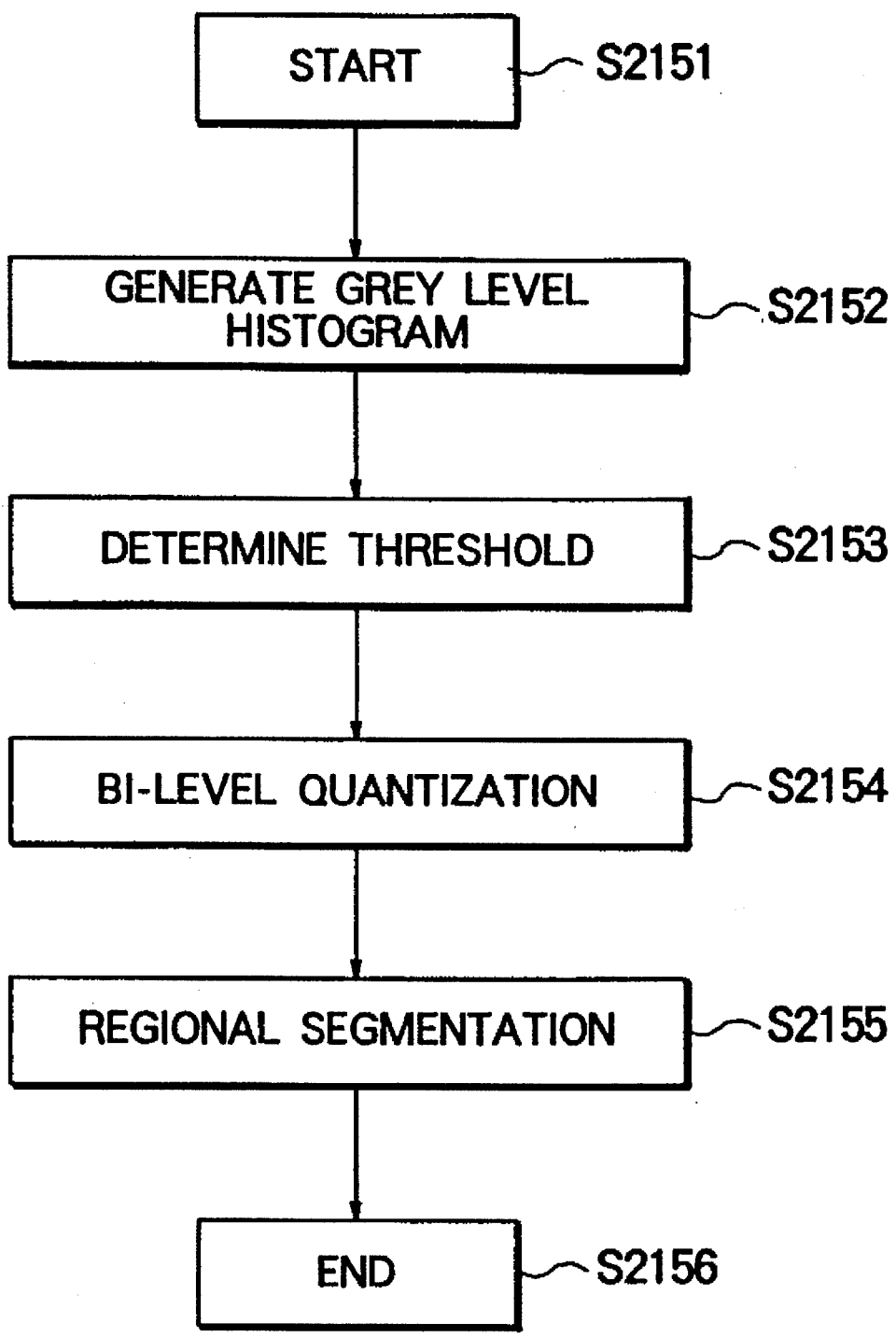
FIG. 34 is a flowchart showing the regional segmentation procedure followed by the conventional regional segmentation device of FIG. 33.
Figure 35:
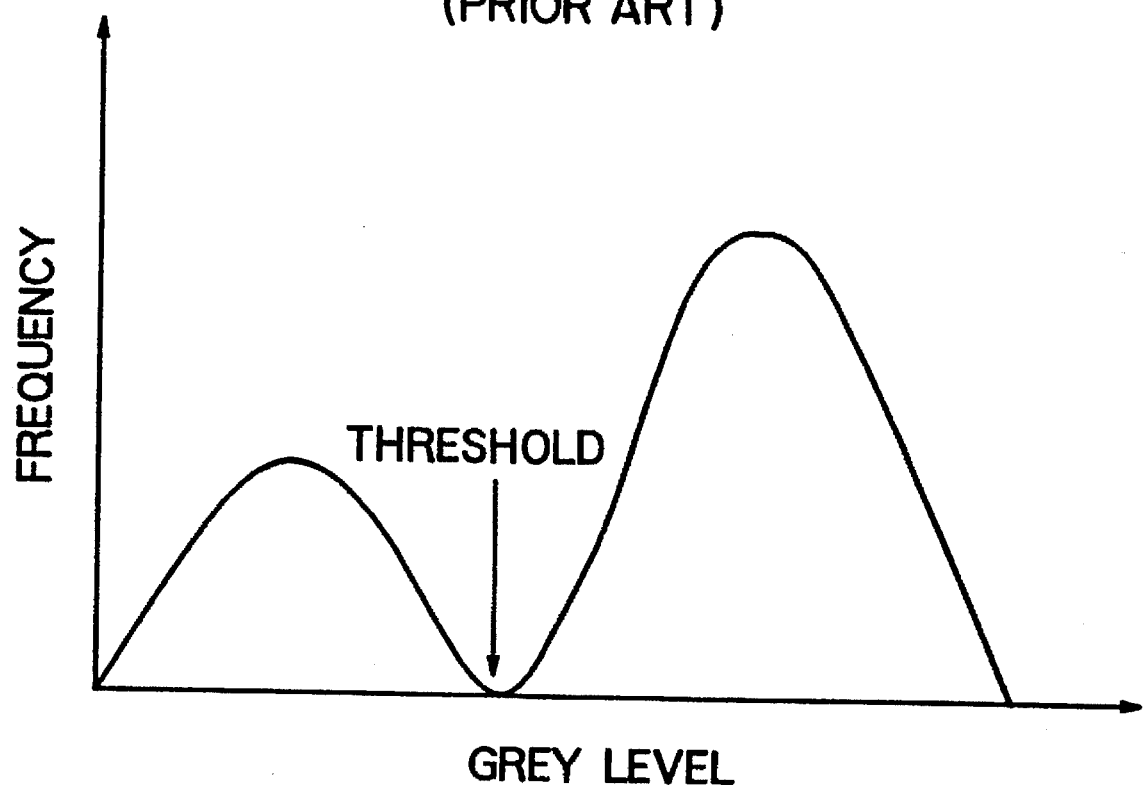
FIG. 35 shows an exemplary grey level histogram generated by the grey level histogram generator in the procedure of FIG. 34.
Figure 36:
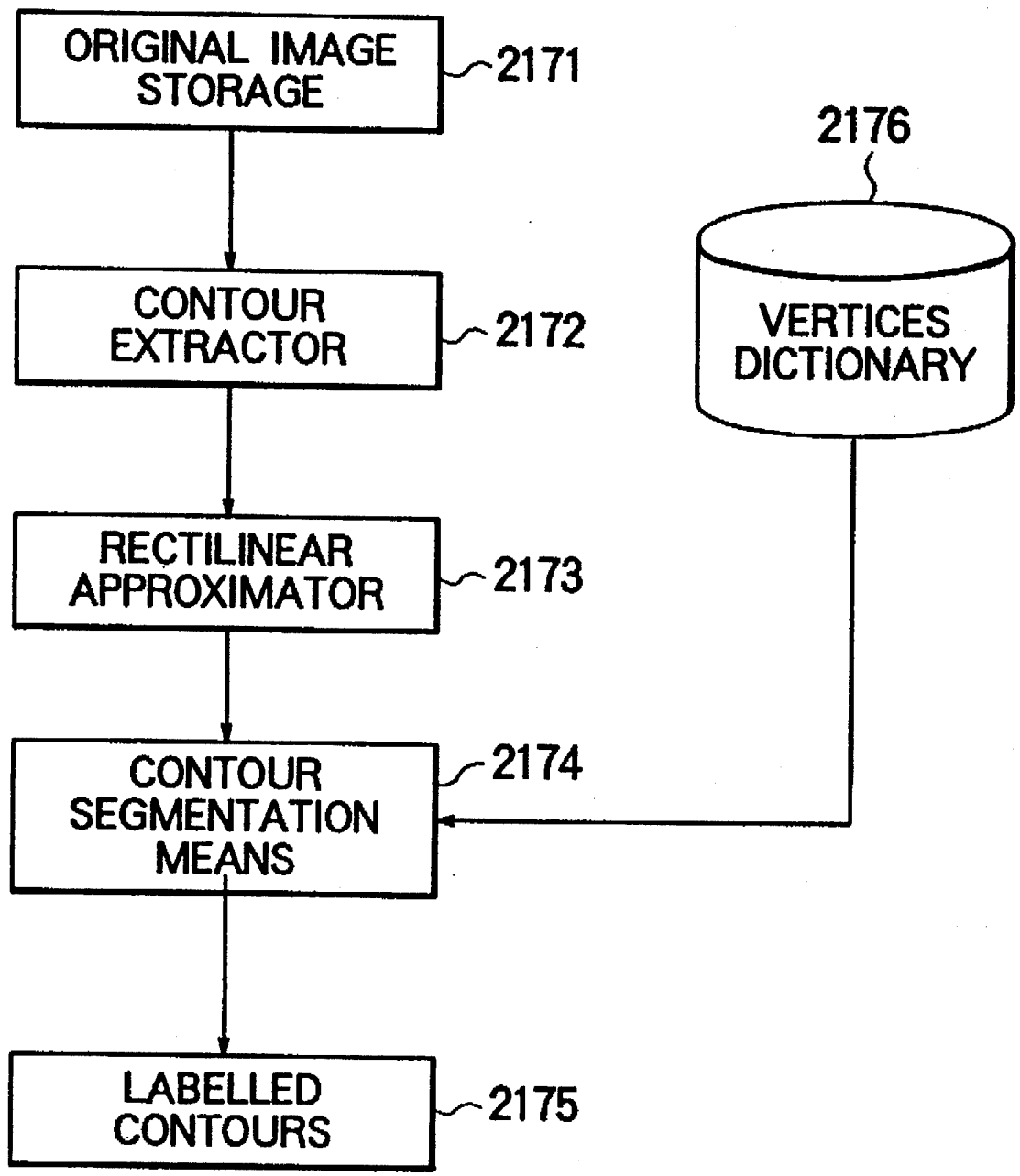
FIG. 36 is a block diagram showing the structure of a conventional contour segmentation device.
Figure 37:
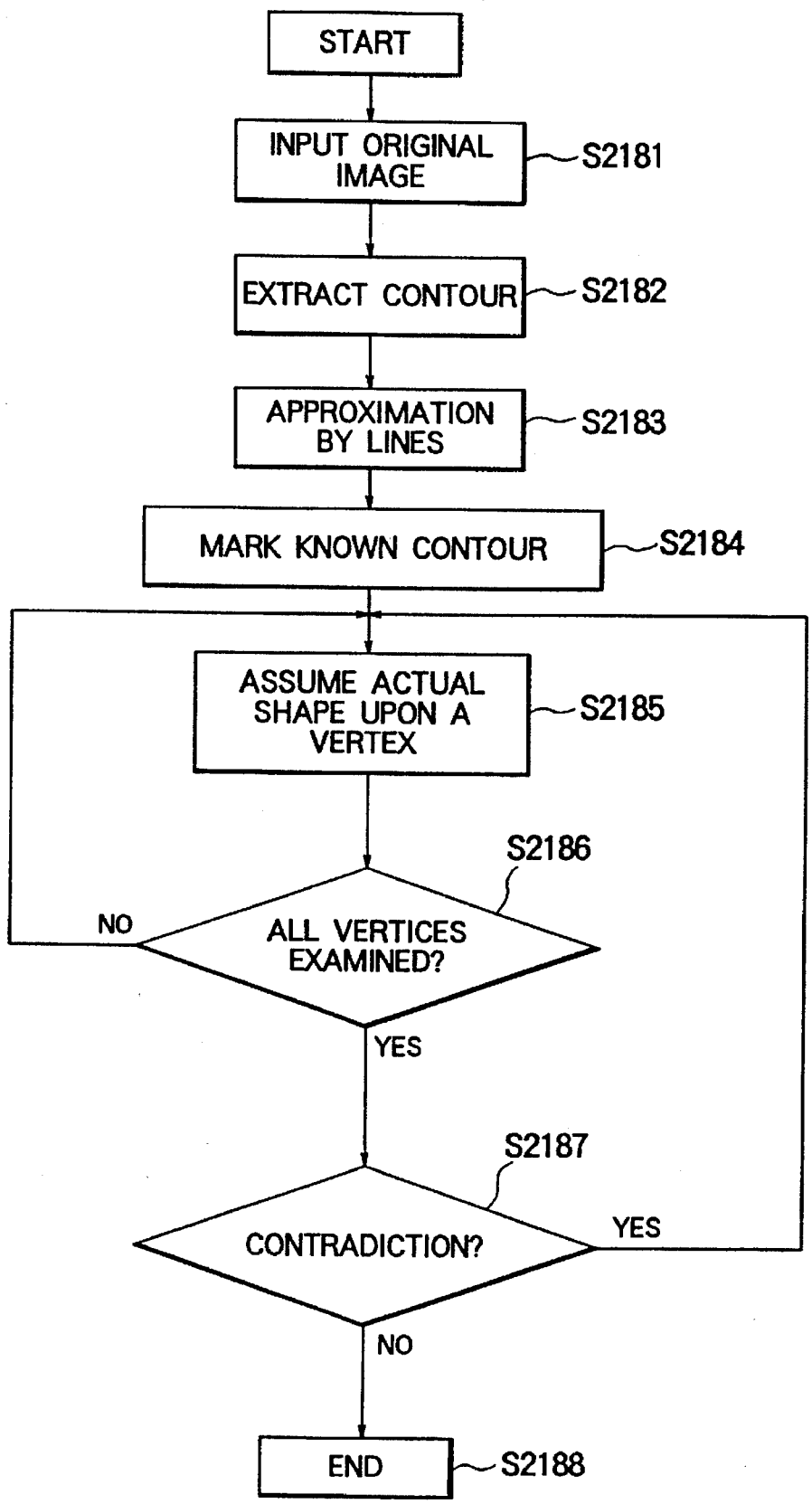
FIG. 37 is a flowchart showing the contour segmentation procedure followed by the conventional contour segmentation device of FIG. 36.
Figure 38:
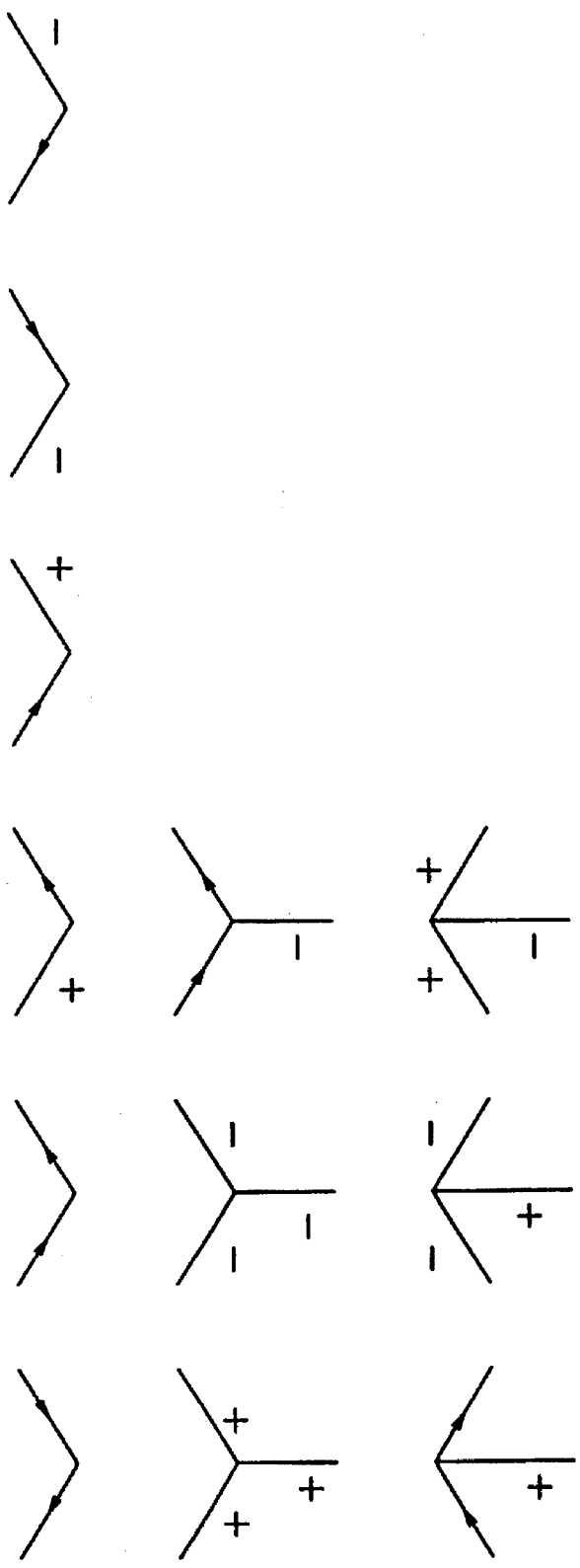
FIG. 38a is a diagram showing the vertices and the edges meeting thereat which may be formed by an object in the physical three-dimensional space, where the lines representing edges meet obliquely in the image.
FIG. 38b is a diagram similar to that of FIG. 38a, but showing the case where the lines representing the edges meet at right angles in the image.
Figure 38:
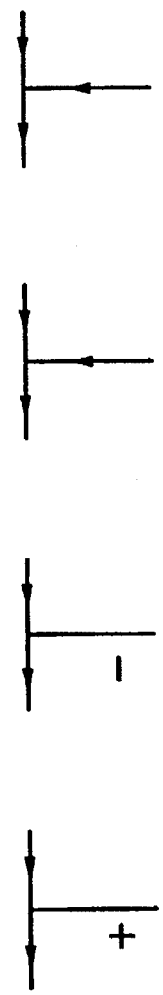
Figure 39:
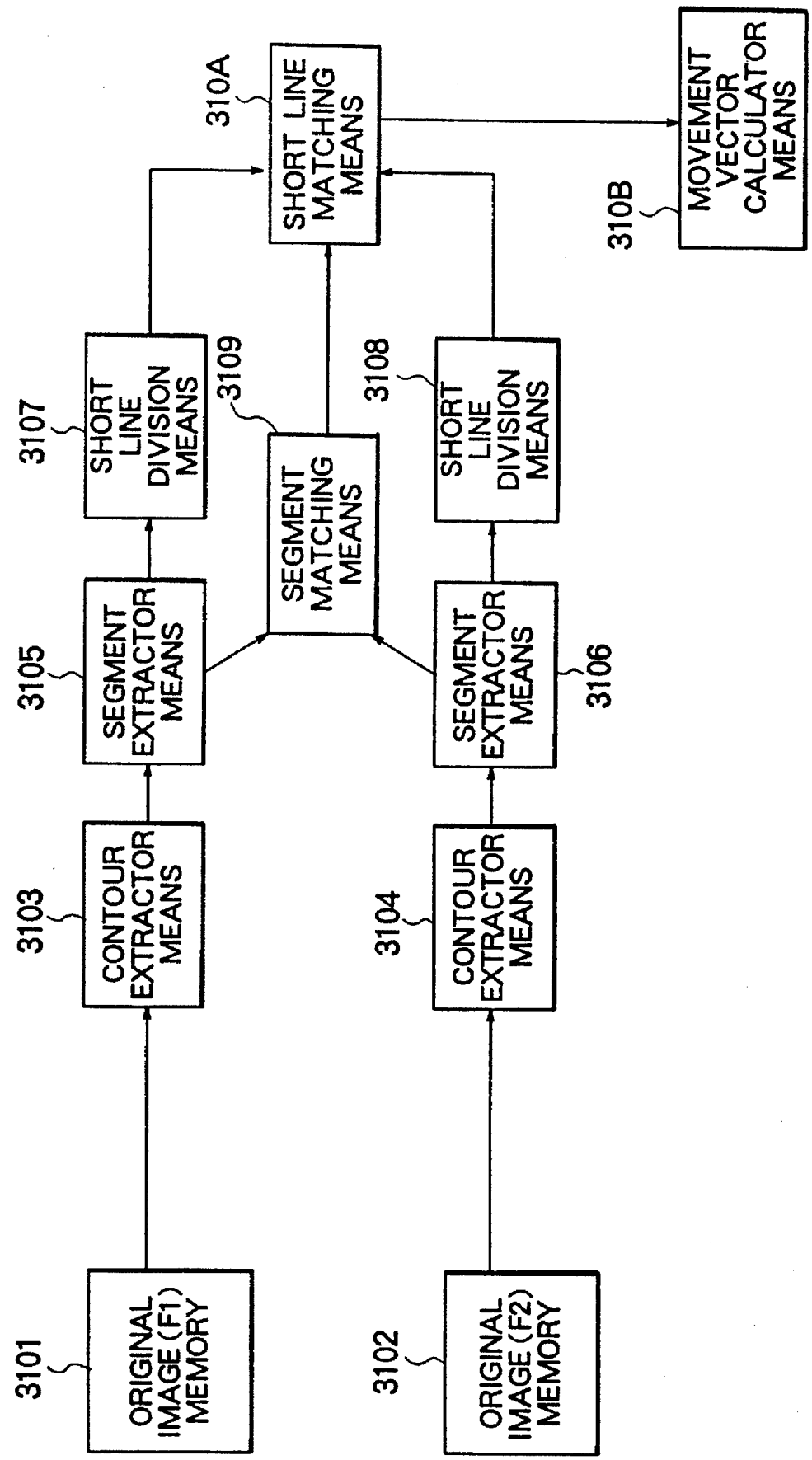
FIG. 39 is a block diagram showing the conventional image processing device provided with a movement vector extractor.
Figure 40:
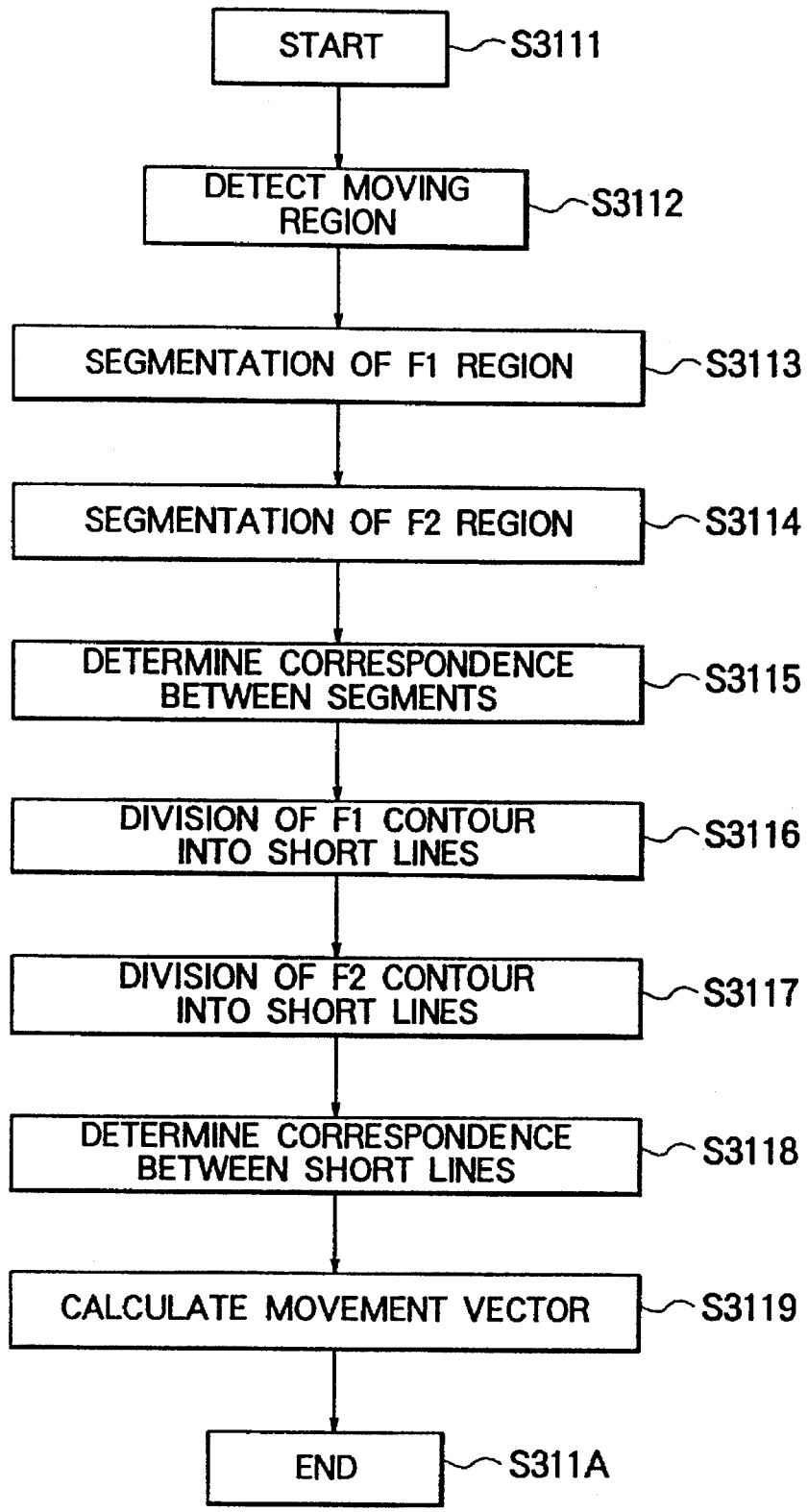
FIG. 40 is a flowchart showing the movement vector calculation procedure of the conventional image processing device.
Figure 41A:
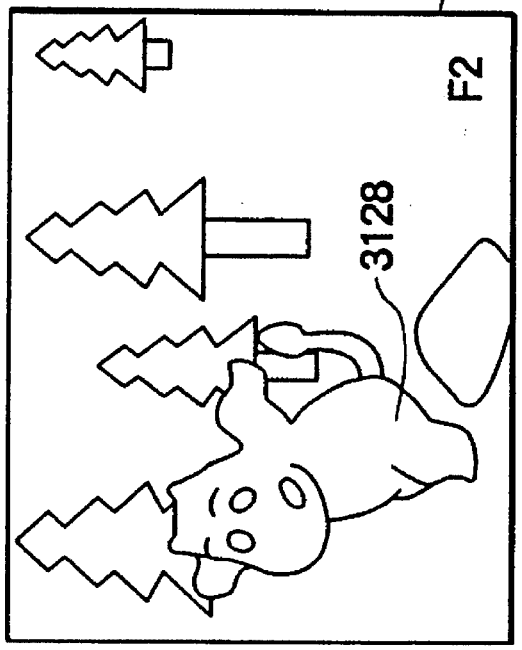
FIG. 41a is a diagram showing a first image (F1)
Figure 41B:
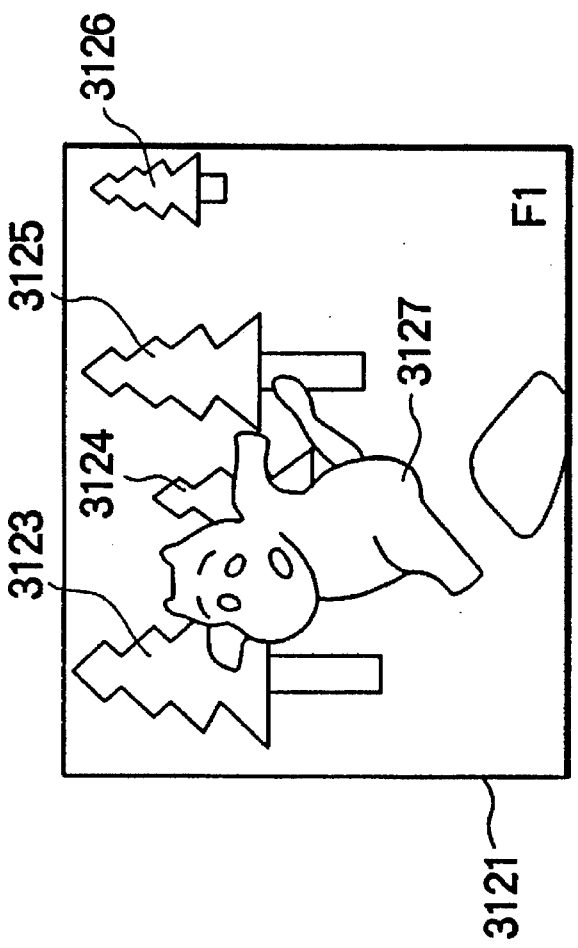
FIG. 41b is a diagram showing a second image (F2) taken after a short interval of time after the first image (F1)
Figure 42:
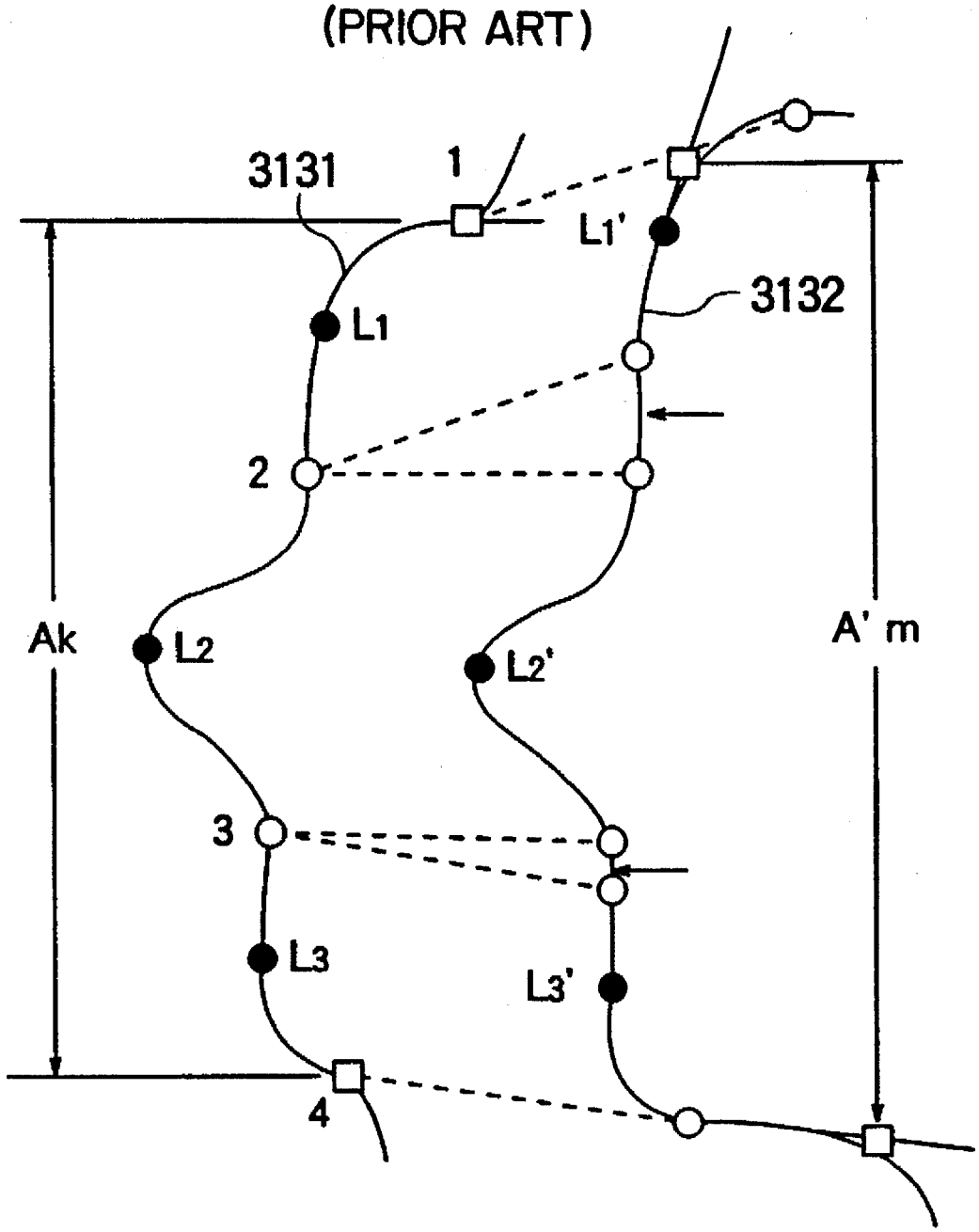
FIG. 42 is a diagram showing the segmentation matching procedure.
Figure 43:
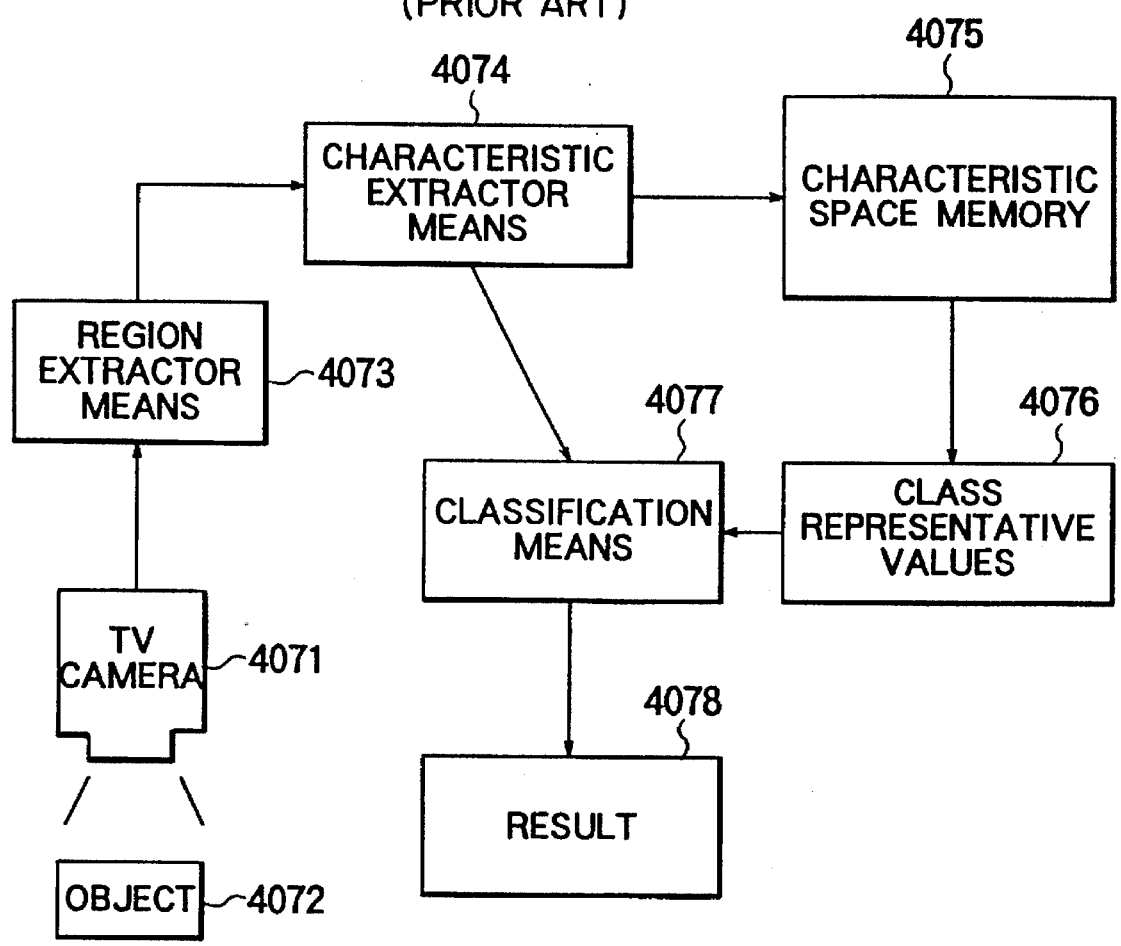
FIG. 43 is a block diagram showing a conventional image recognition device.
Figure 44:
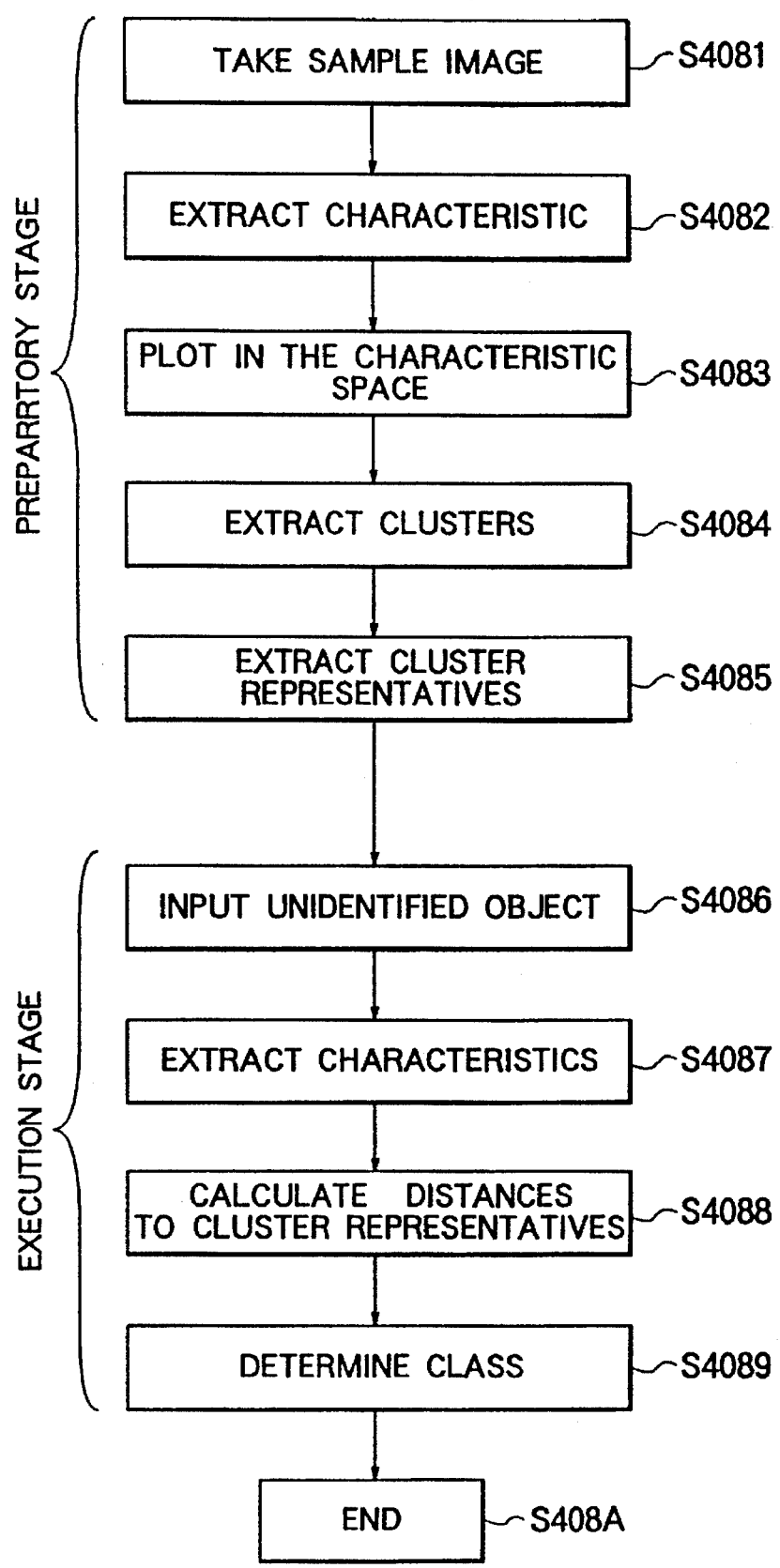
FIG. 44 is flowchart showing the recognition procedure followed by the image processing device of FIG. 43.
Figure 45:
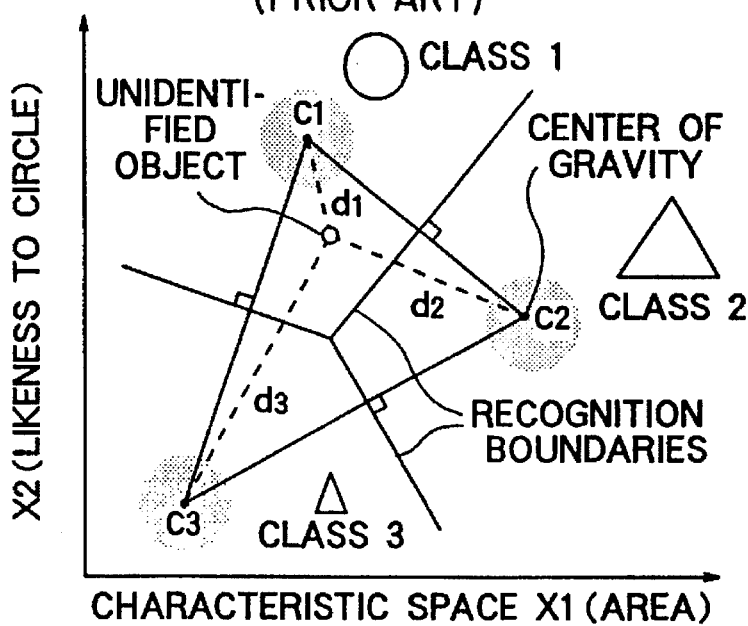
FIG. 45 is a diagram schematically representing the characteristic space memory 4075 of the image processing device of FIG. 43.
Figure 46:
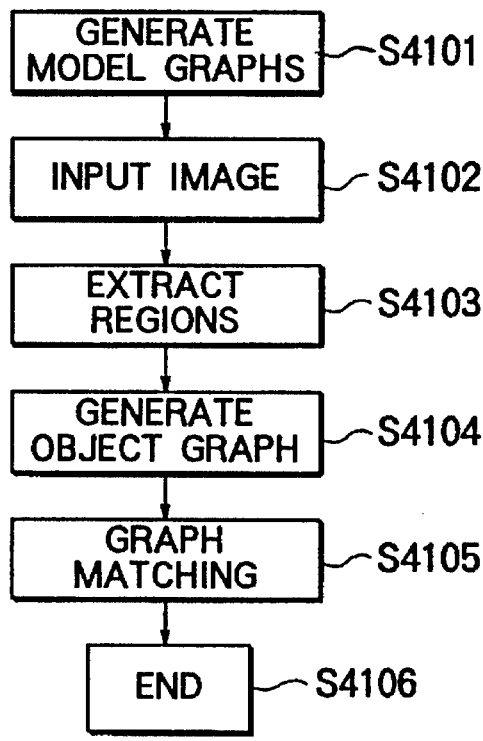
FIG. 46 is a flowchart showing the graph matching procedure used by a conventional image processing device for the image recognition.
Figure 47:
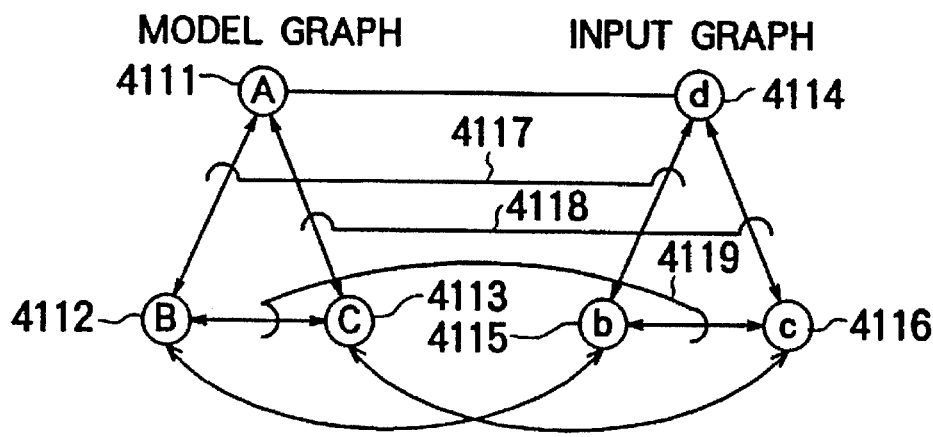
FIG. 47 is a diagram showing an exemplary model graph.
Figure 48:
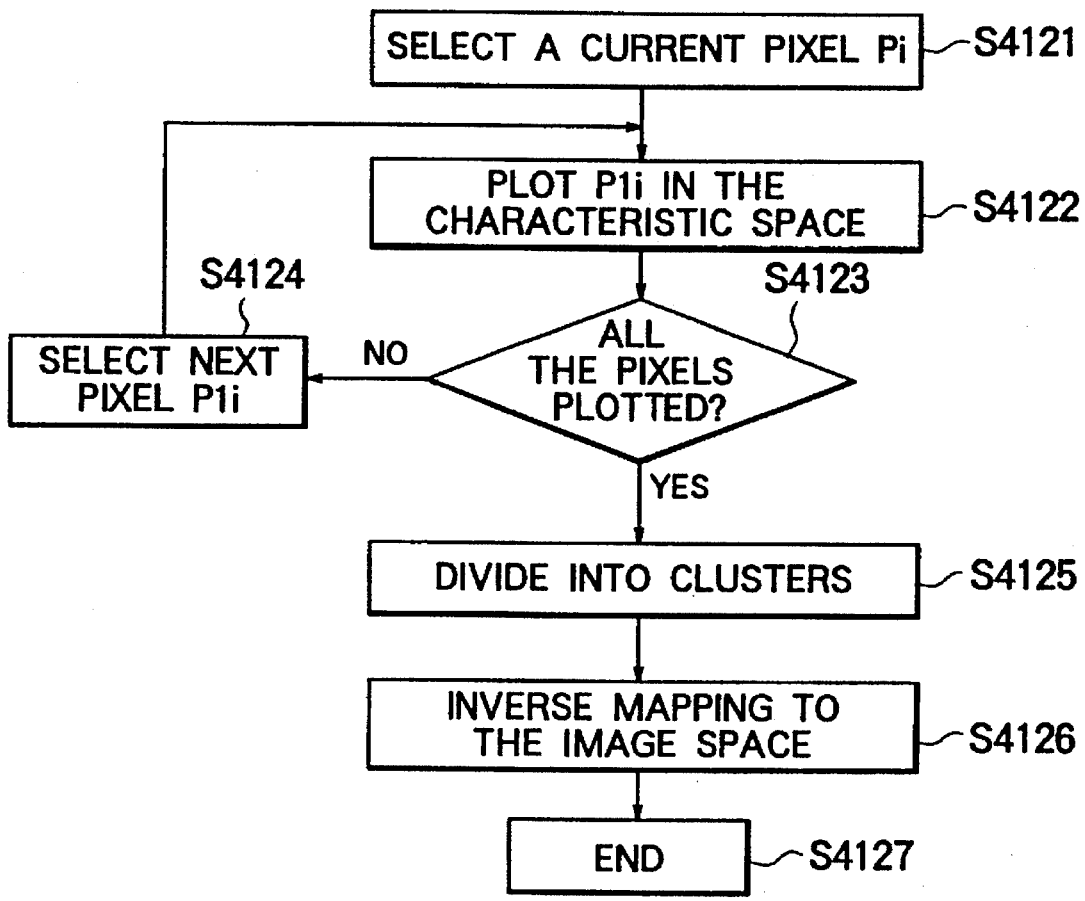
FIG. 48 is a flowchart showing the details of the region extraction procedure.
Figure 49:
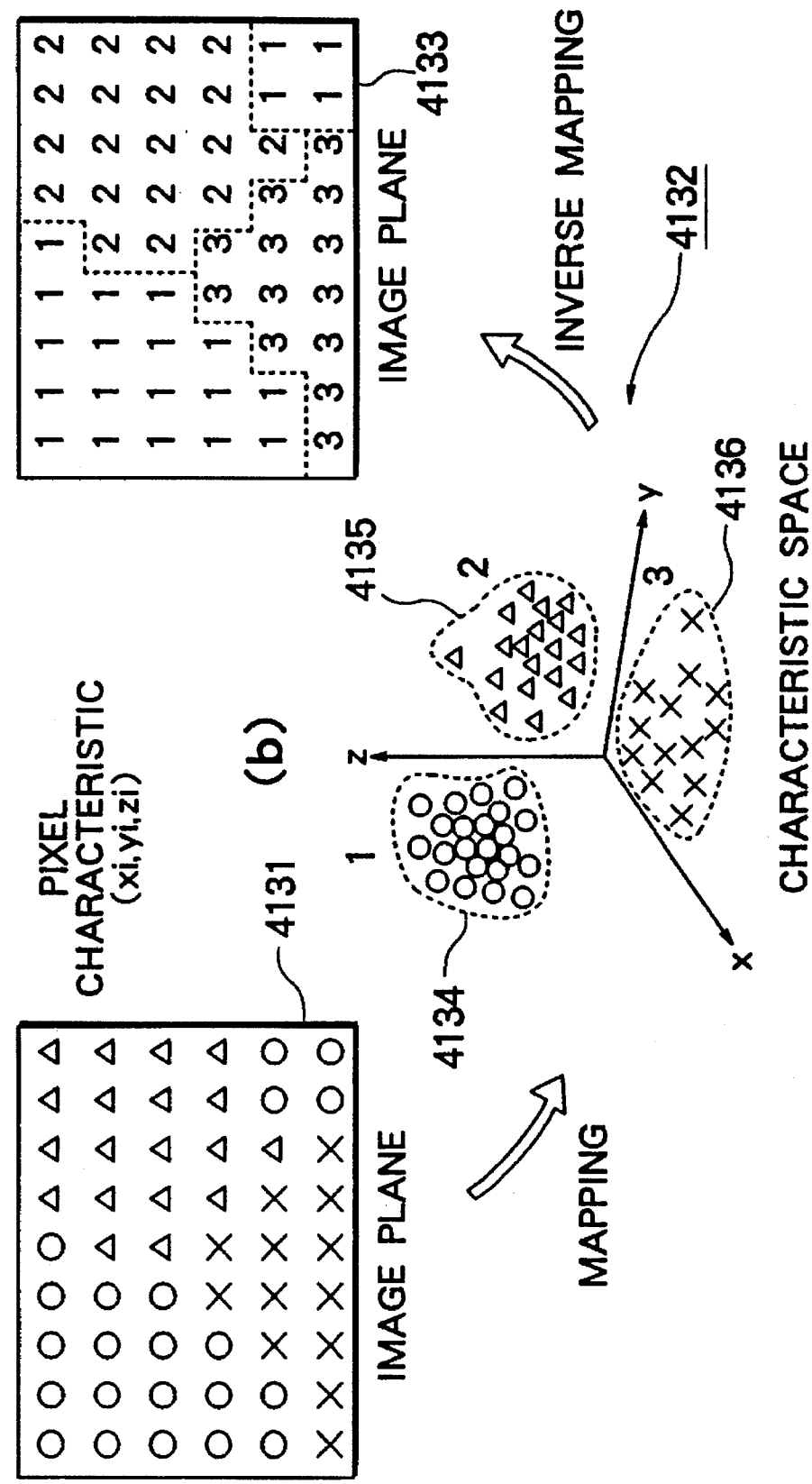
FIG. 49 is a diagram representing the region extraction procedure.

FIG. 30 is a flowchart showing the details of the matching procedure at step S4028 of FIG. 28. It is assumed that, the label table, such as table 1, is obtained as described above, with respect to the original image of the objects 4012 taken by the TV camera 4011. Further, a label table with respect to the objects to be recognized is stored beforehand in the model data 4019. The label table generally includes: the number of the respective regions (i.e., label numbers); the area thereof; the geometric characteristic value, such as the moment, thereof; and the average grey level thereof. However, the label table of the model data 4019 may lack some of the items thereof.

First at step S4062 after the start at step S4061, a label (i.e., a row which represents the characteristic values of a region) of the label table of the image of the objects 4012 supplied from the grey leveled label generator means 4018 is selected. In the case of this embodiment, all the items of the label are already calculated as described above. However, if some of the characteristic values of the label are lacking, the lacking values are calculated at step S4062.

Next at step S4063, a region (i.e., a label or a row of the label table) of the model data 4019 is selected. The selection is done sequentially, in the order of the label number, in each execution cycle of the step S4063. Thus, at the first execution cycle, the label No. 1 is selected at step S4063. The next step S4064 is not necessary if all the entries for the characteristic values of the selected region of the model data 4019 are already filled in. If, however, some of the characteristic values of the selected region are lacking, the lacking characteristic values are calculated at step S4064.

At step S4065, the similarity between the label of the image of the objects 4012 selected at step S4062 and the label of the model data 4019 selected at step S4063 is evaluated. For example, the similarity S is evaluated in accordance with the following equation:

$$S=1-\{(p(A1-A2)/A2)+(q(M1-M2)/M2)+(r(B1-B2)/B2)\} \quad (5)$$

where A1, M1, and B1 are the area, the moment, and the average grey level of the label of the image of the objects 4012, and A2, M2, and B2 are the area, the moment, and the average grey level of the label of the model data 4019, respectively. The factors p, q, and r are constants.

At step S4066, it is judged whether or not the similarity S is above a predetermined level. If the judgment is negative at step S4066 (i.e., if the similarity S is less than the predetermined level), the execution returns to step S4063, where a new label of the model data 4019 is selected, and the steps S4064 through S4066 are repeated. On the other hand, if the judgment is affirmative at step S4066 (i.e., if the similarity S is greater than the predetermined level), a correspondence is established between the region (label) of the image of the objects 4012 selected at step S4062 and the the region (label) of the model data 4019 selected at step S4063, and the next region of the image of the objects 4012 is selected at step S4067. The steps S4063 through S4067 (or the steps S4062 through S4067 in the case where some of the characteristic values are lacking in the label table of the objects 4012) are repeated for each label of the label table of the image of the objects 4012, and the matching procedure terminates. When the matching procedure terminates, correspondence is established between each label of the label table of the image of the objects 4012 and each label of the model data 4019, and the objects 4012 are recognized or identified on the basis of the correspondence thus established. The result 401B consists of the correspondence among the labels of the image of the objects 4012 and those of the model data 4019.

In the case of the seventh embodiment, the original images are first stored in memories. However, the signal from a TV camera, etc., may be directly input to the DOG filtering means or to the grey level information extractor means.

Further, according to the seventh embodiment, the original image input via a camera is directly processed by the DOG filter. However, the image may first be passed through a preprocessor filter to remove the noise, etc.

Furthermore, according to the seventh embodiment, the DOG filter is applied upon the original image whose size is the same as the input image. However, the size of the original image may first be reduced before applying the DOG filter. Then, a DOG filter of effectively greater size can be applied upon the image.

According to the seventh embodiment, the DOG filter is defined by the difference of two Gaussians with standard deviations $\sigma_e=1.0$ and $\sigma_i=1.6$, and the size of the DOG filter is 7×7 pixels. These values may be changed in accordance with the specific application.

Furthermore, according to the seventh embodiment, the two threshold levels th1 and th2 are selected such that th1=−th2. However, the two threshold levels may be selected in other ways, and even the tri-level quantization is not a necessity.

Further, in the case of the seventh embodiment, the geometric characteristic values of respective regions are the area and the moment thereof. However, the perimeter, the closeness to the circle, etc., may also be used as the geometric characteristic values.

Further, in the case of the seventh embodiment, the grey level information of respective regions is the average grey level thereof. However, the statistic values such as the variance of the grey level of respective regions, or the information related to the grey level information such as the grey level of the center of gravity of respective regions may be used as the grey level information.

Further, in the case of the seventh embodiment, the similarity S between the two labels is evaluated in accordance with equation (5). However, the similarity may be evaluated by any other evaluation function, provided that the similarity between two regions is calculated taking into consideration the grey levels of the two regions.

Further, in the case of the seventh embodiment, the labels of the image of the objects to be recognized are matched successively with the labels of the labels of the model, thereby establishing the correspondence relationships therebetween. However, the labels may be matched using the relative positions of respective labels (regions).

It is further noted that in the case of the first through seventh embodiments described above, the DOG function filter is used as the spatial band pass filter. However, any other spatial band-pass filter having similar characteristics may be used instead.

What is claimed is:

1. An image processing device comprising:

original image input means for inputting a grey level signal representing a grey level image of an object;

spatial band-pass filter means, coupled to said original image input means for producing a filtered signal in which substantially uniform regions of the grey level image are made substantially zero in first corresponding portions of the filtered signal, and transitions between substantially uniform regions are preserved second corresponding portions of the filtered signal; and tri-level thresholding means, coupled to said spatial band-pass filter means, for thresholding said filtered signal at two distinct threshold levels to generate a tri-level image signal identifying substantially uniform regions of the grey level signal as those regions of the grey level signal corresponding to regions of the filtered signal lying between the threshold levels and transitions as regions of the grey level signal corresponding to a pair of adjacent excursions of the filtered signal away from substantially zero, a first excursion passing beyond one of the two distinct thresholds, and a second excursion passing beyond another of the two distinct thresholds.

2. An image processing device comprising:

original image input means for inputting an image signal representing a grey level image of an object;

reference pattern supply means for supplying a reference signal representing a grey level two-dimensional reference pattern;

spatial band-pass filter means, coupled to said original image input means and said reference pattern supply means, for applying a spatial band-pass filter upon said reference signal and said image signal to generate a filtered reference signal in which substantially uniform regions of the grey level reference pattern are made substantially a reference value in first corresponding portions of the filtered reference signal, and transitions between substantially uniform regions are preserved in second corresponding portions of the filtered reference signal and a filtered image signal in which substantially uniform regions of the grey level image are made substantially a reference value in first corresponding portions of the filtered image signal, and transitions between substantially uniform regions are preserved in second corresponding portions of the filtered image signal;

tri-level thresholding means, coupled to said spatial band-pass filter means, for thresholding said filtered reference signal and said filtered image signal at two distinct threshold levels to generate a tri-level reference signal and a tri-level image signal, respectively, each tri-level signal identifying substantially uniform regions of a corresponding grey level signal as those regions of the corresponding grey level signal corresponding to regions of the filtered signal lying between the threshold levels and transitions as regions of the corresponding grey level signal corresponding to a pair of adjacent excursions of the filtered signal away from substantially zero, a first excursion passing beyond one of the two distinct thresholds and a second excursion passing beyond another of the two distinct thresholds;

similarity calculator means, coupled to said tri-level thresholding means, for determining a portion of said tri-level image of said object which is in best agreement with said tri-level reference pattern, wherein said similarity calculator means includes:

means for setting a relative displacement of said tri-level image of said object with respect to said tri-level reference pattern;

means for calculating a similarity of said tri-level image of said object and said tri-level reference pattern at said relative displacement;

means for varying said relative displacement successively within a predetermined range; and means for determining a relative displacement within said predetermined range at which said similarity reaches a maximum.

3. An image processing device as claimed in claim 2, wherein said similarity is calculated by said calculating means in accordance with an equation:

$$M(a,b) = \Sigma \ \Sigma f(R(i,j), I(i+a, j+b))$$

wherein M(a,b) is said similarity at relative displacement (a,b); R(i,j) is said tri-level reference pattern; I(i,j) is said tri-level object image; and summation is taken over $0 \leq i \leq n$ and $0 \leq j \leq m$, m being a size of said reference pattern in a direction of index j, and n being a size thereof in a direction of index i, $f(\alpha, \beta)$ being an evaluation function.

4. An image processing device comprising:

object image input means for inputting a signal representing a grey level image of an object;

spatial band-pass filter means, coupled to said object image input means, for applying a spatial band-pass filter upon said signal to generate a filtered image signal representing a filtered image of said object in which substantially uniform regions of the grey level image are made substantially a reference value in first corresponding portions of the filtered image signal, and transitions between substantially uniform regions are preserved in second corresponding portions of the filtered image signal;

tri-level thresholding means, coupled to said spatial band-pass filter means, for thresholding said filtered image signal at a first and a second threshold level, said first threshold level being greater than said second threshold level, said tri-level thresholding means generating a tri-level image signal representing a tri-level image of said object which includes:

first regions of the tri-level image corresponding to a pair of adjacent excursions of the filtered image signal, a first excursion passing above said first threshold level and a second excursion passing below said second threshold level, and second regions of the tri-level image corresponding to regions of said filtered image of said object having values between said first and second threshold levels; and regional segmentation means, coupled to said tri-level thresholding means, for segmenting said tri-level image of said object, wherein said regional segmentation means segments only said second regions of said tri-level image of said object.

5. An image processing device comprising:

object image input means for inputting a signal representing a grey level image of an object;

spatial band-pass filter means, coupled to said object image input means, for applying a spatial band-pass filter upon said signal to generate a filtered image signal representing a filtered image of said object in which substantially uniform regions of the grey level image are made substantially a reference value in first corresponding portions of the filtered image signal, and transitions between substantially uniform regions are preserved in second corresponding portions of the filtered image signal;

tri-level thresholding means, coupled to said spatial band-pass filter means, for thresholding said filtered image signal at a first and a second threshold level, said first threshold level being greater than said second threshold level, said tri-level thresholding means generating a tri-level image signal representing a tri-level image of said object which includes:

first regions of the tri-level image corresponding to a pair of adjacent excursions of the filtered image signal, a first excursion passing above said first threshold level and a second excursion passing below said second threshold level, and second regions of the tri-level image corresponding to regions of said filtered image of said object having values between said first and second threshold levels;

segmentation means coupled to said tri-level thresholding means, including:

first segmentation means for segmenting said first regions corresponding to regions of said filtered image of said object below said second threshold level, said first segmentation means generating first segmented regions, second segmentation means for segmenting said second regions corresponding to regions of said filtered image between said first and second threshold levels, said second segmentation means generating second segmented regions, and third segmentation means for segmenting said third regions corresponding to regions of said filtered image of said object below said second threshold level, said third segmentation means generating third segmented regions; and segment synthesizer means, coupled to said segmentation means, for synthesizing predetermined segmented regions among said first, second, and third segmented regions output from said segmentation means.

6. An image processing device as claimed in claim 5, wherein said first threshold level is negative and said second threshold level is positive, and said segment synthesizer means synthesizes each one of said second segmented regions with an adjacent first or third segmented region.

7. An image processing device comprising:

object image input means for inputting a signal representing a grey level digital image of an object;

spatial band-pass filter means, coupled to said object image input means, for applying a spatial band-pass filter upon said signal to generate a filtered image signal representing a filtered image of said object in which substantially uniform regions of the grey level image are made substantially a reference value in first corresponding portions of the filtered image signal, and transitions between substantially uniform regions are preserved in second corresponding portions of the filtered image signal;

tri-level thresholding means, coupled to said spatial band-pass filter means, for thresholding said filtered image signal at a first and a second threshold level, said first threshold level being greater than said second threshold level, said tri-level thresholding means generating a tri-level image signal representing a tri-level image of said object which includes:

first regions of the tri-level image corresponding to a pair of adjacent excursions of the filtered image signal, a first excursion passing above said first threshold level and a second excursion passing below said second threshold level, and second regions of the tri-level image corresponding to regions of said filtered image of said object having values between said first and second threshold levels;

regional segmentation means, coupled to said tri-level thresholding means, for segmenting said tri-level image of said object, wherein said regional segmentation means segments only said second regions of said tri-level image of said object, said regional segmentation means generating segmented regions;

contour detector means, coupled to said spatial band-pass filter means, for extracting contour pixels from said filtered image of said object; and contour segmentation means, coupled to said regional segmentation means and said contour detector means, for segmenting said contour pixels by determining a segmented region output from said regional segmentation means which is closest to each contour pixel, said contour segmentation means generating contour segments each of which includes contour pixels which are determined to be closest to a segmented region output relative to said regional segmentation means.

8. An image processing device for detecting movement of an object from at least two successive images thereof, said image processing device comprising:

object image input means for inputting first and second signals representing successive grey level images of the object;

spatial band-pass filter means, coupled to said object image input means, for applying a spatial band-pass filter upon said first and said second signals to generate first and second filtered signals which represent respective first and second filtered images of the object in which substantially uniform regions of the successive grey level images are made substantially a reference value in first corresponding portions of the first and second filtered image signals, and transitions between substantially uniform regions are preserved in second corresponding portions of the first and second filtered image signals;

tri-level thresholding means, coupled to said spatial band-pass filter means, for thresholding each of said first and second filtered signals at two distinct threshold levels to generate first and second tri-level image signals, respectively, the first and second tri-level image signals identifying substantially uniform regions of the successive grey level signals as those regions of the successive grey level signal corresponding to regions of the first and second filtered signals, respectively, lying between the threshold levels and transitions as regions of the successive grey level signals corresponding to a pair of adjacent excursions of the first and second filtered signals, respectively, from substantially the reference value, a first excursion passing beyond one of the two distinct thresholds and a second excursion passing beyond another of the two distinct thresholds;

labeling means, coupled to said tri-level thresholding means, for labeling said first and said second tri-level images of the object, said labeling means generating labeled regions of said first and said second tri-level images;

label position detector means, coupled to said labeling means, for detecting a position of each labeled region of said first and said second tri-level images output from said labeling means; and movement vector extractor means, coupled to said label position detector means, for extracting a movement vector of said object between said first and said second images, wherein said movement vector extractor means includes:

means for determining a position of a labeled region of said second tri-level image which is closest to a position of a labeled region of said first tri-level image; and means for determining a vector connecting said position of said labeled region of said first tri-level image to said position of said labeled region of said second tri-level image.

9. An image processing device as claimed in claim 8, wherein said position of said labeled regions is a center of gravity of respective labeled regions.

10. An image processing device for detecting a parallax of an object from successive image frames thereof, said image processing device comprising:

object image input means for inputting signals representing successive grey level image frames of an object;

spatial band-pass filter means, coupled to said object image input means, for applying a spatial band-pass filter upon said signals representing said successive image frames of said object to generate filtered image signals representing filtered image frames of said object in which substantially uniform regions of the grey level image are made substantially a reference value in first corresponding portions of the filtered image signals, and transitions between substantially uniform regions are preserved in second corresponding portions of the filtered signals;

tri-level thresholding means, coupled to said spatial band-pass filter means, for thresholding said filtered signals at two distinct threshold levels to generate tri-level image signals, representing successive tri-level image frames, respectively, each tri-level image signal identifying substantially uniform regions of a corresponding grey level signal as those regions of the corresponding grey level signal corresponding to regions of the filtered signal lying between the threshold levels and transitions as regions of the corresponding grey level signal corresponding to a pair of adjacent excursions of the filtered signal array from substantially a reference value, a first excursion passing beyond one of the two distinct thresholds and a second excursion passing beyond another of the two distinct thresholds;

labeling means, coupled to said tri-level thresholding means, for labeling said tri-level image frames of said object, said labeling means generating labeled regions of said tri-level image frames;

label position detector means, coupled to said labeling means, for detecting a position of each labeled region of said tri-level image frames output from said labeling means;

label correspondence calculator means, coupled to said label position detector means, for determining correspondence among successive positions of said labeled regions of said tri-level image frames, wherein said label correspondence calculator means determines said correspondence by establishing a correspondence between a first position of a first labeled region of a first tri-level image frame and a second position of a second labeled region of a second tri-level image frame, said first and second tri-level image frame being two arbitrary successive tri-level image frames among said tri-level image frames output from said tri-level thresholding means, where said second position is closest to said first position among said positions of said labeled regions of said second tri-level image frame;

contour extractor means, coupled to said spatial band-pass filter means, for extracting contours from a first and a last filtered image frames output from said spatial band-pass filter means;

parallax calculator means, coupled to said label correspondence calculator means and said contour extractor means, for calculating a parallax of said object between said first and last filtered image frame, wherein said parallax calculator means includes:

means for determining a correspondence between said contours of said first and last filtered image frames; and means for determining said parallax by determining a movement of said contours of said first and last filtered image frames on the basis of said correspondence established between said contours of said first and last filtered image frames.

11. An image processing device as claimed in claim 10, wherein said position of said labeled regions is a center of gravity of respective labeled regions.

12. An image processing device comprising:

original image input means for inputting a signal representing a grey level image of an object;

means for supplying model data;

spatial band-pass filter means, coupled to said original image input means, for applying a spatial band-pass filter upon said signal to generate a filtered image signal representing a filtered image of said object in which substantially uniform regions of the grey level image are made substantially a reference value in first corresponding portions of the filtered image signal, and transitions between substantially uniform regions are preserved in second corresponding portions of the filtered image signal;

tri-level thresholding means, coupled to said spatial band-pass filter means, for thresholding said filtered image signal at two distinct threshold levels to generate a tri-level image signal, identifying substantially uniform regions of the grey level image as those regions of the grey level image corresponding to regions of the filtered image signal lying between the threshold levels and transitions as regions of the grey level image corresponding to a pair of adjacent excursions of the filtered image signal away from substantially the reference value, a first excursion passing beyond one of the two distinct thresholds and a second excursion passing beyond another of the two distinct thresholds;

labeling means, coupled to said thresholding means, for labeling said tri-level image of said object, said labeling means generating labeled regions of said tri-level image;

grey level information extractor means, coupled to said original image input means and said labeling means, for extracting grey level information of said grey level image of said object with respect to each labeled region output from said labeling means;

grey leveled label generator means, coupled to said labeling means and said grey level information extractor means, for generating information upon grey-leveled labeled regions by which said grey level information with respect to each labeled region is added to information upon each labeled region; and matching means, coupled to said model data and said grey leveled label generator means, for matching said information upon grey-leveled labeled regions with said model data, said matching means thereby generating a recognition information upon said object.

13. The device of claim 1, wherein the original input means includes a camera.

14. The device of claim 2, wherein the original Input means includes a camera.

15. The device of claim 4, wherein the original input means includes a camera.

16. The device of claim 5, wherein the original input means includes a camera.

17. The device of claim 7, wherein the original Input means includes a camera.

18. The device of claim 8, wherein the original input means includes a camera.

19. The device of claim 10, wherein the original input means includes a camera.

20. The device of claim 12, wherein the original input means includes a camera.

21. The device of claim 1, wherein one of the two distinct threshold values has a positive threshold value, and the other of the two distinct threshold levels has a negative threshold value.

22. The device of claim 2, wherein one of the two distinct threshold values has a positive threshold value, and the other of the two distinct threshold levels has a negative threshold value.

23. The device of claim 1, wherein the input signals are received as image frames, and wherein the filter means and tri-level thresholding means filter and threshold each image frame.

24. The device of claim 2, wherein the input signals are received as image frames, and wherein the filter means and tri-level thresholding means filter and threshold each image frame.

* * * * *